US011305653B2

(12) United States Patent
Morita et al.

(10) Patent No.: US 11,305,653 B2
(45) Date of Patent: Apr. 19, 2022

(54) ELECTRIC VEHICLE DRIVE DEVICE

(71) Applicant: NSK LTD., Tokyo (JP)

(72) Inventors: Ryuho Morita, Kanagawa (JP);
Yasuyuki Matsuda, Kanagawa (JP);
Mitsuru Oike, Kanagawa (JP);
Daisuke Gunji, Kanagawa (JP); Shin Yamamoto, Kanagawa (JP)

(73) Assignee: NSK LTD., Tokyo (JP)

( * ) Notice: Subject to any disclaimer, the term of this patent is extended or adjusted under 35 U.S.C. 154(b) by 366 days.

(21) Appl. No.: 16/334,905

(22) PCT Filed: Sep. 15, 2017

(86) PCT No.: PCT/JP2017/033586
§ 371 (c)(1),
(2) Date: Mar. 20, 2019

(87) PCT Pub. No.: WO2018/056229
PCT Pub. Date: Mar. 29, 2018

(65) Prior Publication Data
US 2019/0283612 A1    Sep. 19, 2019

(30) Foreign Application Priority Data

Sep. 21, 2016 (JP) .............................. JP2016-184127
Oct. 18, 2016 (JP) .............................. JP2016-204548
Jul. 19, 2017 (JP) .............................. JP2017-140198

(51) Int. Cl.
*B60L 15/20* (2006.01)
*B60K 1/02* (2006.01)
(Continued)

(52) U.S. Cl.
CPC ................ *B60L 15/20* (2013.01); *B60K 1/02* (2013.01); *B60K 7/00* (2013.01); *B60K 7/0007* (2013.01);
(Continued)

(58) Field of Classification Search
CPC ...... B60L 15/20; B60L 9/18; B60L 2240/421; B60L 2240/423; B60L 2240/461;
(Continued)

(56) References Cited

U.S. PATENT DOCUMENTS 7,090,612 B2 * 8/2006 Ozeki .................... B60K 6/445
477/3
2010/0151988 A1 * 6/2010 Tabata ............ B60W 30/18072
477/3
(Continued)

FOREIGN PATENT DOCUMENTS

CN         104145134 A      11/2014
JP       2012-200076 A      10/2012
(Continued)

OTHER PUBLICATIONS

International Search Report for PCT/JP2017/033586 dated Dec. 26, 2017 [PCT/ISA/210].
(Continued)

*Primary Examiner* — Hunter B Lonsberry
*Assistant Examiner* — Elizabeth Yang
(74) *Attorney, Agent, or Firm* — Sughrue Mion, PLLC

(57) ABSTRACT

An electric vehicle drive device includes: a first motor; a second motor; a transmission mechanism coupled to the first motor and the second motor; and a control unit configured to control operation of the first motor and the second motor based on a drive signal. The transmission mechanism includes: a sun gear shaft coupled to the first motor; a first planetary gear mechanism; a second planetary gear mechanism; and a one-way clutch configured to restrict a rotation direction of a first carrier to a predetermined positive rotation direction. The drive signal includes gear change information indicating a first state in which the second motor is controlled based on torque or a second state in which the
(Continued)

second motor is controlled based on rotation speed, and throttle information indicating an acceleration of rotation speed of a wheel.

9 Claims, 45 Drawing Sheets

(51) Int. Cl.
| | |
|---|---|
| *B60K 7/00* | (2006.01) |
| *B60K 17/02* | (2006.01) |
| *B60K 17/04* | (2006.01) |
| *B60K 17/08* | (2006.01) |
| *F16H 3/72* | (2006.01) |
| *F16H 3/66* | (2006.01) |
| *B60L 9/18* | (2006.01) |

(52) U.S. Cl.
CPC ............ *B60K 17/02* (2013.01); *B60K 17/046* (2013.01); *B60K 17/08* (2013.01); *B60L 9/18* (2013.01); *F16H 3/66* (2013.01); *F16H 3/72* (2013.01); *F16H 3/728* (2013.01); *B60K 2007/003* (2013.01); *B60K 2007/0092* (2013.01); *B60L 2240/421* (2013.01); *B60L 2240/423* (2013.01); *B60L 2240/461* (2013.01); *B60Y 2400/73* (2013.01); *F16H 2200/0021* (2013.01); *F16H 2200/201* (2013.01); *Y02T 10/72* (2013.01)

(58) Field of Classification Search
CPC .......... B60K 1/02; B60K 7/00; B60K 7/0007; B60K 17/02; B60K 17/046; B60K 17/08; B60K 2007/003; B60K 2007/0092; F16H 3/66; F16H 3/72; F16H 3/728; F16H 2200/0021; F16H 2200/201; B60Y 2400/73; Y02T 10/72

See application file for complete search history.

(56) References Cited

U.S. PATENT DOCUMENTS

| | | | | |
|---|---|---|---|---|
| 2012/0072062 | A1* | 3/2012 | Ando | B60K 6/365 |
| | | | | 701/22 |
| 2012/0239237 | A1* | 9/2012 | Hashimoto | B60W 20/15 |
| | | | | 701/22 |
| 2012/0245773 | A1 | 9/2012 | Suzuki et al. | |
| 2013/0267365 | A1 | 10/2013 | Gunji et al. | |
| 2017/0232951 | A1* | 8/2017 | Nawata | B60K 6/445 |
| | | | | 180/65.265 |
| 2017/0253113 | A1 | 9/2017 | Hino | |
| 2018/0015917 | A1* | 1/2018 | Itagaki | B60K 6/445 |
| 2018/0057006 | A1* | 3/2018 | Seki | B60W 10/20 |
| 2019/0202309 | A1* | 7/2019 | Hirata | B60L 9/18 |

FOREIGN PATENT DOCUMENTS

| | | |
|---|---|---|
| JP | 2013-032097 A | 2/2013 |
| JP | 2013-044424 A | 3/2013 |
| JP | 2014-128088 A | 7/2014 |
| JP | 2014-169712 A | 9/2014 |
| JP | 6410000 B2 | 10/2018 |
| WO | 2014057946 A1 | 4/2014 |
| WO | 2016/084801 A1 | 6/2016 |
| WO | 2018/056229 A1 | 3/2018 |

OTHER PUBLICATIONS

Decision to Grant a Patent dated Apr. 23, 2019 issued by the Japanese Patent Office in counterpart application No. 2018-182709.
Communication dated Apr. 6, 2020 by the European Patent Office in application No. 17853002.8.
Communication dated Nov. 26, 2021 from the China National Intellectual Property Administration in Chinese Application No. 201780058372.1.

* cited by examiner

FIG.3

| DRIVING MODE NAME | | FIRST STATE | SECOND STATE |
|---|---|---|---|
| CONTROL | FIRST MOTOR | TORQUE | TORQUE |
| | SECOND MOTOR | TORQUE | ROTATION SPEED |
| ROTATION DIRECTION | FIRST MOTOR | POSITIVE(+) | POSITIVE(+) |
| | SECOND MOTOR | NEGATIVE(-) | POSITIVE(+) OR NEGATIVE(-) |
| | TRANSMISSION MECHANISM INPUT/OUTPUT SHAFT | POSITIVE(+) | |
| ONE-WAY CLUTCH | | BRAKING (STOP) | NON-BRAKING (ROTATING) |
| TORQUE | | CIRCULATION | DIRECT |

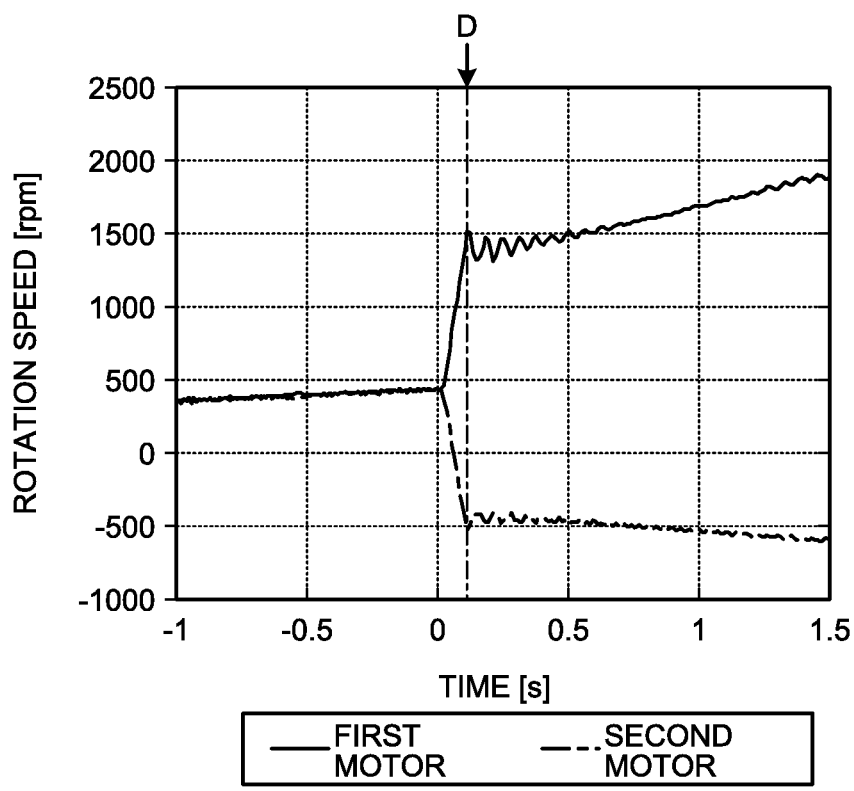
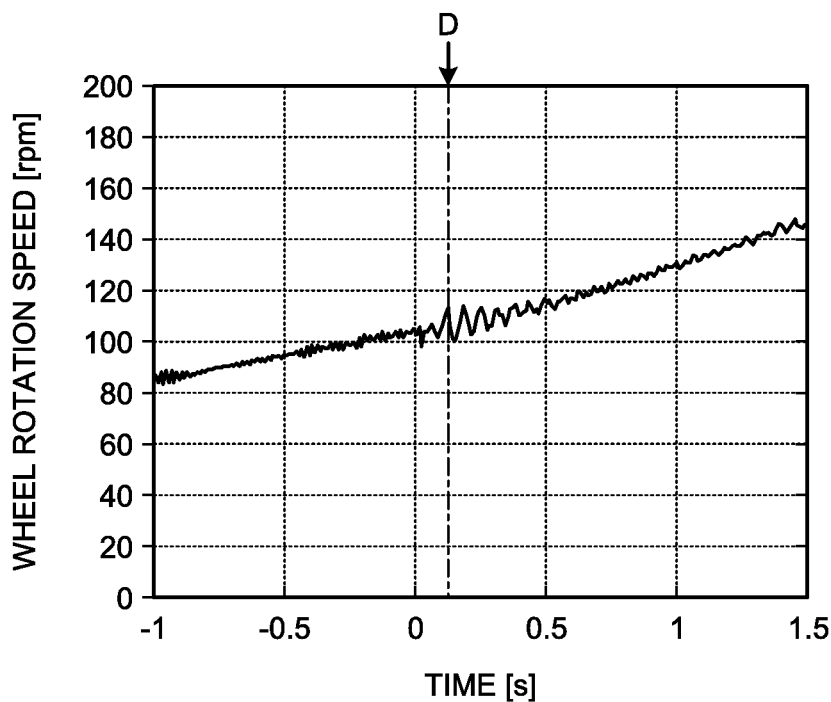

FIG.40

| DRIVING MODE NAME | | FIRST STATE | SECOND STATE | BACKWARD MOVEMENT |
|---|---|---|---|---|
| CONTROL | FIRST MOTOR | TORQUE | TORQUE | ROTATION SPEED |
| | SECOND MOTOR | TORQUE | ROTATION SPEED | ROTATION SPEED |
| ROTATION DIRECTION | FIRST MOTOR | POSITIVE(+) | POSITIVE(+) | NEGATIVE(-) |
| | SECOND MOTOR | NEGATIVE(-) | POSITIVE(+) OR NEGATIVE(-) | POSITIVE(+) |
| | TRANSMISSION MECHANISM INPUT/OUTPUT SHAFT | POSITIVE(+) | | NEGATIVE(-) |
| ONE-WAY CLUTCH | | BRAKING (STOP) | NON-BRAKING (ROTATING) | NON-BRAKING (ROTATING) |
| TORQUE | | CIRCULATION | DIRECT | DIRECT |

ELECTRIC VEHICLE DRIVE DEVICE

CROSS REFERENCE TO RELATED APPLICATIONS

This application is a National Stage of International Application No. PCT/JP2017/033586 filed Sep. 15, 2017, claiming priority based on Japanese Patent Application Nos. 2016-184127 filed Sep. 21, 2016, 2016-204548 filed Oct. 18, 2016 and 2017-140198 filed Jul. 19, 2017.

FIELD

The present invention relates to an electric vehicle drive device.

BACKGROUND

In electric vehicles such as electric cars, drive devices to be driven by power of batteries are mounted. Of the drive devices, in particular, a drive device for directly driving a wheel is called "in-wheel motor". The types of driving of the in-wheel motor include a gear reduction type provided with a reducing mechanism (for example, Patent Literature 1).

CITATION LIST

Patent Literature

Patent Literature 1: Japanese Patent Application Laid-open No. 2013-044424 A

SUMMARY

Technical Problem

General vehicles have a transmission mechanism capable of switching between what is called "low gear" in which the vehicle is moved forward with higher torque and what is called "high gear" in which the vehicle is moved forward at higher speed. However, a mechanism for control that takes gear change such as the switching between low gear and high gear in the transmission mechanism into consideration for two motors included in an in-wheel motor in an electric vehicle has not been known.

The present invention has been made in view of the above, and it is an object thereof to provide an electric vehicle drive device capable of switching operation of motors depending on gear change.

Solution to Problem

To achieve the above object, 1, an electric vehicle drive device according to the present invention, includes a first motor, a second motor, a transmission mechanism coupled to the first motor and the second motor, and a control unit configured to control operation of the first motor and the second motor based on a drive signal. The transmission mechanism includes a sun gear shaft coupled to the first motor, a first planetary gear mechanism including a first sun gear configured to rotate together with the sun gear shaft, a first pinion gear engaged with the first sun gear, a first ring gear engaged with the first pinion gear and coupled to the second motor, and a first carrier that is provided to be rotatable about the sun gear shaft and supports the first pinion gear, and a second planetary gear mechanism including a second sun gear configured to rotate together with the sun gear shaft, a second pinion gear engaged with the second sun gear, a third pinion gear engaged with the second pinion gear, a second ring gear engaged with the third pinion gear and coupled to an output shaft, and a second carrier that supports the second pinion gear and the third pinion gear and is coupled to the first ring gear to rotate about the sun gear shaft, the drive signal includes gear change information indicating a first state in which torque of the second motor is controlled or a second state in which rotation speed of the second motor is controlled and throttle information indicating an acceleration of rotation speed of a wheel, and when the drive signal includes the gear change information indicating the first state, the control unit determines a first command value based on the throttle information, the first command value being a torque command value of the first motor for the positive rotation direction, and operates the first motor in accordance with the first command value, and determines a second command value based on the throttle information, the second command value being a torque command value of the second motor for a rotation direction reverse to the positive rotation direction, and operates the second motor in accordance with the second command value.

Consequently, higher torque can be output in the first state by subjecting the first motor and the second motor to torque control, setting the rotation direction of the first motor to the positive rotation direction, and setting the rotation direction of the second motor to the reverse rotation direction. Thus, an electric vehicle drive device capable of switching the operation of the motors depending on the state of gear change indicated by the gear change information can be provided.

To achieve the above object, an electric vehicle drive device according to the present invention includes a first motor, a second motor, a transmission mechanism coupled to the first motor and the second motor, and a control unit configured to control operation of the first motor and the second motor based on a drive signal. The transmission mechanism includes a sun gear shaft coupled to the first motor, a first planetary gear mechanism including a first sun gear configured to rotate together with the sun gear shaft, a first pinion gear engaged with the first sun gear, a first ring gear engaged with the first pinion gear and coupled to the second motor, and a first carrier provided to be rotatable about the sun gear shaft and supports the first pinion gear, a second planetary gear mechanism including a second sun gear configured to rotate together with the sun gear shaft, a second pinion gear engaged with the second sun gear, a third pinion gear engaged with the second pinion gear, a second ring gear engaged with the third pinion gear and coupled to an output shaft, and a second carrier that supports the second pinion gear and the third pinion gear and is coupled to the first ring gear to rotate about the sun gear shaft and a detection unit configured to detect rotation speed of the first motor, the drive signal includes gear change information indicating a first state in which torque of the second motor is controlled or a second state in which rotation speed of the second motor is controlled and throttle information indicating an acceleration of rotation speed of a wheel, and when the drive signal includes the gear change information indicating the second state, the control unit determines a torque command value of the first motor for the positive rotation direction based on the throttle information and operates the first motor in accordance with the torque command value, and determines a rotation speed command value corresponding to the rotation speed of the first motor detected by the detection unit and operates the second motor in accordance with the rotation speed command value.

Consequently, in the second state, the first motor is subjected to torque control and the second motor is subjected to rotation speed control in accordance with the rotation speed of the first motor, and hence the operation of the second motor can be linked with the first motor in accordance with the rotation direction and the rotation speed of the first motor without the need of designing a complicated control system for linking the operation of the second motor with the first motor. In the second state, higher rotation speed can be output. Thus, an electric vehicle drive device capable of switching the operation of the motors depending on the state of gear change indicated by the gear change information can be provided.

To achieve the above object, an electric vehicle drive device according to the present invention includes a first motor, a second motor, a transmission mechanism coupled to the first motor and the second motor, and a control unit configured to control operation of the first motor and the second motor based on a drive signal. The transmission mechanism includes a sun gear shaft coupled to the first motor, a first planetary gear mechanism including a first sun gear configured to rotate together with the sun gear shaft, a first pinion gear engaged with the first sun gear, a first ring gear engaged with the first pinion gear and coupled to the second motor, and a first carrier that is provided to be rotatable about the sun gear shaft and supports the first pinion gear, a second planetary gear mechanism including a second sun gear configured to rotate together with the sun gear shaft, a second pinion gear engaged with the second sun gear, a third pinion gear engaged with the second pinion gear, a second ring gear engaged with the third pinion gear and coupled to an output shaft, and a second carrier that supports the second pinion gear and the third pinion gear and is coupled to the first ring gear to rotate about the sun gear shaft, and a one-way clutch configured to restrict a rotation direction of the first carrier to a predetermined positive rotation direction, the drive signal includes gear change information indicating a first state in which torque of the second motor is controlled or a second state in which rotation speed of the second motor is controlled, and the control unit controls the torque or the rotation speed of the second motor based on the gear change information.

Consequently, an electric vehicle drive device capable of switching the operation of the motors depending on the state of gear change indicated by the gear change information can be provided. The first state and the second state can be freely switched at desired timing while suppressing what is called gear change shock when the first state and the second state are switched.

As a desirable embodiment of the present invention, the drive signal includes throttle information indicating an acceleration of rotation speed of a wheel, and when the gear change information indicates the first state, the control unit determines a first command value based on the throttle information, the first command value being a torque command value of the first motor for the positive rotation direction, and operates the first motor in accordance with the first command value, and determines a second command value based on the throttle information, the second command value being a torque command value of the second motor for the reverse rotation direction, and operates the second motor in accordance with the second command value.

Consequently, higher torque can be output in the first state by subjecting the first motor and the second motor to torque control, setting the rotation direction of the first motor to the positive rotation direction, and setting the rotation direction of the second motor to the reverse rotation direction.

As a desirable embodiment of the present invention, the electric vehicle drive device includes a detection unit configured to detect rotation speed of the first motor. The drive signal includes throttle information indicating an acceleration of rotation speed of a wheel, and when the gear change information indicates the second state, the control unit determines a torque command value of the first motor for the positive rotation direction based on the throttle information and operates the first motor in accordance with the torque command value, and determines a rotation speed command value corresponding to the rotation speed of the first motor detected by the detection unit and operates the second motor in accordance with the rotation speed command value.

Consequently, in the second state, the first motor is subjected to torque control and the second motor is subjected to rotation speed control in accordance with the rotation speed of the first motor, and hence the operation of the second motor can be linked with the first motor in accordance with the rotation direction and the rotation speed of the first motor without the need of designing a complicated control system for linking the operation of the second motor with the first motor. In the second state, higher rotation speed can be output.

As a desirable embodiment of the present invention, when the second state shifts to the first state, the one-way clutch shifts from a state in which the rotation of the first carrier is not restricted to a state in which the rotation is restricted, and until the one-way clutch shifts from the state in which the rotation of the first carrier is not restricted to the state in which the rotation is restricted, the control unit operates the first motor with a first shift value in which a torque command value for the positive rotation direction is smaller than a first command value that is a torque command value of the first motor for the positive rotation direction, and operates the second motor with a second shift value in which a torque command value for the reverse rotation direction is smaller than a second command value that is a torque command value of the second motor for the reverse rotation direction.

Consequently, when the one-way clutch shifts from the state in which the rotation of the first carrier is not restricted to the state in which the rotation is restricted, mechanical impact caused in the one-way clutch can be suppressed. The abrupt acceleration of the vehicle can be suppressed, which otherwise occurs when the one-way clutch restricts the rotation of the first carrier and the wheel torque increases.

As a desirable embodiment of the present invention, after the one-way clutch shifts to the state in which the rotation of the first carrier is restricted, the control unit gradually increases the torque command value of the first motor for the positive rotation direction from the first shift value to the first command value, and gradually increases the torque command value of the second motor for the reverse rotation direction from the second shift value to the second command value.

Consequently, the first motor and the second motor can be more smoothly accelerated after the one-way clutch restricts the rotation of the first carrier. Thus, the abrupt acceleration after the shift from the second state to the first state can be suppressed.

As a desirable embodiment of the present invention, when the drive signal includes the gear change information indicating the first state and when a torque command value for a reverse rotation direction of the second motor determined based on the throttle information is smaller than a predetermined lower limit value, the control unit sets the second command value to the lower limit value.

Consequently, in the first state, the state in which the one-way clutch restricts the rotation of the first carrier irrespective of the throttle information can be maintained. Thus, the switching between the state in which the rotation of the first carrier is not restricted and the state in which the rotation is restricted does not occur in the one-way clutch in the first state, and the occurrence of mechanical influence caused by the switching can be suppressed.

As a desirable embodiment of the present invention, when the drive signal includes the gear change information indicating the first state and when the torque command value for the reverse rotation direction of the second motor determined based on the throttle information is equal to or larger than the lower limit value, the control unit sets an absolute value of the first command value and an absolute value of the second command value to the same value.

Consequently, the calculation of the first command value and the second command value can be more simplified.

As a desirable embodiment of the present invention, the electric vehicle drive device includes a detection unit configured to detect rotation speed of the first motor, and a filtering unit configured to converge an increase/decrease amount of the rotation speed of the first motor detected by the detection unit.

Consequently, the increase/decrease amount of the rotation speed of the first motor is processed by the filtering unit so as to be converged, and hence the increase/decrease amount of the rotation speed indicated by the detection result of the rotation speed of the first motor having the converged increase/decrease amount can be decreased as compared with the actual increase/decrease amount of the rotation speed of the first motor. Thus, the increase/decrease amount of the rotation speed of the second motor can be further decreased, and the occurrence of mechanical vibration caused by the increase/decrease in rotation speed can be suppressed.

As a desirable embodiment of the present invention, in a case where the first motor is rotated in a rotation direction reverse to the positive rotation direction and the second motor is rotated in the positive rotation direction, when the rotation speed of the first motor is represented by $N_{MA}$, the rotation speed of the second motor is represented by $N_{MB}$, a reduction ratio in the first planetary gear mechanism is represented by $i_1$, and a reduction ratio in the second planetary gear mechanism is represented by $i_2$, the control unit determines $N_{MB}$ within a range indicated by Equation (1):

$$-\frac{1}{i_1} \times N_{MA} \leq N_{MB} < \left(\frac{1}{1-i_2}\right) \times N_{MA} \quad (1)$$

Consequently, in the electric vehicle drive device provided on the assumption that the one-way clutch does not brake the rotation in the positive rotation direction, the second ring gear can be rotated in the reverse rotation direction braked by the one-way clutch. Thus, irrespective of whether the positive rotation direction or the reverse rotation direction is forward, the electric vehicle drive device capable of backward movement can be provided.

Advantageous Effects of Invention

According to the present invention, an electric vehicle drive device capable of switching operation of motors depending on gear change can be provided.

BRIEF DESCRIPTION OF DRAWINGS

FIG. 3 is a table illustrating an example of the correspondence relation among a driving mode determined by gear change information, control of the first motor and the second motor by the control unit, the state of a clutch device provided by the control, torque of the electric vehicle drive device, and a rotation direction of a transmission mechanism input/output shaft.

FIG. 20 is a graph illustrating a transition example of rotation speed of the first motor and the second motor in the case where the transition processing is applied when the second state is switched to the first state.

FIG. 21 is a graph illustrating a transition example of wheel rotation speed in the case where the transition processing is applied when the second state is switched to the first state.

FIG. 40 is a table illustrating an example of the correspondence relation among a driving mode determined by traveling direction information and gear change information, control of the first motor and the second motor by the control unit, the state of the clutch device provided by the control, torque of the electric vehicle drive device, and a rotation direction of a transmission mechanism input/output shaft according to the second embodiment.

DESCRIPTION OF EMBODIMENTS

Embodiments of the present invention are described in detail with reference to the drawings. The present invention is not limited to contents described in the following embodiments. Components described below include the ones that can be easily conceived by a person skilled in the art and the ones that are substantially the same. In addition, the components described below can be omitted, replaced, or changed within the range not departing from the gist of the invention.

First Embodiment

Figure 1:
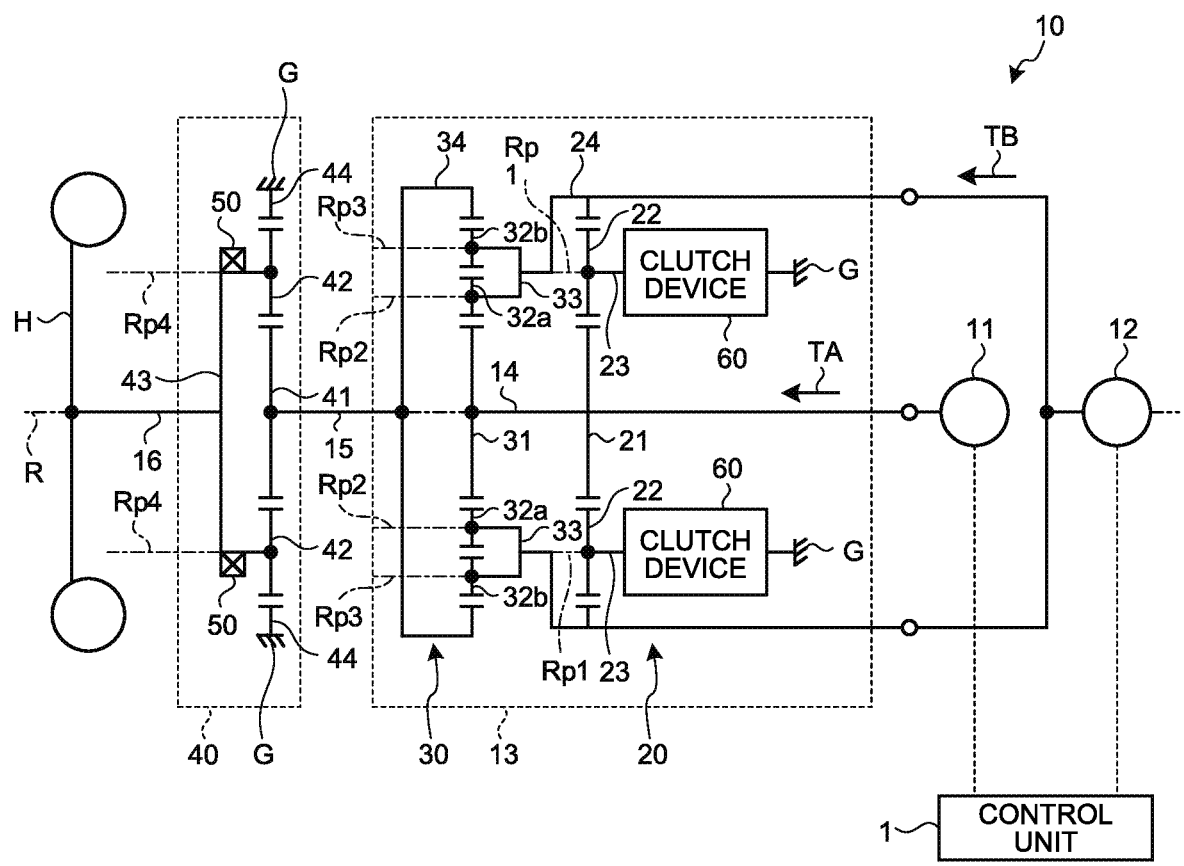
FIG. 1 is a schematic diagram illustrating a configuration of an electric vehicle drive device according to a first embodiment.

FIG. 1 is a schematic diagram illustrating a configuration of an electric vehicle drive device 10 according to a first embodiment. The electric vehicle drive device 10 includes a case G, a first motor 11, a second motor 12, a transmission mechanism 13, a reducing mechanism 40, a wheel bearing 50, a wheel input/output shaft 16, and a control unit 1. The case G supports the first motor 11, the second motor 12, the transmission mechanism 13, and the reducing mechanism 40. The transmission mechanism 13 is coupled to the first motor 11 and the second motor 12. In the electric vehicle drive device 10, the reducing mechanism 40 is connected to a wheel (wheel H). For example, the electric vehicle drive device 10 is connected to a chassis of an electric vehicle through a knuckle integrated with the case G. The electric vehicle is provided with an operation system OP having an accelerator pedal AP and a shift lever SL (see FIG. 2), for example. In the first embodiment, a drive signal SI used for the control unit 1 in the electric vehicle drive device 10 to control the operation of the first motor 11 and the second motor 12 is output in response to operation by a driver on the operation system OP. This is an example of the output of the drive signal SI, and the output of the drive signal SI is not limited thereto. The specific configuration for the output of the drive signal SI can be appropriately changed.

The first motor 11 can output first torque TA. The second motor 12 can output second torque TB. The transmission mechanism 13 is coupled to the first motor 11. In this manner, when the first motor 11 operates, the first torque TA is transmitted (input) from the first motor 11 to the transmission mechanism 13. The transmission mechanism 13 is coupled to the second motor 12. In this manner, when the second motor 12 operates, the second torque TB is transmitted (input) from the second motor 12 to the transmission mechanism 13. The operation of the motor as used herein refers to an operation in which the input/output shaft of the first motor 11 or the second motor 12 rotates when electric power is supplied to the first motor 11 or the second motor 12. In the electric vehicle drive device 10, a first rotation angle detector 91 serving as a detection unit is provided as a configuration for detecting the rotation speed of the first motor 11. In the electric vehicle drive device 10 in the first embodiment, a second rotation angle detector 92 configured to detect the rotation speed of the second motor 12 is provided (see FIG. 2, FIG. 53, and FIG. 54).

The transmission mechanism 13 is coupled to the first motor 11, the second motor 12, and the wheel input/output shaft 16, and can change a reduction ratio (ratio of an input angular velocity to an angular velocity output to the transmission mechanism 13). The transmission mechanism 13 includes a sun gear shaft 14, a first planetary gear mechanism 20, a second planetary gear mechanism 30, and a clutch device 60.

The sun gear shaft 14 is coupled to the first motor 11. When the first motor 11 operates, the sun gear shaft 14 rotates about a rotation axis R.

For example, the first planetary gear mechanism 20 is a single-pinion planetary gear mechanism. The first planetary gear mechanism 20 includes a first sun gear 21, a first pinion gear 22, a first carrier 23, and a first ring gear 24.

The first sun gear 21 is coupled to the sun gear shaft 14. The first sun gear 21 can rotate about the rotation axis R together with the sun gear shaft 14. When the first motor 11 operates, the first torque TA is transmitted from the first motor 11 to the first sun gear 21. In this manner, when the first motor 11 operates, the first sun gear 21 rotates about the rotation axis R. The first pinion gear 22 is engaged with the first sun gear 21.

The first carrier 23 is supported by the sun gear shaft 14. The first carrier 23 supports the first pinion gear 22 such that the first pinion gear 22 can rotate about a first pinion rotation axis Rp1. For example, the first pinion rotation axis Rp1 is parallel to the rotation axis R. The first carrier 23 supports the first pinion gear 22 such that the first pinion gear 22 can revolve about the rotation axis R. In other words, the first carrier 23 is provided to be rotatable about the sun gear shaft 14.

The first ring gear 24 is engaged with the first pinion gear 22. The first ring gear 24 can rotate about the rotation axis R. The first ring gear 24 is coupled to the second motor 12. When the second motor 12 operates, the second torque TB is transmitted from the second motor 12 to the first ring gear 24. In this manner, when the second motor 12 operates, the first ring gear 24 rotates about the rotation axis R.

The clutch device 60 restricts the rotation direction of the first carrier 23 to a predetermined positive rotation direction. Specifically, the clutch device 60 is a one-way clutch device, and transmits only torque in a first direction but does not transmit torque in a second direction opposite to the first direction. The clutch device 60 is disposed between the case G and the first carrier 23. The clutch device 60 can restrict the rotation of the first carrier 23. Specifically, the clutch device 60 can switch between the state in which the rotation of the first carrier 23 centered at the rotation axis R is restricted (braked) and the state in which the rotation is allowed. In other words, the clutch device 60 can set the first carrier 23 to be freely rotatable with respect to the case G, and set the first carrier 23 to be unrotatable with respect to the case G. In the following description, the state in which the clutch device 60 restricts (brakes) the rotation is referred to as "braking state", and the state in which the clutch device 60 allows the rotation is referred to as "non-braking state".

For example, the second planetary gear mechanism 30 is a double-pinion planetary gear mechanism. The second planetary gear mechanism 30 includes a second sun gear 31, a second pinion gear 32a, a third pinion gear 32b, a second carrier 33, and a second ring gear 34.

The second sun gear 31 is coupled to the sun gear shaft 14. When the first motor 11 operates, the first torque TA is transmitted from the first motor 11 to the second sun gear 31. The second sun gear 31 can rotate about the rotation axis R together with the sun gear shaft 14 and the first sun gear 21. The second pinion gear 32a is engaged with the second sun gear 31. The third pinion gear 32b is engaged with the second pinion gear 32a.

The second carrier 33 is supported by the sun gear shaft 14. The second carrier 33 supports the second pinion gear 32a such that the second pinion gear 32a can rotate about a second pinion rotation axis Rp2. The second carrier 33 supports the third pinion gear 32b such that the third pinion gear 32b can rotate about a third pinion rotation axis Rp3. For example, the second pinion rotation axis Rp2 and the third pinion rotation axis Rp3 are parallel to the rotation axis R. The second carrier 33 supports the second pinion gear 32a and the third pinion gear 32b such that the second pinion gear 32a and the third pinion gear 32b can revolve about the rotation axis R. The second carrier 33 is coupled to the first ring gear 24. In this manner, the second carrier 33 rotates about the rotation axis R when the first ring gear 24 rotates. In other words, the second carrier 33 rotates about the sun gear shaft 14.

The second ring gear 34 is engaged with the third pinion gear 32b. The second ring gear 34 can rotate about the rotation axis R. The second ring gear 34 is coupled to a transmission mechanism input/output shaft 15, which is an output shaft of the transmission mechanism 13. In this manner, when the second ring gear 34 rotates, the transmission mechanism input/output shaft 15 rotates.

The reducing mechanism 40 is disposed between the transmission mechanism 13 and the wheel H of the electric vehicle. The reducing mechanism 40 reduces the angular velocity of the transmission mechanism input/output shaft 15 and outputs the resultant to the wheel input/output shaft 16. The wheel input/output shaft 16 is coupled to the wheel H of the electric vehicle, and transmits power between the reducing mechanism 40 and the wheel H. Torque generated by at least one of the first motor 11 and the second motor 12 is transmitted to the wheel H through the transmission mechanism 13 and the reducing mechanism 40. On the other hand, torque generated by the wheel H when the electric vehicle travels on a downhill, for example, is transmitted to at least one of the first motor 11 and the second motor 12 through the reducing mechanism 40 and the transmission mechanism 13. In this case, at least one of the first motor 11 and the second motor 12 operates as a generator. The rotational resistance during power generation functions as braking force on the electric vehicle as regenerative braking. The reducing mechanism 40 includes a third sun gear 41, a fourth pinion gear 42, a third carrier 43, and a third ring gear 44.

The third sun gear 41 is coupled to the transmission mechanism input/output shaft 15. Specifically, the third sun gear 41 is coupled to the second ring gear 34 through the transmission mechanism input/output shaft 15. The fourth pinion gear 42 is engaged with the third sun gear 41. The third carrier 43 supports the fourth pinion gear 42 such that the fourth pinion gear 42 can rotate about a fourth pinion rotation axis Rp4 and the fourth pinion gear 42 can revolve about the third sun gear 41. The third ring gear 44 is engaged with the fourth pinion gear 42 and fixed to the case G. The third carrier 43 is coupled to the wheel H through the wheel input/output shaft 16. The third carrier 43 is rotatably supported by the wheel bearing 50.

The reducing mechanism 40 drives the wheel H by rotating the wheel input/output shaft 16 at a velocity slower than the angular velocity of the transmission mechanism input/output shaft 15. Thus, even when the maximum torque of the first motor 11 and the second motor 12 is small, the electric vehicle drive device 10 can transmit torque necessary for the electric vehicle to start and climb (ascend a hill) to the wheel H. As a result, currents for operating the first motor 11 and the second motor 12 can be reduced, and the first motor 11 and the second motor 12 can be reduced in size and weight. Therefore, the manufacturing cost and the weight of the electric vehicle drive device 10 can be reduced.

The traveling direction of the electric vehicle and the rotation direction of the transmission mechanism input/output shaft 15 have a predetermined relation. In the following description, the rotation direction of the transmission mechanism input/output shaft 15 when the electric vehicle moves forward is referred to as "positive rotation direction", and the rotation direction of the transmission mechanism input/output shaft 15 when the electric vehicle moves backward is referred to as "reverse rotation direction". In the figures, "positive rotation direction" is represented by "positive (+)", and "reverse rotation direction" is represented by "negative (−)". In a specific example, in the case of a general four-wheel car, when the electric vehicle moves forward, left wheels rotate in the clockwise direction as seen from the transmission mechanism input/output shaft 15 side, and right wheels rotate in the counterclockwise direction as seen from the transmission mechanism input/output shaft 15 side. In other words, the clockwise direction for the transmission mechanism input/output shaft 15 connected to the left wheel is "positive rotation direction", and the counterclockwise direction for the transmission mechanism input/output shaft 15 connected to the right wheel is "positive rotation direction". During backward movement in a second embodiment described later, the rotation directions of the wheels H are reversed.

In the first embodiment, the rotation direction of the transmission mechanism input/output shaft 15 is the same as the rotation direction of the sun gear shaft 14. In the first embodiment, the rotation direction of the sun gear shaft 14 is the same as the rotation direction of the first motor 11. In other words, in the first embodiment, the rotation direction of the wheel H coupled to the transmission mechanism input/output shaft 15 is the same as the rotation direction of the first motor 11.

Figure 2:
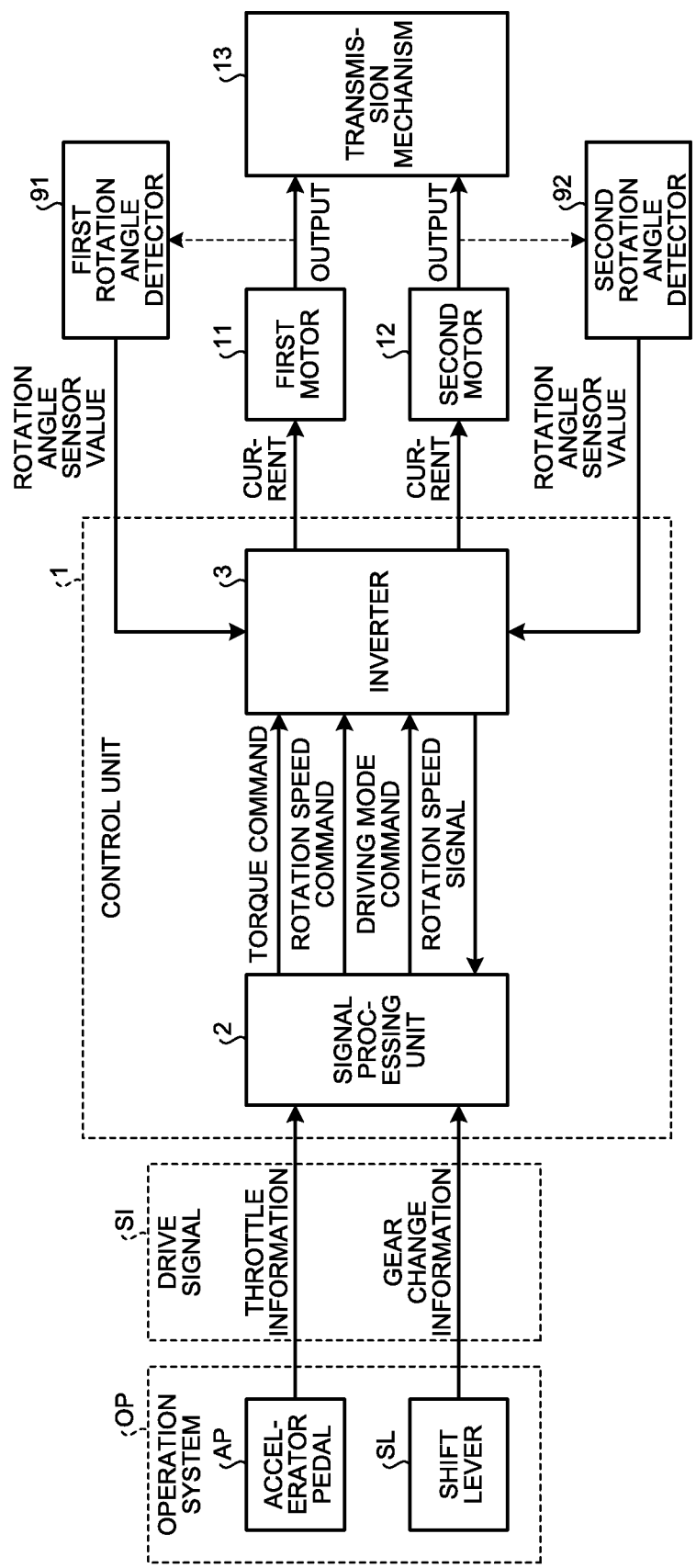
FIG. 2 is a schematic diagram illustrating an example of the relation among an operation system, a control unit, a first motor, a second motor, a transmission mechanism, a first rotation angle detector, and a second rotation angle detector.

FIG. 2 is a schematic diagram illustrating an example of the relation among the operation system OP, the control unit 1, the first motor 11, the second motor 12, the transmission mechanism 13, the first rotation angle detector 91, and the second rotation angle detector 92. The control unit 1 controls the operation of the electric vehicle drive device 10. Specifically, the control unit 1 controls the angular velocities, the rotation directions, and the outputs of the first motor 11 and the second motor 12. For example, the control unit 1 includes a signal processing unit 2 and an inverter 3. The signal processing unit 2 is, for example, a microcomputer, and controls operation of the inverter 3 based on the drive signal SI obtained in response to operation of the operation system OP including the accelerator pedal AP and the shift lever SL of the electric vehicle. The inverter 3 supplies electric power to the first motor 11 and the second motor 12.

The drive signal SI includes gear change information and throttle information. Examples of the gear change information include information obtained depending on whether the position of the shift lever SL is low gear (L) when the electric vehicle moves forward. When the position of the shift lever SL is low gear (L), the electric vehicle is operated to move forward with torque relatively higher than that when the position of the shift lever SL is not low gear (L). When the position of the shift lever SL is none of parking (P), reverse (R), and low gear (L), the electric vehicle is operated to move forward at speed relatively higher than that when the position of the shift lever SL is low gear (L). The gear change information is information obtained depending on the position of the shift lever SL.

The gear change information serves as information indicating a first state in which the second motor 12 is controlled based on torque or a second state in which the second motor 12 is controlled based on rotation speed. Specifically, for example, the first state refers to a case where the electric vehicle is operated to move forward with torque relatively higher than that when the position of the shift lever SL is not low gear (L), and in the first embodiment, corresponds to the case where the position of the shift lever SL is low gear (L). For example, the second state refers to a case where the electric vehicle is operated to move forward at speed relatively higher than that when the position of the shift lever SL is low gear (L), and in the first embodiment, corresponds to the case where the position of the shift lever SL is none of parking (P), reverse (R), and low gear (L).

Examples of the throttle information include information obtained depending on an accelerator operation amount. The magnitude of the accelerator operation amount serves as a factor to determine the amount of electric power supplied from the inverter 3 to the first motor 11 and the second motor 12. In general, the amount of electric power supplied from the inverter 3 becomes larger as the accelerator operation amount becomes larger, and the first motor 11 and the second motor 12 are driven to rotate at higher speed.

The control unit 1 applies any one of torque control and rotation speed control as the control of the first motor 11 and the second motor 12. The control unit 1 can make the control applied to one of the first motor 11 and the second motor 12 and the control applied to the other the same or different. The torque control refers to control for maintaining a generated torque value of the motor to a given value (for example, a value corresponding to throttle information). The rotation speed control refers to control for maintaining a rotation speed value of the motor to a given value (for example, a value corresponding to throttle information). In the first embodiment, the control unit 1 can individually control the operation of the first motor 11 and the second motor 12 based on the rotation speed of the first motor 11 and the second motor 12 detected by the first rotation angle detector 91 and the second rotation angle detector 92 described later.

FIG. 3 is a table illustrating an example of the correspondence relation among a driving mode determined by the gear change information, the control of the first motor 11 and the second motor 12 by the control unit 1, the state of the clutch device 60 provided by the control, the torque of the electric vehicle drive device 10, and the rotation direction of the transmission mechanism input/output shaft 15. The control unit 1 determines, based on the drive signal SI, the rotation direction of the second motor 12 and whether to control the second motor 12 based on torque or rotation speed.

The control unit 1 applies the torque control to the first motor 11 and the second motor 12 when the gear change information indicates the first state. Specifically, the control unit 1 sets the rotation direction of the first motor 11 to the positive rotation direction, and sets the rotation direction of the second motor 12 to the reverse rotation direction. In this case, the clutch device 60 is in the braking state. This case is a torque circulating state in which the circulation of torque between the first planetary gear mechanism 20 and the second planetary gear mechanism 30 occurs.

The control unit 1 applies the torque control to the first motor 11 and applies the rotation speed control to the second motor 12 when the gear change information indicates the second state. Specifically, the control unit 1 sets the rotation direction of the first motor 11 to the positive rotation direction, and sets the rotation direction of the second motor 12 to the positive rotation direction or the reverse rotation direction. In this case, the clutch device 60 is in the non-braking state. This case is a direct transmission state in which torque of the first motor 11 and torque of the second motor 12 are combined and transmitted to the transmission mechanism input/output shaft 15.

For the operation control of the first motor 11 and the second motor 12, the signal processing unit 2 uses throttle information based on the accelerator operation amount and information indicating the rotation speed of the first motor 11 and the second motor 12 detected by the first rotation angle detector 91 and the second rotation angle detector 92. Specifically, for example, as illustrated in FIG. 2, the signal processing unit 2 determines a driving mode indicating whether the first motor 11 and the second motor 12 are operated by the torque control or the rotation speed control, and calculates command values (torque command values or rotation speed command values) for operating the first motor 11 and the second motor 12. The signal processing unit 2 outputs a command (driving mode command) indicating the driving mode and commands (torque commands or rotation speed commands) indicating the calculated command values to the inverter 3. The inverter 3 supplies electric power to the first motor 11 and the second motor 12 in accordance with the commands from the signal processing unit 2. For example, the relation among the throttle information, the rotation speed of the first motor 11 and the second motor 12 indicated by detection results of the first rotation angle detector 91 and the second rotation angle detector 92, and the operation of the first motor 11 and the second motor 12 depends on a calculation equation implemented in the signal processing unit 2 in advance. The accelerator operation amount is the degree of operation performed on a component that determines the throttle information, such as a pedaling amount of the accelerator pedal AP.

More specifically, the first rotation angle detector 91 and the second rotation angle detector 92 output rotation angle sensor values indicating rotation angles (for example, absolute angles) of the first motor 11 and the second motor 12 to the inverter 3, respectively. The inverter 3 outputs rotation speed signals to the signal processing unit 2 in accordance with the input rotation angle sensor values. The signal processing unit 2 performs feedback control of the first motor 11 and the second motor 12 based on the input rotation speed signals. Specifically, for example, the signal processing unit 2 takes correction based on the rotation speed of the first motor 11 and the second motor 12 into consideration to calculate a torque command value or a rotation speed command value based on the relation between the throttle information and the operation of the first motor 11 and the second motor 12. In this manner, the first motor 11 and the second motor 12 can be controlled in consideration of the conditions of the electric vehicle indicated by the rotation speed of the first motor 11 and the second motor 12 as a result of the response to previous commands.

Figure 4:
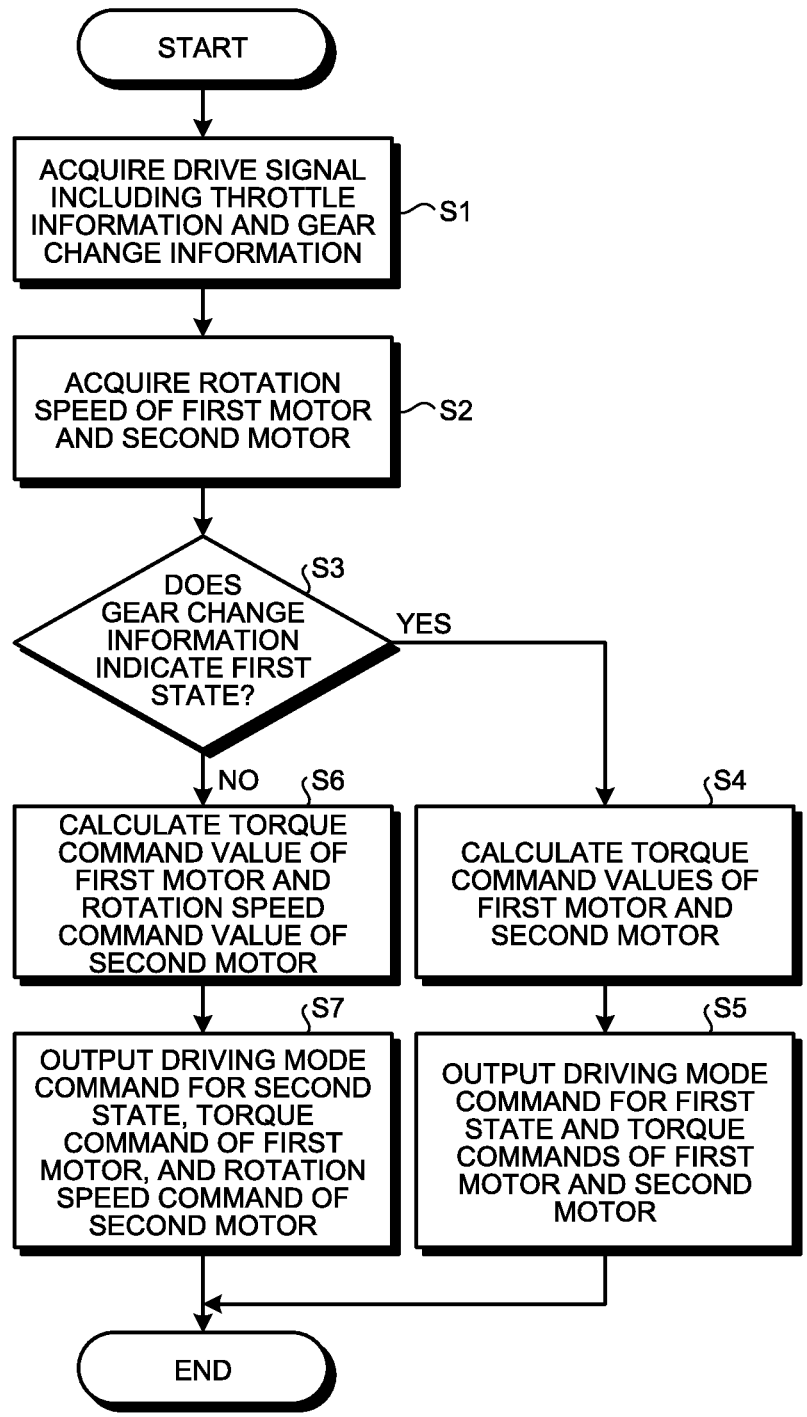
FIG. 4 is a flowchart illustrating a branch example of the control of the first motor and the second motor by the control unit.

FIG. 4 is a flowchart illustrating a branch example of the control of the first motor 11 and the second motor 12 by the control unit 1. The control unit 1 acquires a drive signal SI including throttle information and gear change information (Step S1). Specifically, for example, the signal processing unit 2 acquires a drive signal SI including throttle information and gear change information based on an accelerator operation amount and an operation position of the shift lever SL determined in accordance with operation by a driver of the electric vehicle performed through the operation system OP such as the accelerator pedal AP and the shift lever SL. The control unit 1 acquires information indicating the rotation speed of the first motor 11 and the second motor 12 (Step S2). Specifically, for example, rotation angle sensor values of the first motor 11 and the second motor 12 detected by the first rotation angle detector 91 and the second rotation angle detector 92 are output to the inverter 3, and rotation speed signals corresponding to the rotation angle sensor values are output from the inverter 3 to the signal processing unit 2. The processing of Step S1 and the processing of Step S2 are performed in no particular order, and may be performed in parallel.

The control unit 1 performs processing corresponding to a driving mode indicated by the gear change information included in the drive signal SI. Specifically, for example, as illustrated in FIG. 4, the control unit 1 branches the processing depending on whether the gear change information indicates the first state (Step S3), thereby performing the processing corresponding to the driving mode indicated by the gear change information. The processing of Step S3 may be a determination as to whether the gear change information indicates the second state. The specific determination contents can be freely determined as long as the processing can be branched depending on the driving mode indicated by the gear change information.

When the gear change information indicates the first state (Yes at Step S3), the control unit 1 calculates torque command values of the first motor 11 and the second motor 12 based on the throttle information (Step S4). Specifically, for example, the signal processing unit 2 calculates the torque command values of the first motor 11 and the second motor 12. After that, the control unit 1 outputs a driving mode command for the first state and torque commands of the first motor 11 and the second motor 12 (Step S5). Specifically, the signal processing unit 2 outputs the driving mode command and the torque commands to the inverter 3. The inverter 3 supplies electric power corresponding to the commands to the first motor 11 and the second motor 12, so that currents corresponding to the commands flow through the first motor 11 and the second motor 12.

When the gear change information does not indicate the first state (No at Step S3), that is, when the gear change information indicates the second state, the control unit 1 calculates a torque command value of the first motor 11 and a rotation speed command value of the second motor 12 based on the throttle information (Step S6). Specifically, for example, the signal processing unit 2 calculates the torque command value of the first motor 11, and calculates the rotation speed command value of the second motor 12 corresponding to the rotation speed of the first motor 11 obtained based on the rotation angle sensor value of the first motor 11 detected by the first rotation angle detector 91. After that, the control unit 1 outputs a driving mode command for the second state, a torque command of the first motor 11, and a rotation speed command of the second motor 12 (Step S7). Specifically, the signal processing unit 2 outputs the driving mode command, the torque command, and the rotation speed command to the inverter 3. The inverter 3 supplies electric power corresponding to the commands to the first motor 11 and the second motor 12, so that currents corresponding to the commands flow through the first motor 11 and the second motor 12.

Next, the operation states of the first motor 11 and the second motor 12 depending on the driving mode and the operation states of the first planetary gear mechanism 20, the second planetary gear mechanism 30, and the clutch device 60 are described in the order of the first state and the second state. In the first embodiment, the second state and the first state can be switched during forward movement. The first state and the second state are first described below, and then the switching between the first state and the second state is exemplified.

Figure 5:
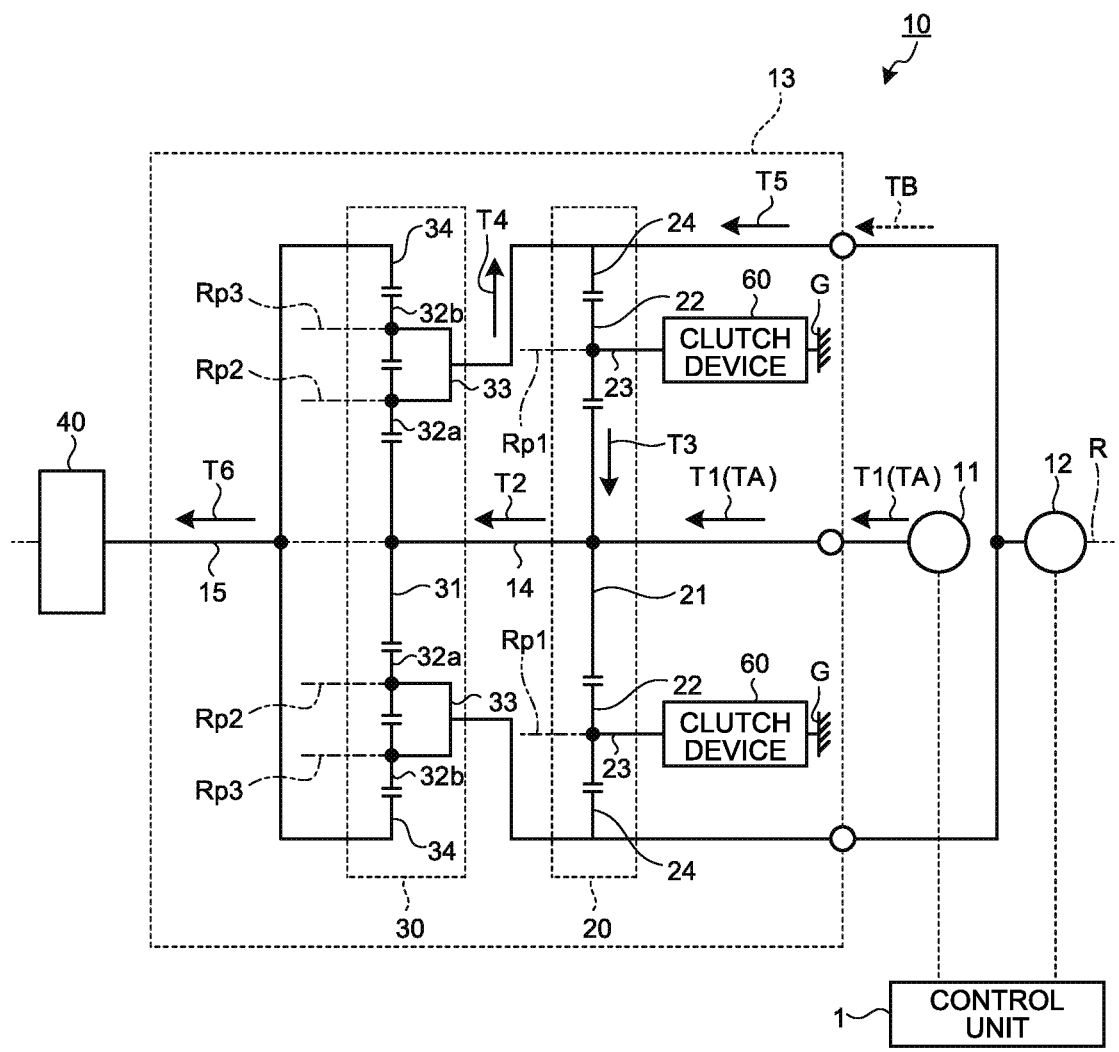
FIG. 5 is a schematic diagram illustrating paths through which torque is transmitted when the electric vehicle drive device according to the first embodiment is in a first state.

FIG. 5 is an explanatory diagram illustrating paths through which torque is transmitted when the electric vehicle drive device 10 according to the first embodiment is in the first state. The first state is what is called "low gear state", and the reduction ratio can be increased. In other words, in the first state, the torque transmitted to the transmission mechanism input/output shaft 15 increases. The first state is mainly used in the case where the electric vehicle needs large driving force during traveling. Examples of the case where the electric vehicle needs large driving force include when the electric vehicle starts on a hill and climbs a hill, for example. In the first state, the magnitudes of torque generated by the first motor 11 and the second motor 12 are equal, and the directions of the torque are opposite. The torque generated by the first motor 11 is input to the first sun gear 21. The torque generated by the second motor 12 is input to the first ring gear 24. In the first state, the clutch device 60 is in the braking state. Specifically, in the first state, the first pinion gear 22 can rotate but cannot revolve.

The torque output by the first motor 11 in the first state is referred to as "first torque T1", and the torque output by the second motor 12 in the first state is referred to as "second torque T5". The first torque T1 output from the first motor 11 is input to the first sun gear 21 through the sun gear shaft 14. The first torque T1 merges with circulating torque T3 in the first sun gear 21 to become composite torque T2. The composite torque T2 is output from the first sun gear 21. The circulating torque T3 is torque transmitted from the first ring gear 24 to the first sun gear 21.

The first sun gear 21 and the second sun gear 31 are coupled by the sun gear shaft 14. Thus, in the first state, the composite torque T2 output from the first sun gear 21 is transmitted to the second sun gear 31 through the sun gear shaft 14. The composite torque T2 is amplified by the second planetary gear mechanism 30. The composite torque T2 is distributed by the second planetary gear mechanism 30 into first distributed torque T6 and second distributed torque T4. The first distributed torque T6 is torque obtained when the composite torque T2 is distributed to the second ring gear 34 and amplified, and is output from the transmission mechanism input/output shaft 15. The second distributed torque T4 is torque obtained when the composite torque T2 is distributed to the second carrier 33 and amplified.

The first distributed torque T6 is output from the transmission mechanism input/output shaft 15 to the reducing mechanism 40. The first distributed torque T6 is amplified by the reducing mechanism 40, and output to the wheel H through the wheel input/output shaft 16 illustrated in FIG. 1. As a result, the electric vehicle travels.

The second carrier 33 and the first ring gear 24 rotate integrally. The second distributed torque T4 distributed to the second carrier 33 is combined with the second torque T5 of the second motor 12 by the first ring gear 24. The direction of the second torque T5 (torque of second motor 12) is opposite to the direction of the torque of the first motor 11.

The magnitude of the composite torque of the second torque T5 and the second distributed torque T4 returned to the first ring gear 24 is decreased by the first planetary gear mechanism 20, and the direction of the composite torque of the second torque T5 and the second distributed torque T4 is reversed. The composite torque of the second torque T5 and the second distributed torque T4 becomes the circulating torque T3 in the first sun gear 21. In this manner, the circulation of torque occurs between the first planetary gear mechanism 20 and the second planetary gear mechanism 30, and hence the transmission mechanism 13 can increase the reduction ratio. In other words, the electric vehicle drive device 10 can generate large torque in the first state.

The magnitudes of various kinds of torque in the first state depend on, for example, the throttle information. Specifically, the signal processing unit 2 determines a first command value, which is a torque command value of the first motor 11 for the positive rotation direction, based on the throttle information. The signal processing unit 2 determines a second command value, which is a torque command value of the second motor 12 for the reverse rotation direction, based on the throttle information. The signal processing unit 2 outputs the first command value and the second command value to the inverter 3. The inverter 3 supplies electric power to the first motor 11 and the second motor 12 in accordance with the first command value and the second command value, so that the first motor 11 and the second motor 12 operate in accordance with the first command value and the second command value. In this manner, when the gear change information indicates the first state, the control unit 1 determines the first command value, which is a torque command value of the first motor 11 for the positive rotation direction, based on the throttle information and operates the first motor 11 in accordance with the first command value, and determines the second command value, which is a torque command value of the second motor 12 for the reverse rotation direction, based on the throttle information and operates the second motor 12 in accordance with the second command value. The rotation speed ratio of the first motor 11 and the second motor 12 in the first state is uniquely determined by the ratio of the number of teeth of the first sun gear 21 and the number of teeth of the first ring gear 24 in the first planetary gear mechanism 20 described later.

Figure 6:
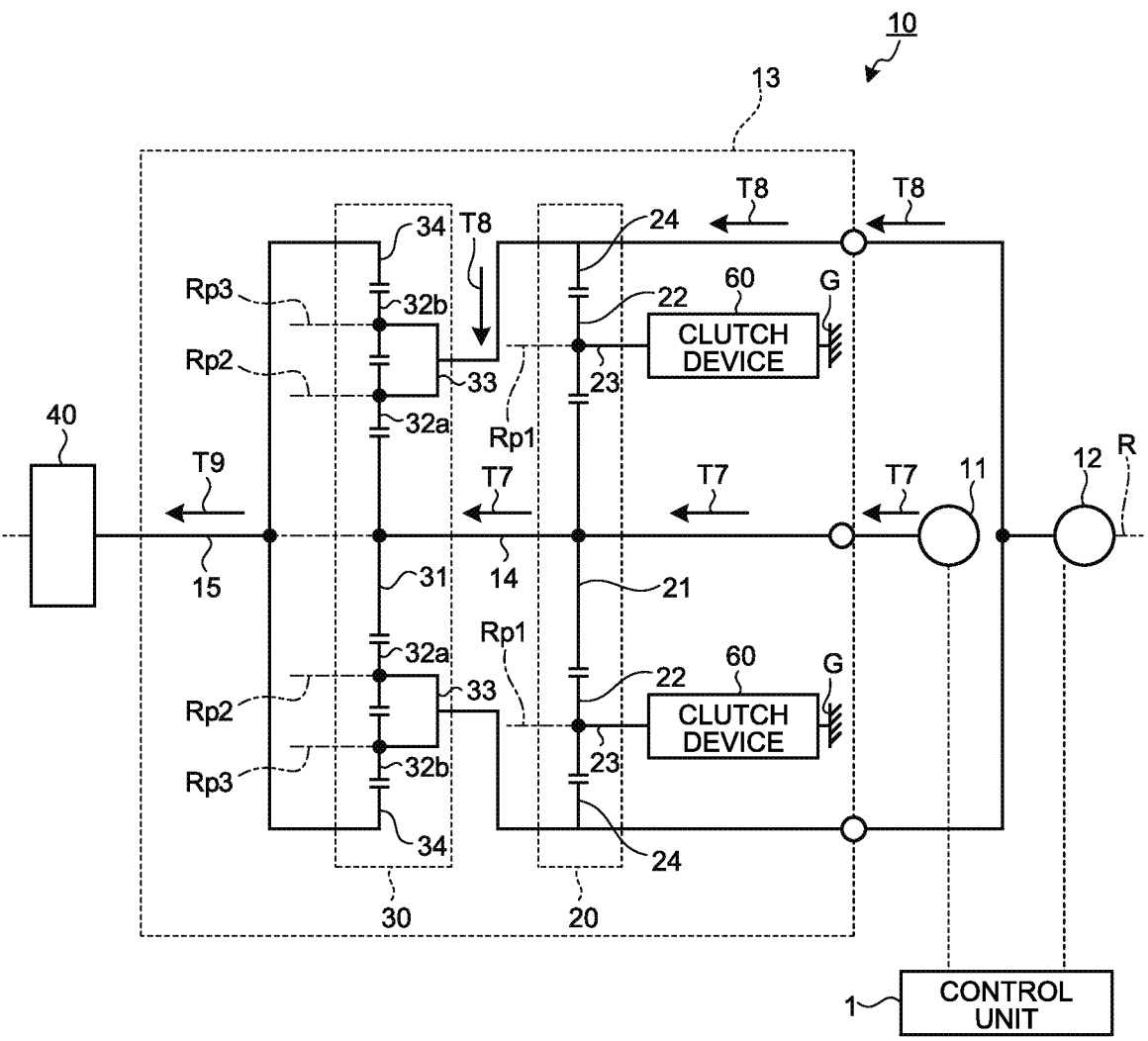
FIG. 6 is a schematic diagram illustrating paths through which torque is transmitted when the electric vehicle drive device according to the first embodiment is in a second state.

FIG. 6 is a schematic diagram illustrating paths in which torque is transmitted when the electric vehicle drive device 10 according to the first embodiment is in the second state. The second state is what is called "high gear state", and the reduction ratio in the transmission mechanism 13 in a power transmission path from the first motor 11 and the second motor 12 to the transmission mechanism input/output shaft 15 can be reduced. Specifically, the torque transmitted to the transmission mechanism input/output shaft 15 is reduced, but friction loss in the transmission mechanism 13 is reduced. In the second state, the magnitudes and directions of torque generated by the first motor 11 and the second motor 12 are equal. The torque output by the first motor 11 in the second state is referred to as "first torque T7", and the torque output by the second motor 12 in the second state is referred to as "second torque T8". Composite torque T9 illustrated in FIG. 6 is torque that is output from the transmission mechanism input/output shaft 15 and transmitted to the reducing mechanism 40.

In the second state, the torque of the first motor 11 is input to the first sun gear 21, and the torque of the second motor 12 is input to the first ring gear 24. In the second state, the clutch device 60 is in the non-braking state. Specifically, in the second state, the first pinion gear 22 can rotate and revolve. In this manner, in the second state, the circulation of torque between the first planetary gear mechanism 20 and the second planetary gear mechanism 30 is interrupted. In the second state, the first carrier 23 can revolve, and hence the first sun gear 21 and the first ring gear 24 can freely rotate relatively.

In the second state, the ratio of the second torque T8 to the first torque T7 is determined by the ratio of the number of teeth of the second ring gear 34 to the number of teeth of the second sun gear 31. The first torque T7 merges with the second torque T8 in the second carrier 33. As a result, the composite torque T9 is transmitted to the second ring gear 34.

The angular velocity of the transmission mechanism input/output shaft 15 is determined by the angular velocity of the second sun gear 31 driven by the first motor 11 and the angular velocity of the second carrier 33 driven by the second motor 12. Thus, even when the angular velocity of the transmission mechanism input/output shaft 15 is constant, the combination of the angular velocity of the first motor 11 and the angular velocity of the second motor 12 can be changed.

As described above, the combination of the angular velocity of the transmission mechanism input/output shaft 15, the angular velocity of the first motor 11, and the angular velocity of the second motor 12 is not uniquely determined. Thus, when the control unit 1 continuously and smoothly controls the angular velocity of the first motor 11 and the angular velocity of the second motor 12, what is called shift shock is reduced even if the state of the transmission mechanism 13 has changed between the first state and the second state.

When the angular velocity of the second sun gear 31 is constant, the angular velocity of the second ring gear 34 becomes slower as the angular velocity of the second carrier 33 becomes faster. As the angular velocity of the second carrier 33 becomes slower, the angular velocity of the second ring gear 34 becomes faster. Thus, the angular velocity of the second ring gear 34 continuously changes depending on the angular velocity of the second sun gear 31 and the angular velocity of the second carrier 33. Consequently, the electric vehicle drive device 10 can continuously change the reduction ratio by changing the angular velocity of the second torque T8 output by the second motor 12.

The electric vehicle drive device 10 has a plurality of combinations of the angular velocity of the first torque T7 output by the first motor 11 and the angular velocity of the second torque T8 output by the second motor 12 when maintaining the angular velocity of the second ring gear 34 constant. Specifically, for example, even when the angular velocity of the first torque T7 output by the first motor 11 changes, the angular velocity of the second torque T8 output by the second motor 12 changes, and hence the angular velocity of the second ring gear 34 is maintained constant. Thus, the electric vehicle drive device 10 can reduce the change amount of the angular velocity of the second ring gear 34 when the first state is switched to the second state. As a result, the electric vehicle drive device 10 can reduce shift shock.

The magnitudes of various kinds of torque in the second state depend on, for example, the throttle information. Specifically, the signal processing unit 2 determines a torque command value of the first motor 11 for the positive rotation direction based on the throttle information. The signal processing unit 2 determines a rotation speed command value including information indicating the rotation direction of the second motor 12 based on the throttle information and the rotation speed of the first motor 11 detected by the first rotation angle detector 91. More specifically, for example, when the rotation speed command value is positive (+), it indicates that the rotation direction of the second motor 12 is the positive rotation direction. When the rotation speed command value is negative (−), on the other hand, it indicates that the rotation direction of the second motor 12 is the reverse rotation direction. As a difference between the positive (+) rotation speed of the first motor 11 and the rotation speed of the second motor 12 becomes larger, the rotation speed of the transmission mechanism input/output shaft 15 increases and the rotation speed of the wheel H increases.

The signal processing unit 2 outputs the torque command value and the rotation speed command value to the inverter 3. The inverter 3 supplies electric power to the first motor 11 and the second motor 12 in accordance with the torque command value and the rotation speed command value, so that the first motor 11 and the second motor 12 operate in accordance with the torque command value and the rotation speed command value. In this manner, when the gear change information indicates the second state, the control unit 1 determines the torque command value of the first motor 11 for the positive rotation direction based on the throttle information and operates the first motor 11 in accordance with the torque command value, and determines the rotation speed command value corresponding to the rotation speed of the first motor 11 detected by the first rotation angle detector 91 serving as a detection unit and operates the second motor 12 in accordance with the rotation speed command value.

The ideal state in the second state is a state in which the rotation direction and the rotation speed of the first motor 11 match the rotation direction and the rotation speed of the second motor 12. Thus, in the second state, by performing the torque control of the first motor 11 and performing the rotation speed control of the second motor 12 in accordance with the rotation speed of the first motor 11, the rotation direction and the rotation speed of the first motor 11 can be matched with the rotation direction and the rotation speed of the second motor 12 without the need of designing a complicated control system for matching the rotation of the second motor 12 with the first motor 11.

Figure 7:
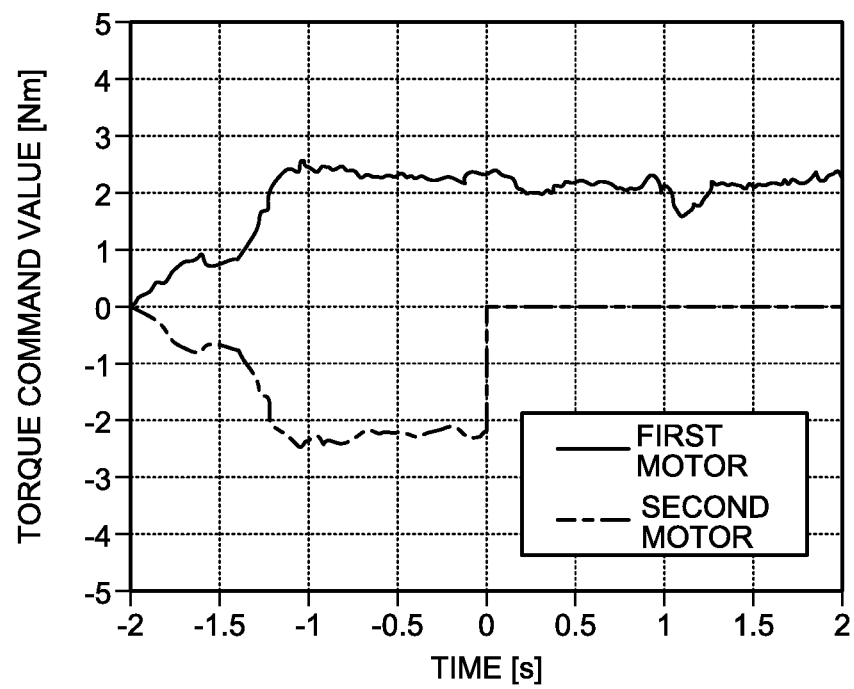
FIG. 7 is a graph illustrating a transition example of torque command values of the first motor and the second motor when the first state is switched to the second state.
Figure 8:
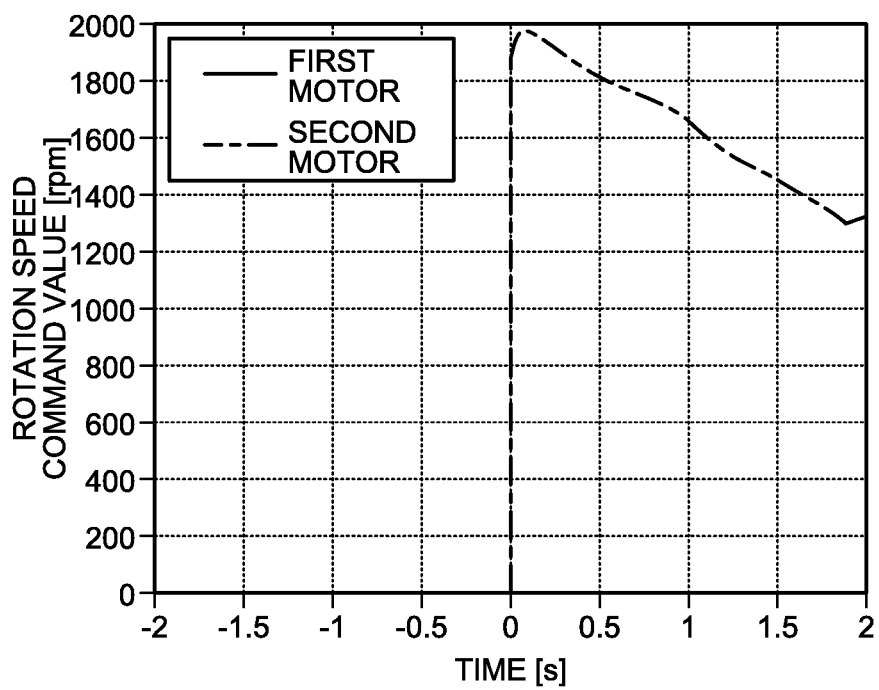
FIG. 8 is a graph illustrating a transition example of rotation speed command values of the first motor and the second motor when the first state is switched to the second state.
Figure 9:
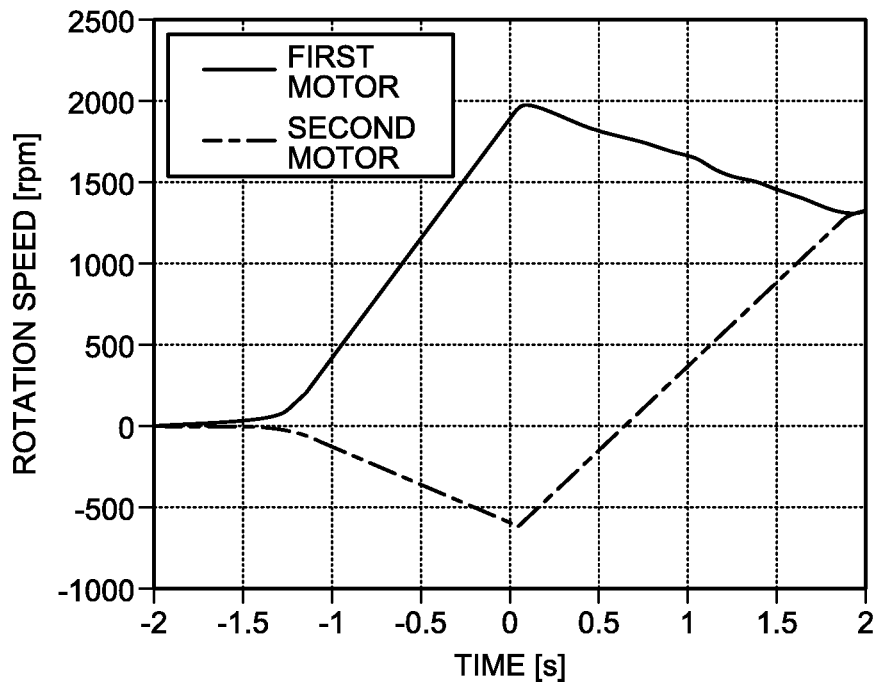
FIG. 9 is a graph illustrating a transition example of rotation speed of the first motor and the second motor when the first state is switched to the second state.
Figure 10:
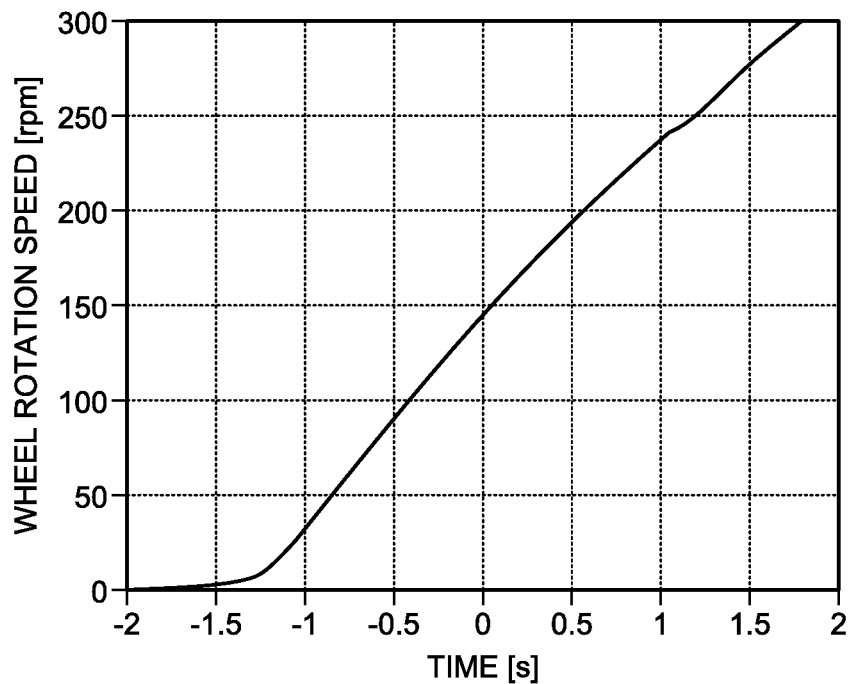
FIG. 10 is a graph illustrating a transition of wheel rotation speed corresponding to the transition of the rotation speed of the first motor and the second motor illustrated in FIG. 9.

FIG. 7 is a graph illustrating a transition example of the torque command values of the first motor 11 and the second motor 12 when the first state is switched to the second state. FIG. 8 is a graph illustrating a transition example of the rotation speed command values of the first motor 11 and the second motor 12 when the first state is switched to the second state. FIG. 9 is a graph illustrating a transition example of the rotation speed of the first motor 11 and the second motor 12 when the first state is switched to the second state. FIG. 10 is a graph illustrating a transition of wheel rotation speed corresponding to the transition of the rotation speed of the first motor 11 and the second motor 12 illustrated in FIG. 9. FIG. 7 to FIG. 10 exemplify the case where the gear change information indicating the first state is switched to the one indicating the second state at the timing at which the horizontal axis (sec) is "0" (first switching timing).

In the examples illustrated in FIG. 7 to FIG. 10, the signal processing unit 2 switches the control of the second motor 12 from torque control to rotation speed control at the first switching timing, and refers to the rotation speed of the first motor 11 detected at that timing by the first rotation angle detector 91 to determine a rotation speed command value for synchronizing the rotation speed of the second motor 12 with the rotation speed of the first motor 11. At the time when the torque direction of the second motor 12 has changed at the first switching timing (see FIG. 6), the braking by the clutch device 60 is released, and the first state is switched to the second state. The rotation speed of the wheel H connected to the electric vehicle drive device 10 does not abruptly fluctuate before and after the switching. In this manner, the electric vehicle drive device 10 changes the gear without shock upon the switching.

Figure 11:
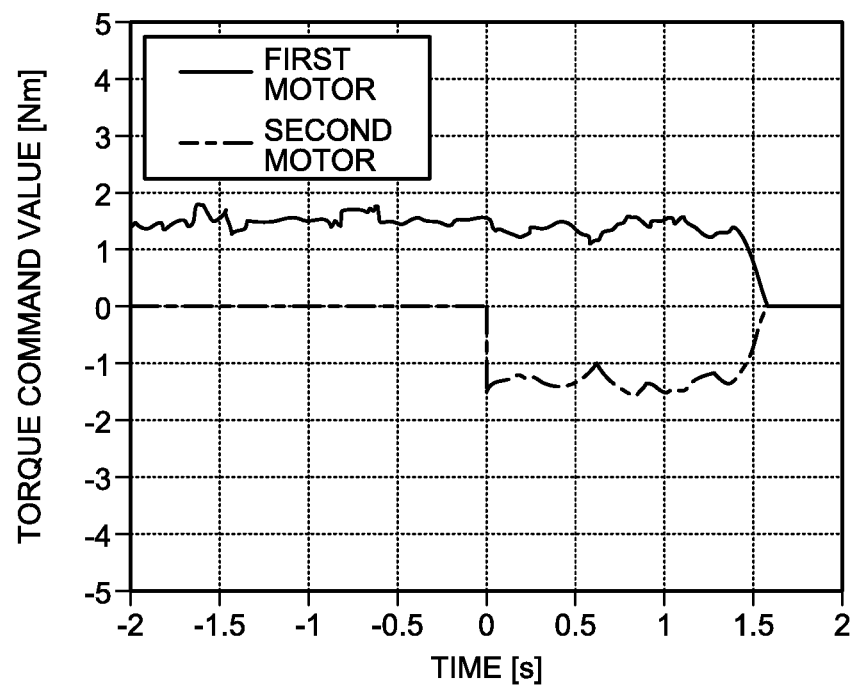
FIG. 11 is a graph illustrating a transition example of torque command values of the first motor and the second motor when the second state is switched to the first state.
Figure 12:
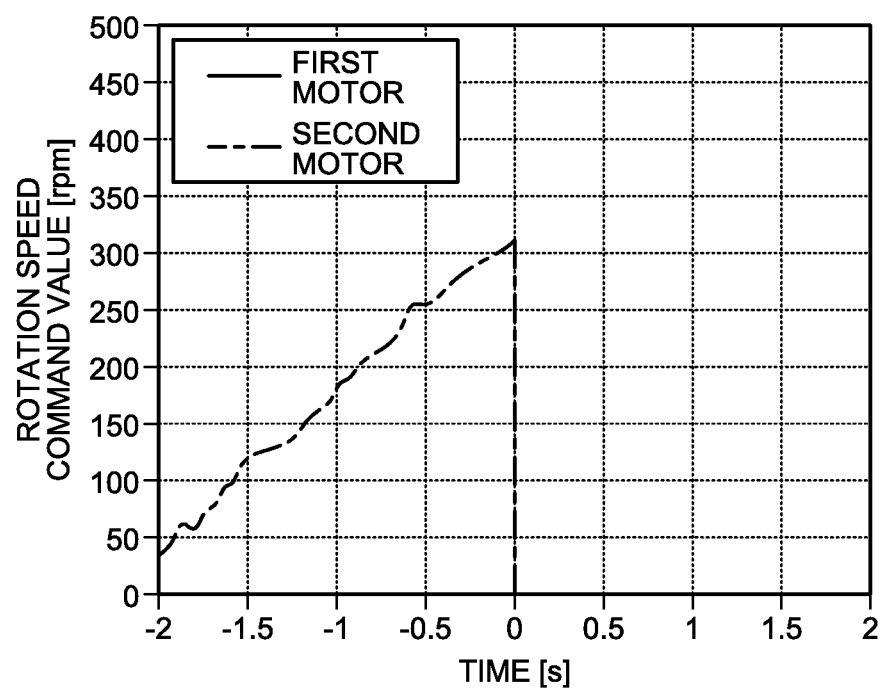
FIG. 12 is a graph illustrating a transition example of rotation speed command values of the first motor and the second motor when the second state is switched to the first state.
Figure 13:
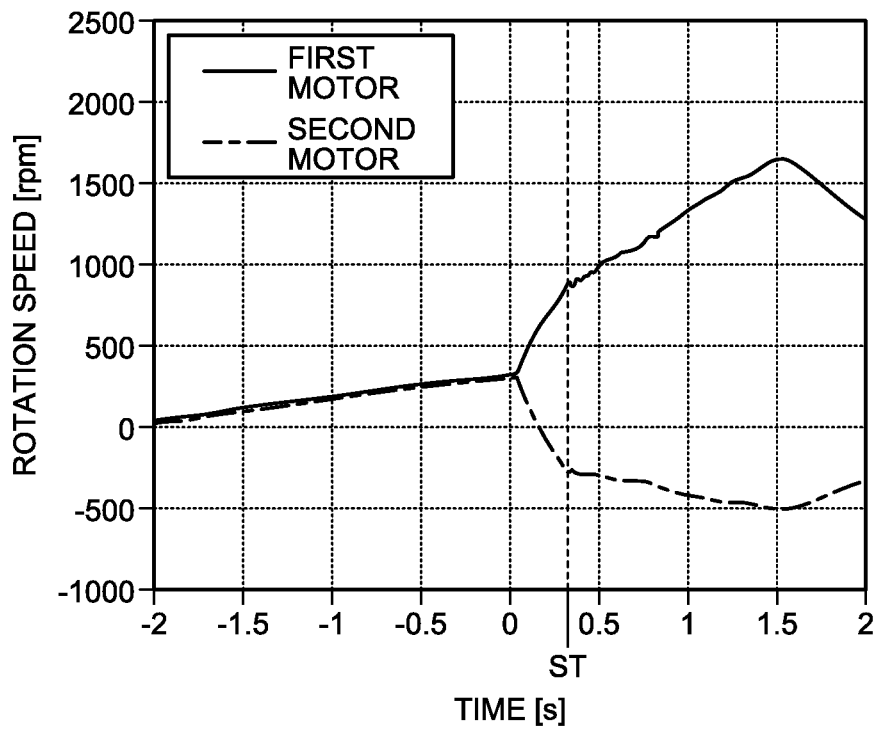
FIG. 13 is a graph illustrating a transition example of rotation speed of the first motor and the second motor when the second state is switched to the first state.
Figure 14:
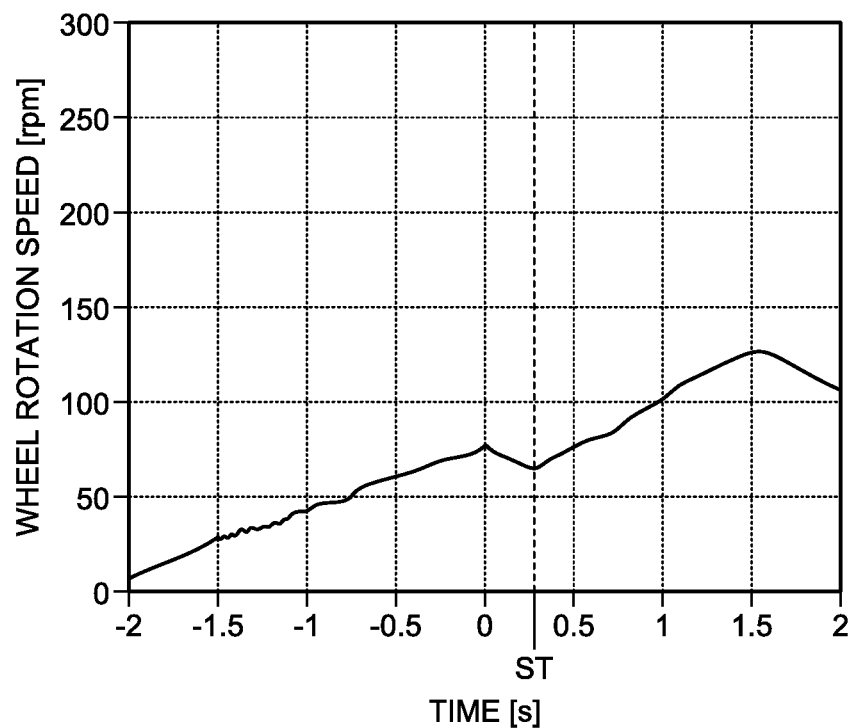
FIG. 14 is a graph illustrating a transition of wheel rotation speed corresponding to the transition of the rotation speed of the first motor and the second motor illustrated in FIG. 13.

FIG. 11 is a graph illustrating a transition example of the torque command values of the first motor 11 and the second motor 12 when the second state is switched to the first state. FIG. 12 is a graph illustrating a transition example of the rotation speed command values of the first motor 11 and the second motor 12 when the second state is switched to the first state. FIG. 13 is a graph illustrating a transition example of the rotation speed of the first motor 11 and the second motor 12 when the second state is switched to the first state. FIG. 14 is a graph illustrating a transition of wheel rotation speed corresponding to the transition of the rotation speed of the first motor 11 and the second motor 12 illustrated in FIG. 13. FIG. 11 to FIG. 14 exemplify the case where the gear change information indicating the second state is switched to the one indicating the first state at the timing at which the horizontal axis (sec) is "0" (second switching timing).

In the examples illustrated in FIG. 11 to FIG. 14, the signal processing unit 2 switches the second motor 12 from rotation speed control to torque control at the second switching timing. At the timing at which the rotation speed of the second motor 12 in the negative direction has reached a given point after the switching to the first state, the braking by the clutch device 60 is caused and the clutch device 60 transitions to the first state. In the example illustrated in FIG. 14, the fluctuation in wheel rotation is observed in a period from the state in which the braking by the clutch device 60 has not occurred before the second switching timing to a timing ST at which the braking by the clutch device 60 occurs after the second switching timing. In this period, the electric vehicle drive device 10 operates in the second state. This is because of inertia of the second motor 12 and because there is a time lag between the input of gear change information and the braking by the clutch device 60. The length of the time can be freely adjusted by controlling the magnitude of the torque command value of the second motor 12 immediately after the switching from the second state to the first state, and the shock during gear change can be suppressed by the adjustment.

Figure 15:
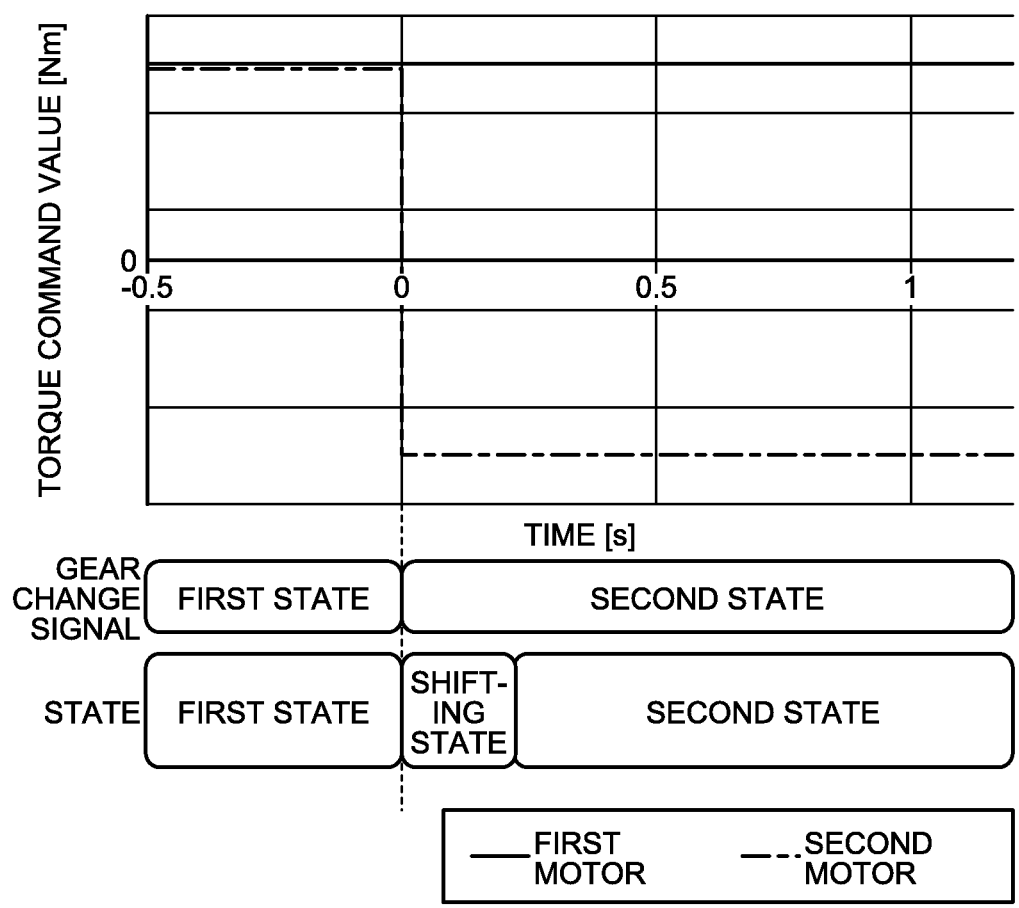
FIG. 15 is a graph illustrating an example of torque command values before and after gear change information is switched from the second state to the first state.
Figure 16:
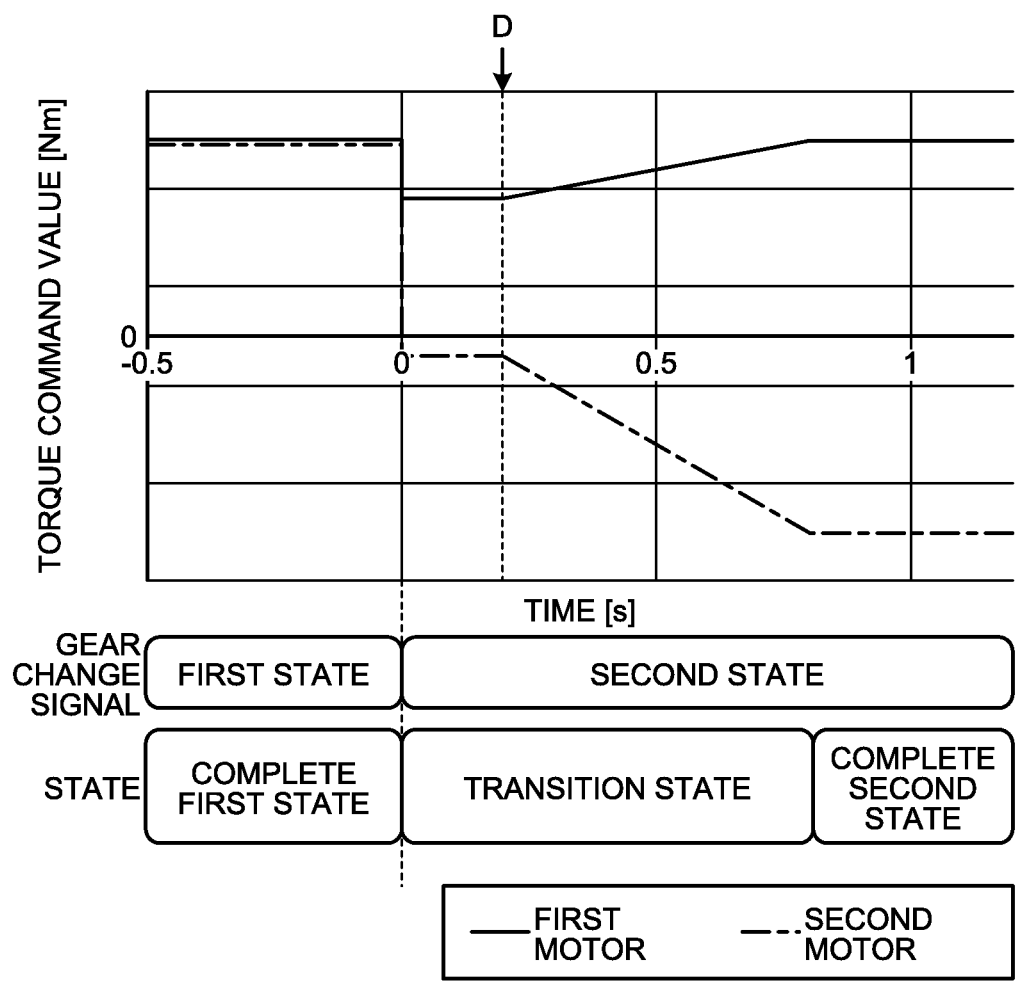
FIG. 16 is a graph illustrating an example of torque command values in the case where transition processing is applied when the gear change information is switched from the second state to the first state.

FIG. 15 is a graph illustrating an example of torque command values before and after the gear change information is switched from the second state to the first state. FIG. 15 and FIG. 16 referred to later are graphs in the case where the accelerator operation amount is constant. The second motor 12 in the second state is subjected to rotation speed control. Thus, the torque command value of the second motor 12 is not output in the period of the second state.

At the timing at which the gear change information is switched from the second state to the first state, the second motor 12 shifts from the speed control to the torque control. In the first state, torque command values calculated for obtaining acceleration corresponding to the accelerator operation amount are output in order to drive the first motor 11 and the second motor 12. The first motor 11 and the second motor 12 are rotationally driven in accordance with the torque command values. In this manner, the clutch device 60 that has been in the non-braking state in the second state shifts to the braking state. Thus, depending on the accelerator operation amount, impact may be caused by force applied to the clutch device 60 at the timing at which the clutch device 60 shifts from the non-braking state to the braking state after the shifting state illustrated in FIG. 15. In a specific example, a roller 63 in the clutch device 60 is engaged with an outer race 62 (see FIG. 53 to FIG. 58) at the timing at which the clutch device 60 becomes the braking state, and impact may be caused due to the engagement. When the clutch device 60 is in the non-braking state, the output torque of the wheel H depends on the torque from the first motor. When the clutch device 60 is in the braking state, on the other hand, the output torque of the wheel H depends on the torque from the first motor 11 and the torque from the second motor 12. In this manner, the output torque of the wheel H increases by the amount of the torque from the second motor at the timing at which the clutch device 60 shifts from the non-braking state to the braking state. For example, when the torque from the first motor 11 and the torque from the second motor 12 are equal, the output torque of the wheel H is doubled when the second state is switched to the first state. When the second state is switched to the first state, the reduction ratio in the reducing mechanism 13 is also switched. Due to the increase in output torque and the change in reduction ratio, the sense of abrupt acceleration may be caused depending on the accelerator operation amount at the timing at which the clutch device 60 shifts from the non-braking state to the braking state.

In view of the above, in the first embodiment, the torque command values of the first motor 11 and the second motor 12 immediately after the gear change information is switched from the second state to the first state are set to values smaller than torque command values simply corresponding to the throttle information. The clutch device 60 is shifted from the non-braking state to the braking state by the rotation of the first motor 11 and the second motor 12 driven with the small torque command values. Without employing torque command values simply corresponding to the throttle information immediately after the clutch device 60 becomes the braking state, the torque command values are gradually increased from the small values so as to be shifted to the torque command values corresponding to the throttle information. In the first embodiment, transition processing described below is performed as processing for calculating such torque command values.

FIG. 16 is a graph illustrating an example of torque command values in the case where the transition processing is applied when the gear change information is switched from the second state to the first state. Timing D in FIG. 16 is timing at which a time (standby time) sufficient for the clutch device 60 to shift from the non-braking state to the braking state without causing impact has elapsed since the rotation direction of the second motor 12 was switched. In the example illustrated in FIG. 16, the electric vehicle drive device 10 shifts from the second state to the first state through the transition state. In the period in the transition state, the signal processing unit 2 performs the transition processing to calculate the torque command values of the first motor 11 and the second motor 12.

In the example illustrated in FIG. 16, at the timing at which the gear change information is switched from the second state to the first state, the signal processing unit 2 decreases the torque of the first motor 11 from the torque in the second state to a predetermined first shift value ($T^t_{MA}$). At this timing, the signal processing unit 2 sets the torque of the second motor 12 to the minimum torque (predetermined second shift value ($T^t_{MB}$)) necessary for the clutch device 60 to be in the braking state. The signal processing unit 2 maintains the first shift value ($T^t_{MA}$) and the second shift value ($T^t_{MB}$)) until the standby time elapses. After the standby time has elapsed, the signal processing unit 2 gradually increases the torque command values of the first motor 11 and the second motor 12. After the gradual increase of the torque, the torque command values of the first motor 11 and the second motor 12 shift to torque command values in the first state corresponding to the accelerator operation amount.

Specifically, the signal processing unit 2 starts the transition processing when the gear change information has been switched from the second state to the first state. In the transition processing, for example, the signal processing unit 2 calculates the first shift value ($T^t_{MA}$) as a torque command value of the first motor 11 in accordance with Equation (1). For example, the signal processing unit 2 calculates the second shift value ($T^t_{MB}$) as a torque command value of the second motor 12 in accordance with Equation (2). $T_S$ in Equation (1) and Equation (2) is a torque command value corresponding to throttle information at the timing at which the gear change information is switched from the second state to the first state. With the combination of $T^t_{MA}$ and $T^t_{MB}$ in Equation (1) and Equation (2), the output torque of the wheel H substantially matches before and after the switching between the second state and the first state.

$$T^t_{MA} = T_S \times 0.7 \tag{1}$$

$$T^t_{MB} = T_S \times 0.1 \tag{2}$$

The signal processing unit 2 maintains the torque command values in Equation (1) and Equation (2) for a predetermined standby time (for example, 0.2 [seconds: s]). After that, the signal processing unit 2 gradually increases a torque command value ($T^{tt}_{MA}$) of the first motor 11 from the first shift value ($T^t_{MA}$) in accordance with Equation (3). The signal processing unit 2 gradually increases a torque command value ($T^{tt}_{MB}$) of the second motor 12 from the second shift value ($T^t_{MB}$) in accordance with Equation (4). "count" in Equation (3) and Equation (4) is the value of a counter set so as to be incremented by 1 every 0.01 [s] from the initial value (for example, 0) immediately after the lapse of the standby time. Regarding the torque command value ($T^{tt}_{MA}$) of the first motor 11 calculated in accordance with Equation (3), the degree of increase of the torque command value corresponding to the increase of "count" by the counter changes depending on a difference between a torque command value ($T_{MA}$) of the first motor 11 corresponding to the throttle information at the time of the calculation and the first shift value ($T^t_{MA}$). Regarding the torque command value ($T^{tt}_{MB}$) of the second motor 12 calculated in accordance with Equation (4), the degree of increase of the torque command value corresponding to the increase of "count" by the counter changes depending on a difference between a torque command value ($T_{MB}$) of the second motor 12 corresponding to the throttle information at the time of the calculation and the second shift value ($T^t_{MB}$). When the torque command value ($T^{tt}_{MA}$) of the first motor 11 and the torque command value ($T^{tt}_{MB}$) of the second motor 12 calculated in accordance with Equation (3) and Equation (4) are equal to or larger than the torque command values ($T_{MA}$, $T_{MB}$) corresponding to the throttle information, the signal processing unit 2 ends the transition processing. After the end of the transition processing, the first motor 11 and the second motor 12 are driven in accordance with the torque command values ($T_{MA}$, $T_{MB}$) corresponding to the throttle information. In other words, after the end of the transition processing, the electric vehicle drive device 10 operates in the first state.

$$T^{tt}_{MA} = (T_{MA} - T^{t}_{MA})/100 \times \text{count} + T^{t}_{MA} \quad (3)$$

$$T^{tt}_{MB} = (T_{MB} - T^{t}_{MB})/100 \times \text{count} + T^{t}_{MB} \quad (4)$$

Through the above-mentioned transition processing, the output torque of the wheel H is maintained constant until the standby time elapses from the second state. In this manner, the impact and the sense of abrupt acceleration at the timing at which the clutch device 60 shifts from the non-braking state to the braking state can be suppressed.

Figure 17:
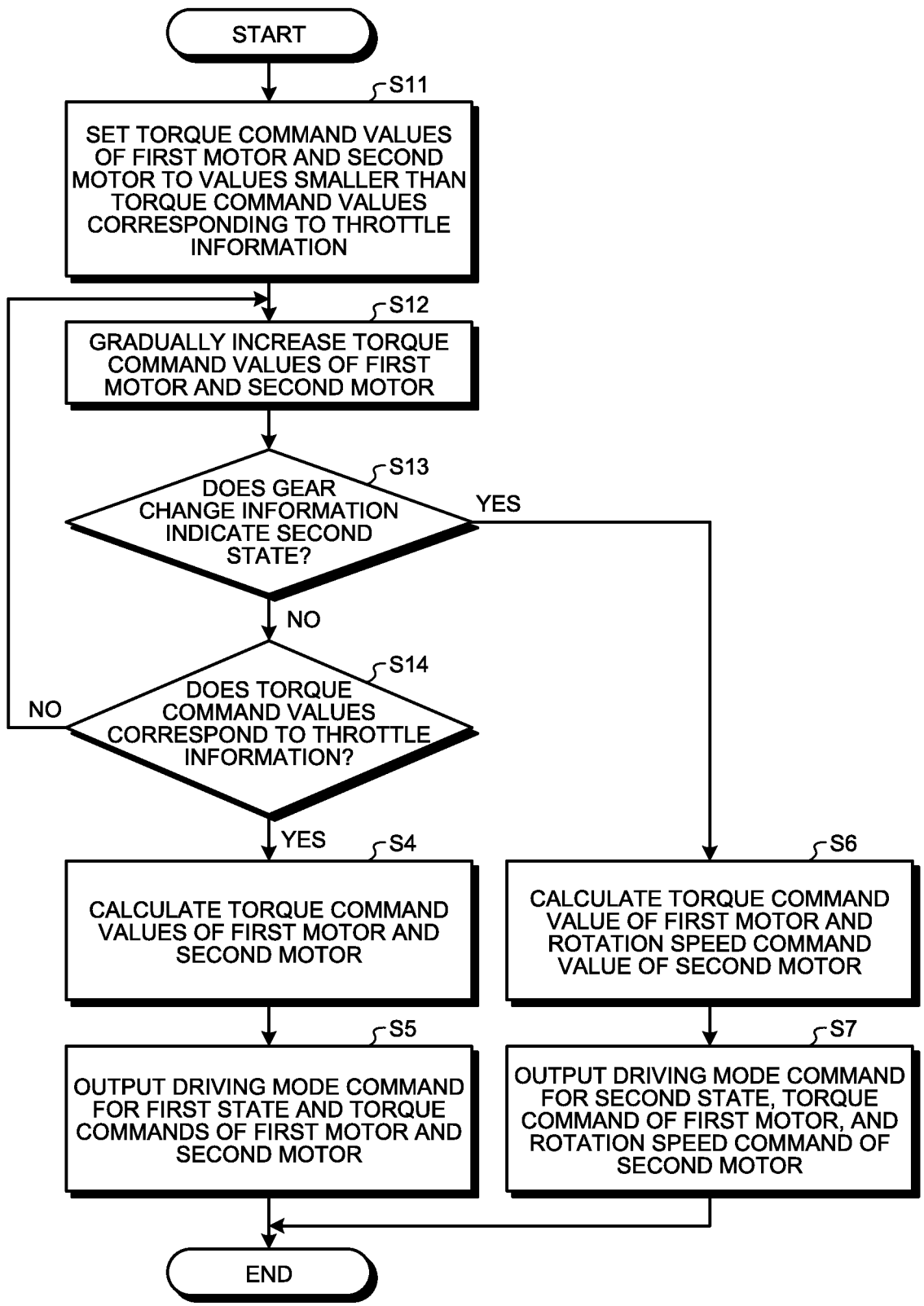
FIG. 17 is a flowchart illustrating the flow of the transition processing.

FIG. 17 is a flowchart illustrating the flow of the transition processing. When the gear change information is switched from the second state to the first state, the first motor 11 and the second motor 12 are both subjected to torque control. Regarding the values of torque commands in this case, the value of the torque command of the second motor 12 needs to be decreased as much as possible such that the output torque of the wheel H is equal to that before the gear change, that is, the second state. Thus, in the transition processing, the signal processing unit 2 sets the torque command values of the first motor 11 and the second motor 12 to values smaller than torque command values simply corresponding to the throttle information (Step S11). Specifically, for example, the signal processing unit 2 maintains a state in which a torque command value for driving the first motor 11 is the first shift value ($T^{t}_{MA}$) and a torque command value for driving the second motor 12 is the second shift value ($T^{t}_{MB}$) until a standby time elapses in accordance with Equation (1) and Equation (2).

After the processing of Step S11, the signal processing unit 2 gradually increases the torque command values for driving the first motor 11 and the second motor 12 (Step S12). Specifically, for example, the signal processing unit 2 gradually increases the torque command values for driving the first motor 11 and the second motor 12 in accordance with Equation (3) and Equation (4).

The processing of Step S12 is continued until the torque command values for driving the first motor 11 and the second motor 12 become the same values as the torque command values in the first state generated by referring to the throttle information unless the gear change information indicates the second state. Specifically, the signal processing unit 2 determines whether the gear change information indicates the second state again after the second state is switched to the first state (Step S13). When it is determined that the gear change information does not indicate the second state again (No at Step S13), the signal processing unit 2 determines whether the torque command values for driving the first motor 11 and the second motor 12 are values corresponding to the throttle information (Step S14). In the processing of Step S14, specifically, for example, the signal processing unit 2 determines whether the torque command values for driving the first motor 11 and the second motor 12 are equal to or larger than the torque command values in the first state generated by referring to the throttle information. When it is determined that the torque command values for driving the first motor 11 and the second motor 12 are smaller than the torque command values in the first state generated by referring to the throttle information (No at Step S14), the processing of Step S12 is continued.

When it is determined that the gear change information indicates the second state again (Yes at Step S13), the flow proceeds to processing similar to Step S6 and Step S7 described above with reference to FIG. 4. When it is determined that the torque command values for driving the first motor 11 and the second motor 12 are equal to or larger than the torque command values in the first state generated by referring to the throttle information (Yes at Step S14), the flow proceeds to processing similar to Step S4 and Step S5 described above with reference to FIG. 4. The flow after proceeding to the processing similar to Step S6 and Step S7 or the processing similar to Step S4 and Step S5 is the same as the flow of the processing described above with reference to FIG. 4.

The control unit 1 controls the operation of the first motor 11 and the second motor 12 in accordance with the flow of processing described above when the gear change information has been switched from the second state to the first state. Consequently, the first state and the second state can be freely switched at desired timing while suppressing shift shock and the sense of abrupt acceleration caused by the above-mentioned impact.

Figure 18:
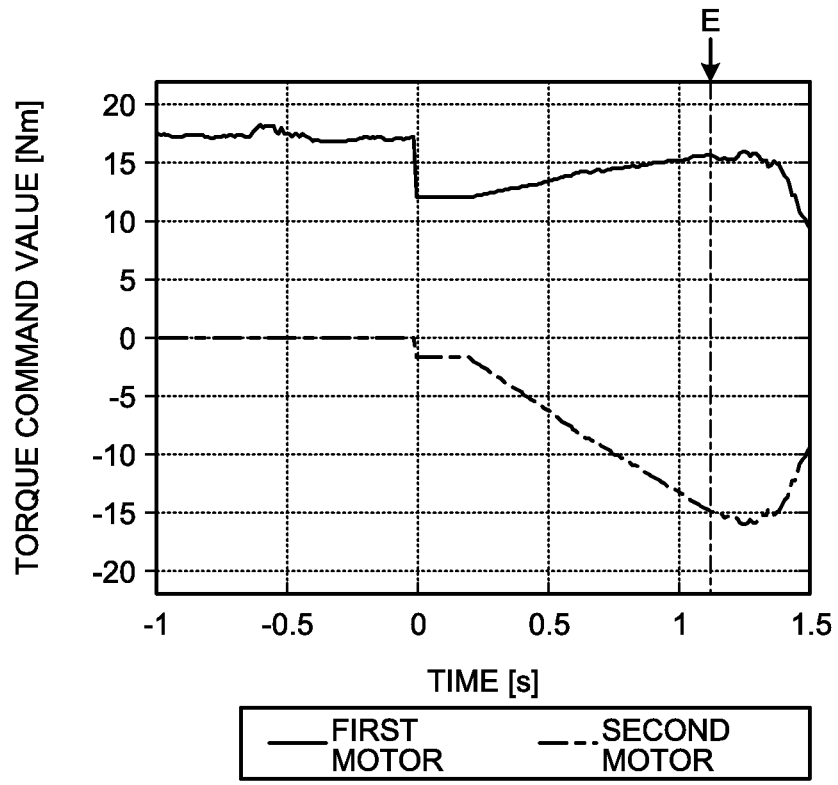
FIG. 18 is a graph illustrating a transition example of torque command values of the first motor and the second motor in the case where the transition processing is applied when the second state is switched to the first state.
Figure 19:
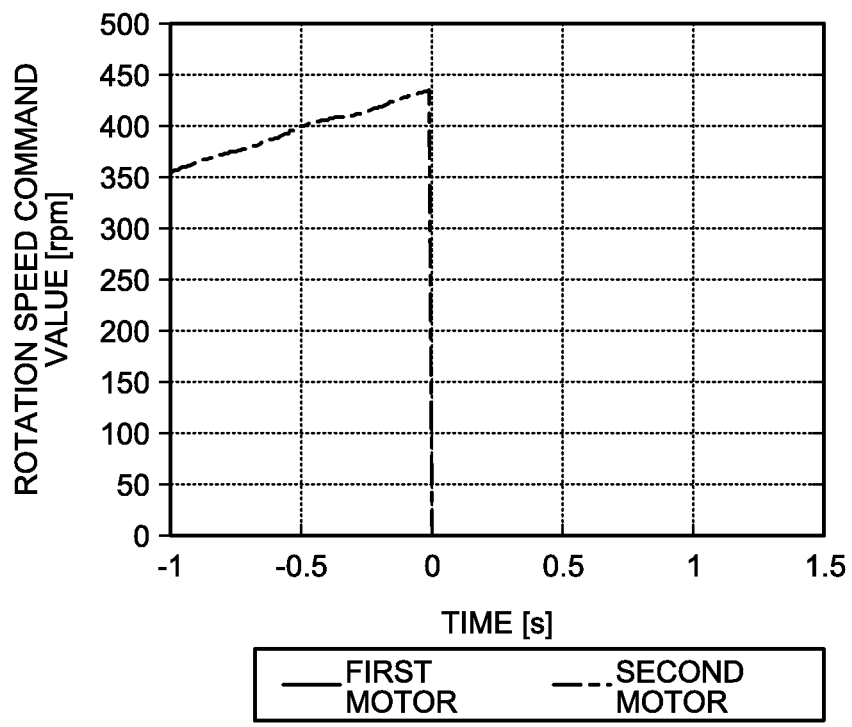
FIG. 19 is a graph illustrating a transition example of rotation speed command values of the first motor and the second motor in the case where the transition processing is applied when the second state is switched to the first state.
Figure 22:
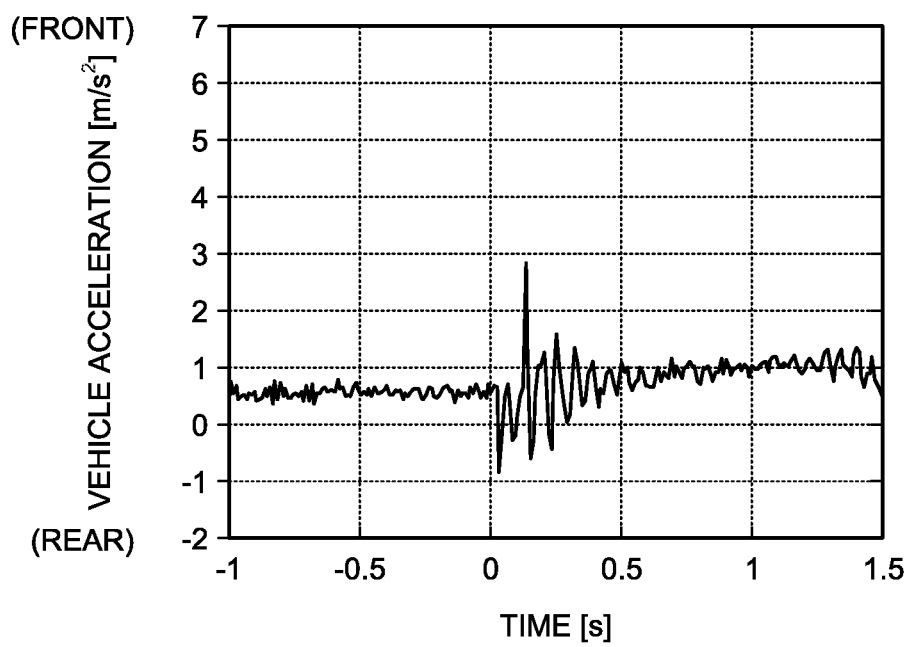
FIG. 22 is a graph illustrating a transition example of vehicle acceleration in the case where the transition processing is applied when the second state is switched to the first state.
Figure 23:
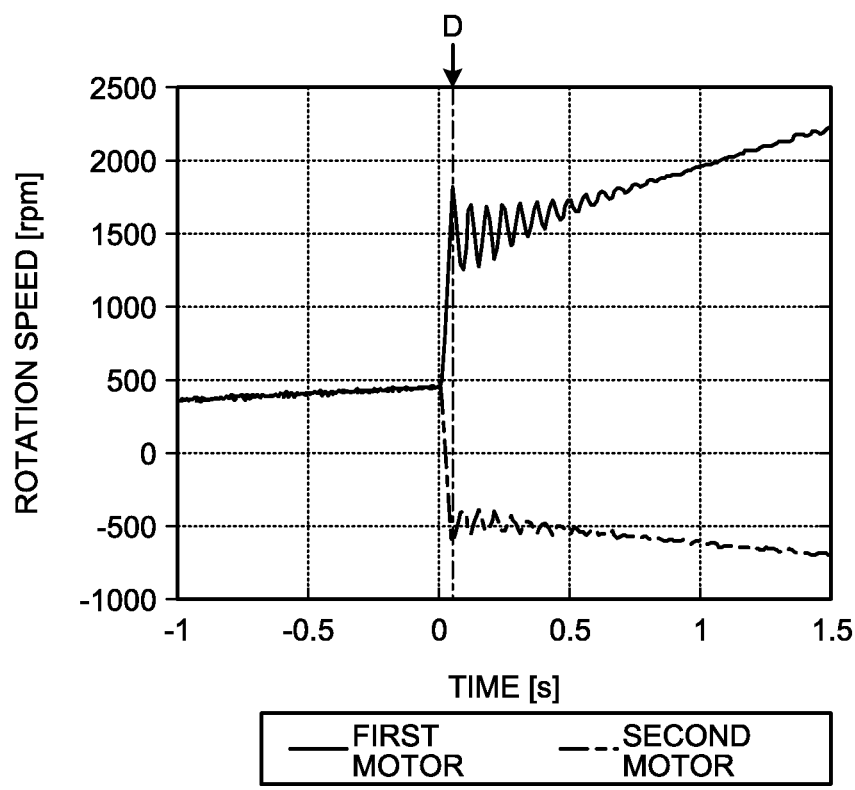
FIG. 23 is a graph illustrating a transition example of rotation speed of the first motor and the second motor in the case where the transition processing is not applied when the second state is switched to the first state.
Figure 24:
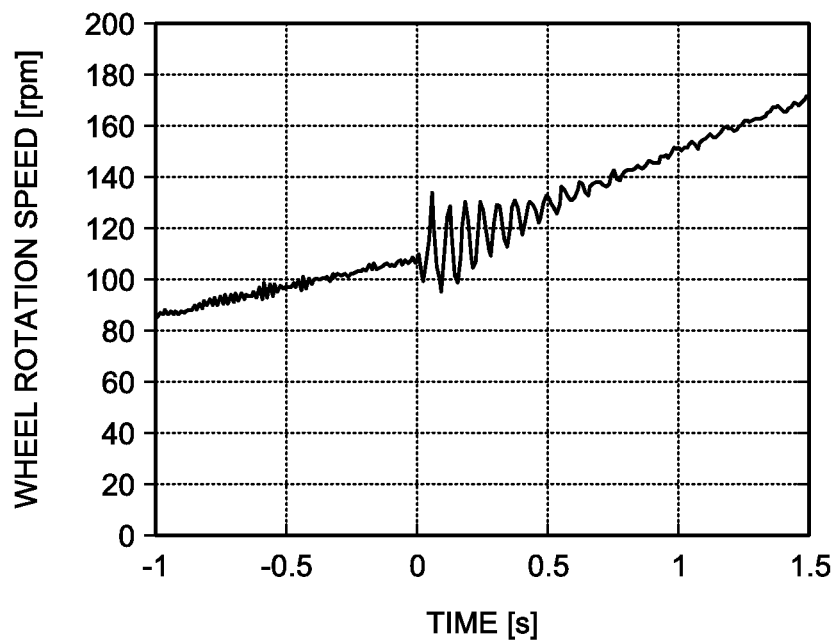
FIG. 24 is a graph illustrating a transition example of wheel rotation speed in the case where the transition processing is not applied when the second state is switched to the first state.
Figure 25:
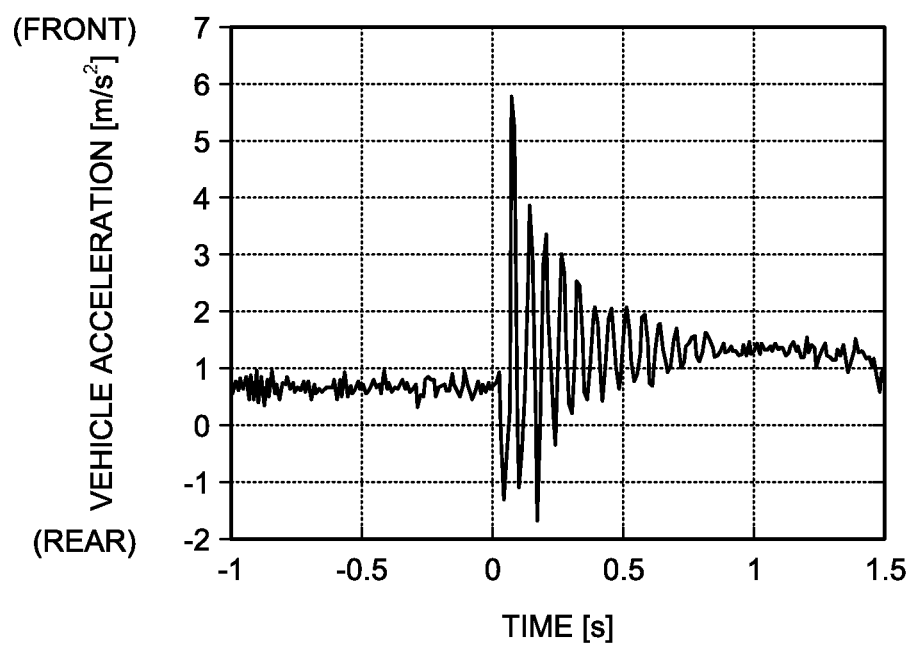
FIG. 25 is a graph illustrating a transition example of vehicle acceleration in the case where the transition processing is not applied when the second state is switched to the first state.

FIG. 18 to FIG. 22 are graphs illustrating transition examples of the torque command values, the rotation speed command values, the rotation speed, the wheel rotation speed, and the vehicle acceleration in the case where the transition processing is applied when the second state is switched to the first state, respectively. FIG. 23 to FIG. 25 are graphs illustrating transition examples of the rotation speed, the wheel rotation speed, and the vehicle acceleration in the case where the transition processing is not applied when the second state is switched to the first state, respectively (see, for example, FIG. 7 and FIG. 8 for the torque command values and the rotation speed command values in the case where the transition processing is not applied). In the examples illustrated in FIG. 18 to FIG. 25, the gear change information is switched from the second state to the first state at the timing of time [s]=0. FIG. 18 illustrates timing E at which the torque command values for driving the first motor 11 and the second motor 12 become values corresponding to torque command values in the first state generated by referring to the throttle information.

At the timing of time [s]=0, the operation control of the second motor 12 is switched from the rotation speed control, which refers to the rotation of the first motor 11, to the torque control. For example, the signal processing unit 2 maintains a state in which a torque command value for driving the first motor 11 is the first shift value ($T^{t}_{MA}$) and a torque command value for driving the second motor 12 is the second shift value ($T^{t}_{MB}$) until a standby time elapses in accordance with Equation (1) and Equation (2). In this manner, the output torque of the wheel H can be substantially matched before and after the switching between the second state and the first state. Even when the clutch device 60 reaches the timing D illustrated in FIG. 20, as illustrated in FIG. 22, the amplitude of vehicle longitudinal acceleration can be suppressed as compared with FIG. 25. Abrupt fluctuation in the wheel rotation speed can also be suppressed as illustrated in FIG. 21. This is because the impact caused when the clutch device 60 shifts from the non-braking state to the braking state is suppressed by decreasing the torque of the second motor 12 immediately after the gear change information is switched from the second state to the first state as much as possible.

In the examples illustrated in FIG. 23 to FIG. 25, on the other hand, after the operation control of the second motor 12 is switched to the torque control, the torque command value is determined in accordance with the throttle information without the transition period. Thus, the clutch device 60 becomes the braking state and shifts to the first state in response to the increase in rotation speed (reverse rotation direction) of the second motor 12 corresponding to the torque command value. In the example illustrated in FIG. 25, the amplitude of vehicle longitudinal acceleration at substantially the same timing as the timing illustrated in FIG. 23 at which the clutch device 60 becomes the braking state (chain line) is larger than that in FIG. 22.

Figure 26:
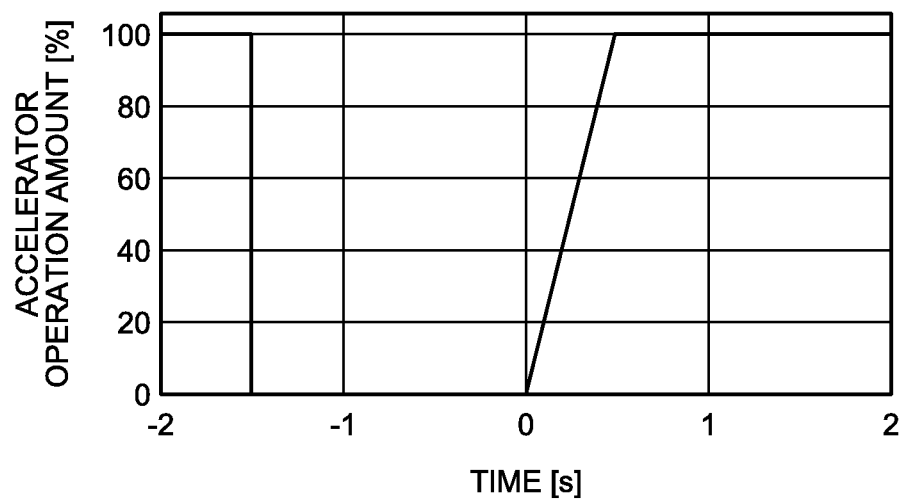
FIG. 26 is a graph illustrating an example of a change pattern of an accelerator operation amount.
Figure 27:
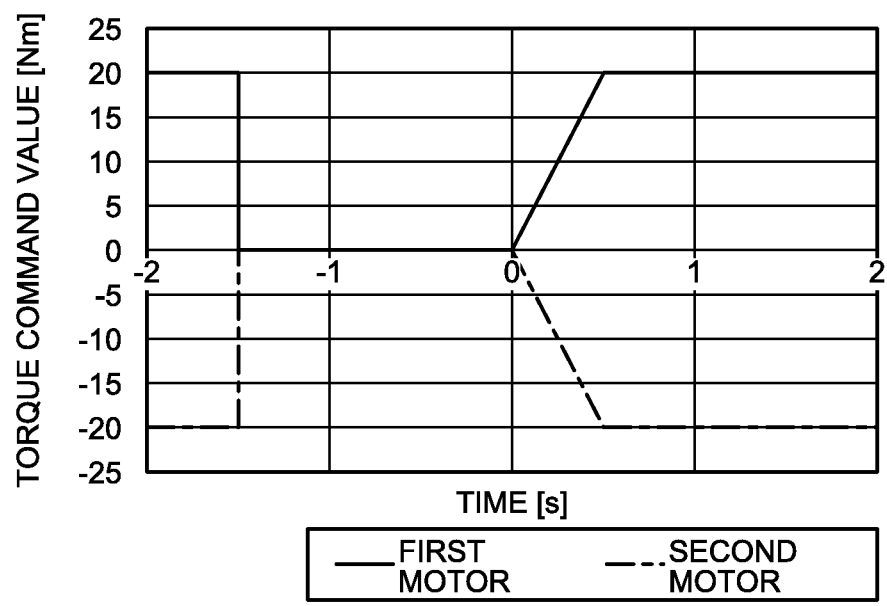
FIG. 27 is a graph illustrating an example in which the torque command values in the first state are simply controlled to follow the change pattern illustrated in FIG. 26.

FIG. 26 is a graph illustrating an example of a change pattern of the accelerator operation amount. FIG. 27 is a graph illustrating an example in which the torque command values in the first state are controlled to simply follow the change pattern illustrated in FIG. 26. The first motor 11 and the second motor 12 in the first state are both subjected to torque control. In the example illustrated in FIG. 27, when the accelerator operation amount is 0 [%], the torque command value is 0 [Nm]. It indicates that when the accelerator operation amount is 0 [%] in the first state, a period during which the second motor 12 does not output torque in the reverse rotation direction occurs. In this period, torque that maintains the clutch device 60 in the braking state is 0 [Nm]. In other words, in this case, braking force for bringing the clutch device 60 into the braking state does not act. When the accelerator operation amount becomes 0 [%] once in the first state and then the accelerator pedal AP is pedaled again, the first motor 11 and the second motor 12 output torque in accordance with the torque command values following the pedaling. In this manner, the torque for maintaining the braking state acts on the clutch device 60. If the torque for maintaining the clutch device 60 in the braking state increases again from 0 [Nm], shock may occur because torque is applied to the clutch device 60. The shock causes rattle noise. In a specific example, at timing at which torque is applied to the clutch device 60, torque is applied such that the roller 63 in the clutch device 60 is engaged with the outer race 62 (see FIG. 53 to FIG. 58), and as a result, shock may occur.

In view of the above, in the first embodiment, the torque command value of the second motor 12 is not set to 0 [Nm] even when the accelerator operation amount becomes 0 [%], that is, when the acceleration indicated by the throttle information becomes 0 [%]. In the first embodiment, a lower limit value of the torque command value of the second motor 12 in the first state is determined in a range in which the clutch device 60 can be maintained to the braking state by the torque from the second motor 12. It is desired that the lower limit value of the torque command value of the second motor 12 in the first state be a value corresponding to the minimum torque necessary for the vehicle not to move forward and necessary for the clutch device 60 to maintain the braking state. In a specific example, the lower limit value of the torque command value of the second motor 12 in the first state is, for example, −2 [Nm]. Symbol of negative (−) of the lower limit value indicates that the lower limit value is a torque command value in the reverse rotation direction.

Figure 28:
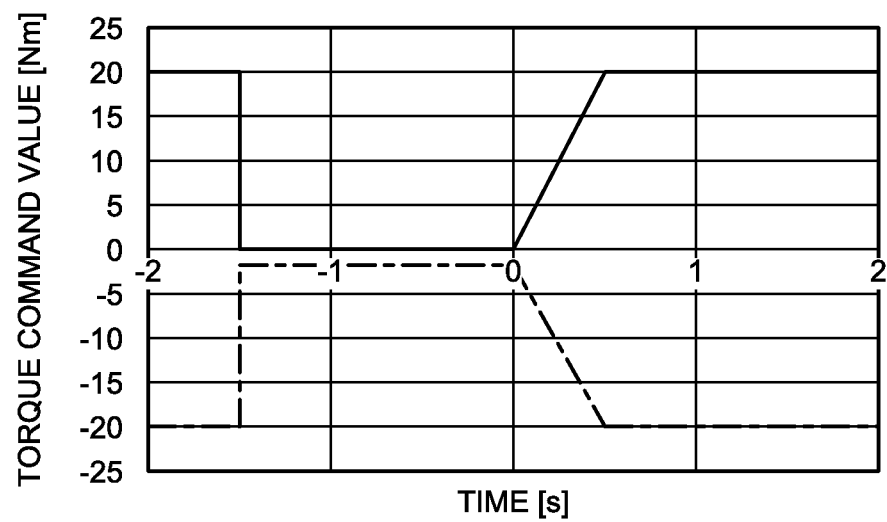
FIG. 28 is a graph illustrating a change pattern example of the torque command values in the first state when a lower limit value of the torque command value of the second motor is determined in a range that can maintain a clutch device 60 in a braking state.
Figure 29:
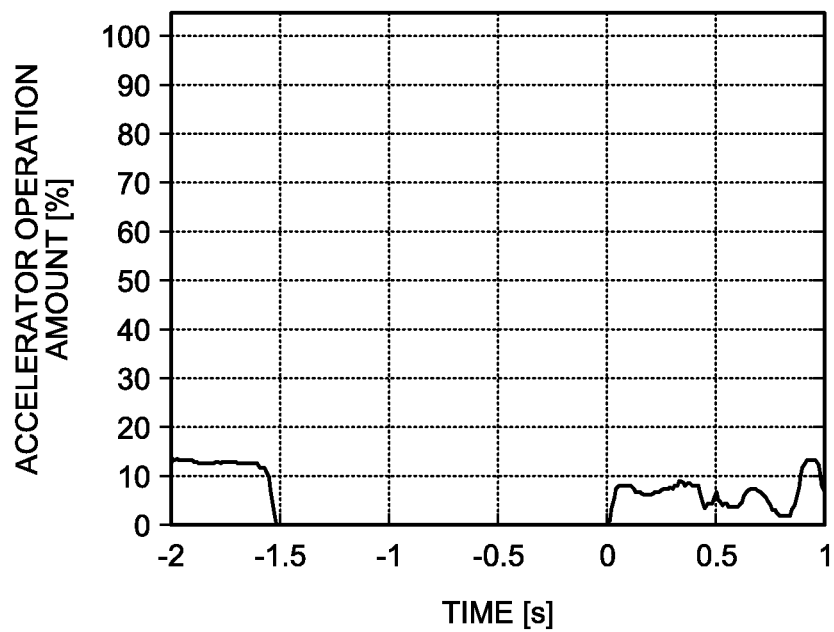
FIG. 29 is a graph illustrating a transition example of the accelerator operation amount when a lower limit value of the torque command value of the second motor in the first state is set.
Figure 30:
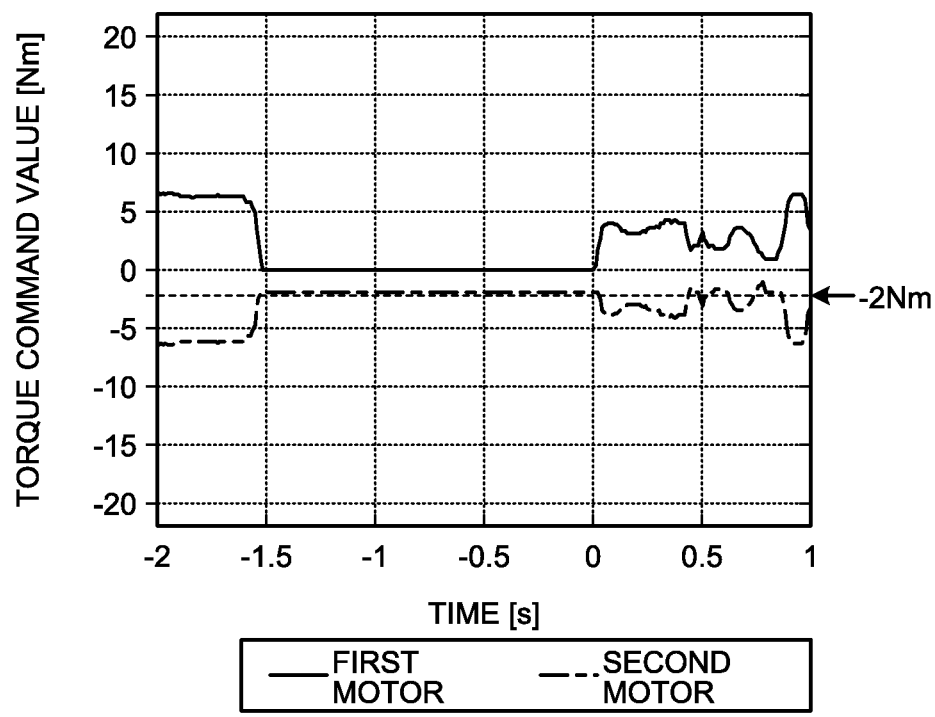
FIG. 30 is a graph illustrating a transition example of torque command values of the first motor and the second motor when the lower limit value of the torque command value of the second motor in the first state is set.

FIG. 28 is a graph illustrating a change pattern example of the torque command values in the first state when the lower limit value of the torque command value of the second motor is determined in the range that can maintain the clutch device 60 in the braking state. In the example illustrated in FIG. 28, in the case where the torque command value of the second motor 12 controlled to simply follow the accelerator operation amount becomes a value closer to 0 [Nm] than the lower limit value (for example, −2 [Nm]), the signal processing unit 2 sets the torque command value of the second motor 12 to the lower limit value. In this manner, the clutch device 60 can be maintained in the braking state even if the braking of the clutch device 60 is lost when the torque command value is controlled to simply follow the throttle information, such as when the accelerator operation amount becomes 0 [%] while the vehicle is traveling in the first state. Consequently, shock and rattle noise caused when the torque that maintains the clutch device 60 in the braking state increases again from 0 [Nm] can be suppressed.

On the other hand, in the case where the torque command value of the second motor 12 controlled to simply follow the accelerator operation amount is equal to or larger than the lower limit value, the signal processing unit 2 sets the torque command values of the first motor 11 and the second motor 12 to values corresponding to the throttle information. Specifically, the signal processing unit 2 sets the absolute value of the torque command value of the first motor 11 for the positive rotation direction and the absolute value of the torque command value of the second motor 12 for the reverse rotation direction to be equal to each other. The torque command value of the first motor 11 in the first state is a value corresponding to the throttle information.

FIG. 29 to FIG. 33 are graphs illustrating transition examples of the accelerator operation amount, the torque command values, the rotation speed, the wheel rotation speed, and the vehicle acceleration when the lower limit value of the torque command value of the second motor 12 in the first state is set, respectively. FIG. 34 to FIG. 38 are graphs illustrating transition examples of the accelerator operation amount, the torque command values, the rotation speed, the wheel rotation speed, and the vehicle acceleration when the lower limit value of the torque command value of the second motor 12 in the first state is not set, respectively. In the examples illustrated in FIG. 29 and FIG. 34, during the traveling in the first state, the accelerator operation amount is set to 0 [%] before the time=0 [s] and thereafter the accelerator operation is restarted at the timing of the time=0 [s] such that the accelerator operation amount exceeds 0 [%].

Figure 31:
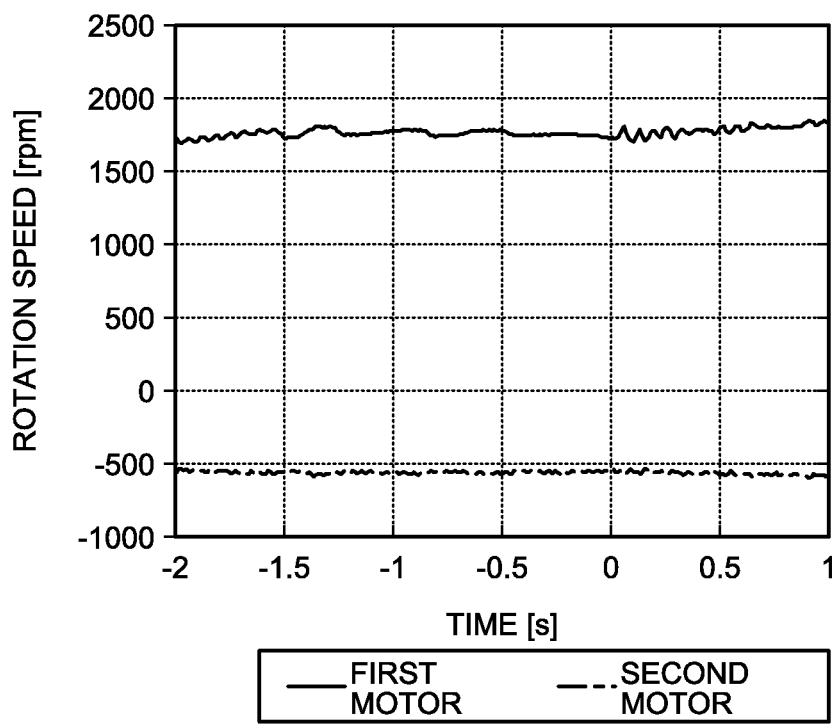
FIG. 31 is a graph illustrating a transition example of the rotation speed of the first motor and the second motor when the lower limit value of the torque command value of the second motor in the first state is set.
Figure 32:
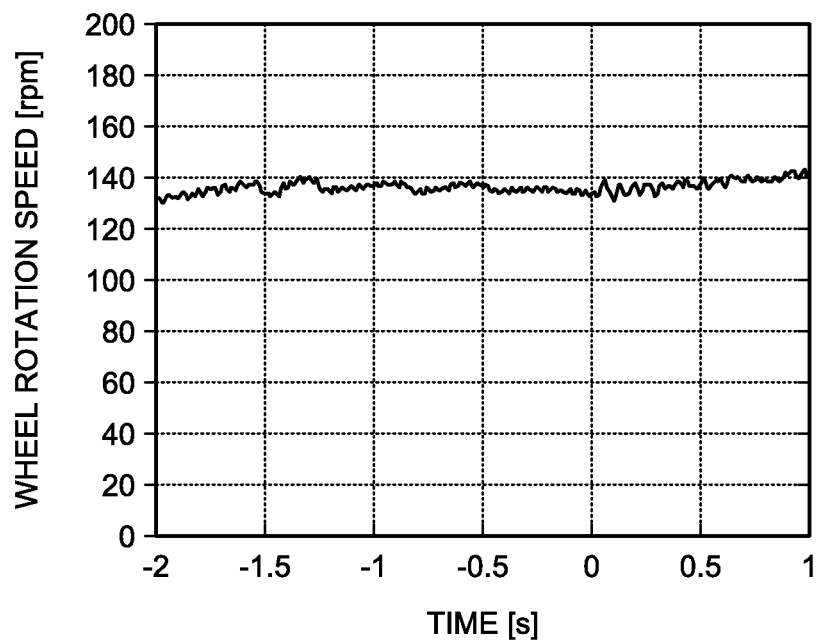
FIG. 32 is a graph illustrating a transition example of the wheel rotation speed when the lower limit value of the torque command value of the second motor in the first state is set.
Figure 33:
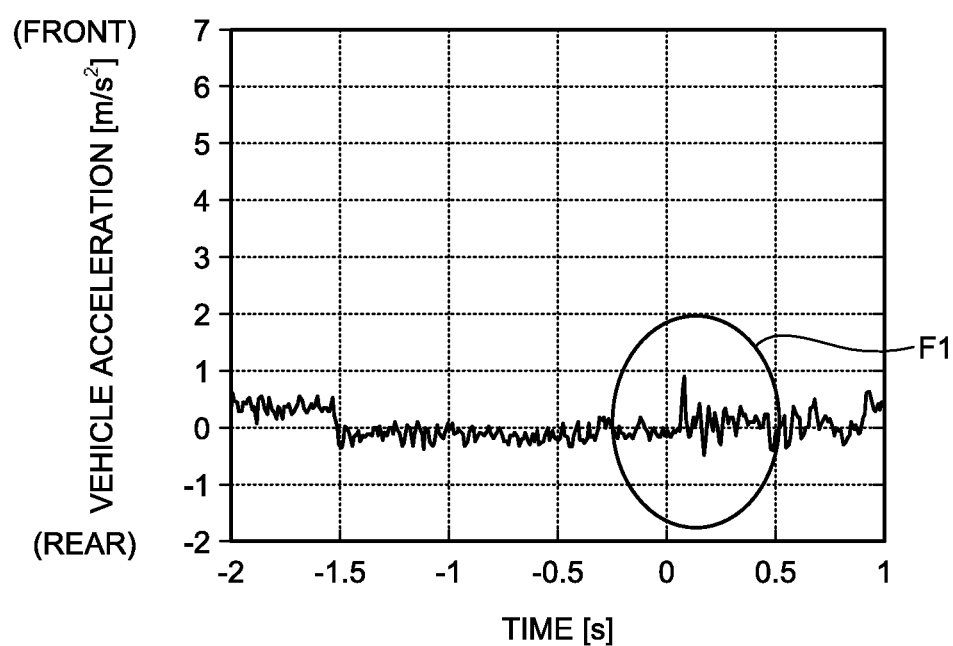
FIG. 33 is a graph illustrating a transition example of the vehicle acceleration when the lower limit value of the torque command value of the second motor in the first state is set.
Figure 34:
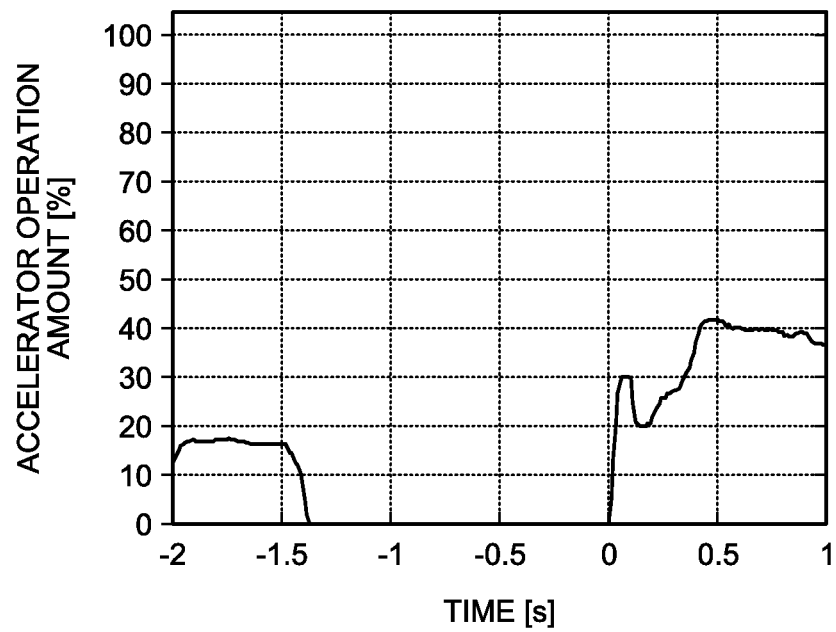
FIG. 34 is a graph illustrating a transition example of the accelerator operation amount when the lower limit value of the torque command value of the second motor in the first state is not set.
Figure 35:
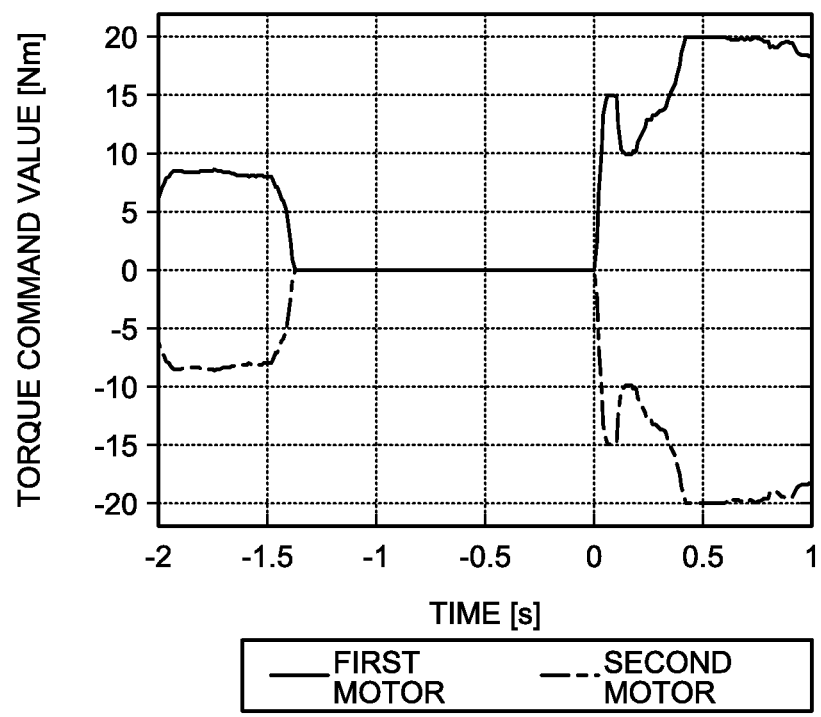
FIG. 35 is a graph illustrating a transition example of the torque command values of the first motor and the second motor, the rotation speed, the wheel rotation speed, and the vehicle acceleration when the lower limit value of the torque command value of the second motor in the first state is not set.
Figure 36:
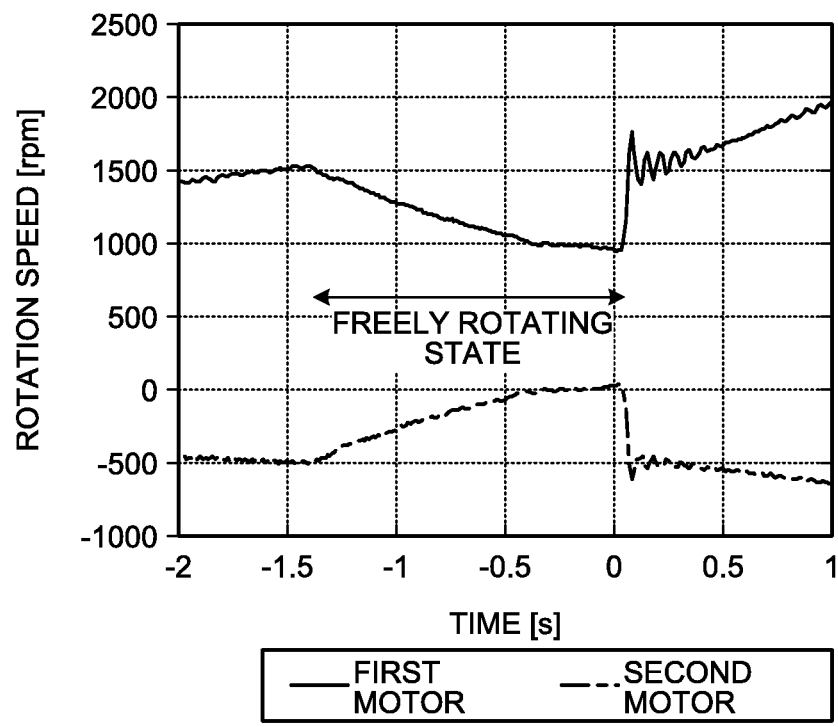
FIG. 36 is a graph illustrating a transition example of the rotation speed of the first motor and the second motor when the lower limit value of the torque command value of the second motor in the first state is not set.

In the examples illustrated in FIG. 29 to FIG. 33, when the accelerator operation amount becomes 0 [%], the torque command value of the first motor 11 becomes 0 [Nm]. On the other hand, the torque command value of the second motor 12 becomes a lower limit value (for example, −2 [Mn]). In this manner, in the period during which the accelerator operation amount is 0 [%], the rotation speed of the first motor 11 and the second motor 12 is maintained to have a constant rotation ratio as illustrated in FIG. 31. In other words, in the examples illustrated in FIG. 29 to FIG. 33, the clutch device 60 is maintained in the braking state in the period during which the accelerator operation amount is 0 [%]. Thus, even when the accelerator operation is restarted thereafter such that the accelerator operation amount exceeds 0 [%], the above-mentioned shock and rattle noise can be suppressed because the clutch device 60 is maintained in the braking state before the restart of the accelerator operation. The wheel rotation speed can be more stabilized by the suppression of the shock. As indicated by the waveform in a region F1 in FIG. 33, the amplitude of acceleration caused by the restart of the accelerator operation can also be suppressed.

Figure 37:
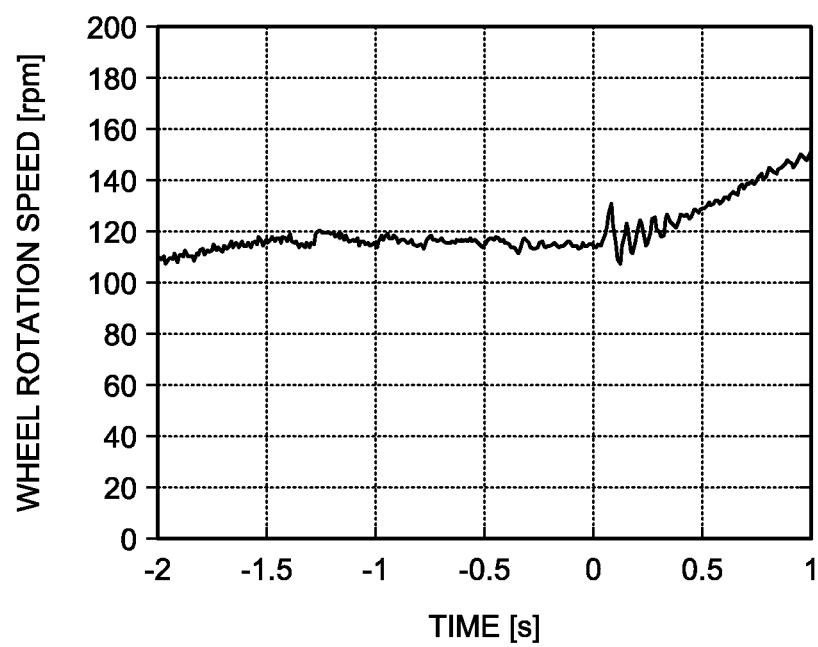
FIG. 37 is a graph illustrating a transition example of the wheel rotation speed when the lower limit value of the torque command value of the second motor in the first state is not set.
Figure 38:
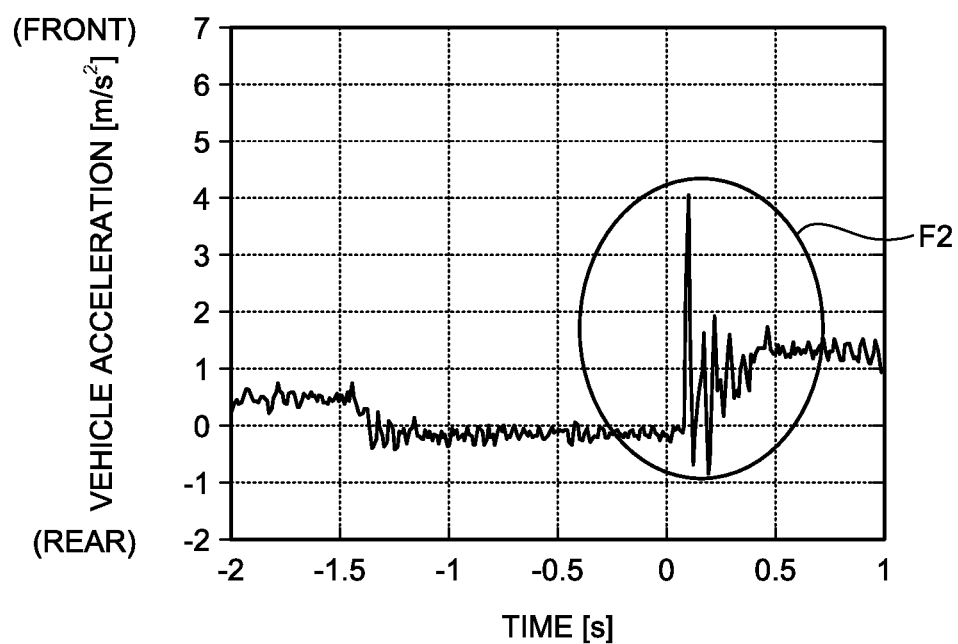
FIG. 38 is a graph illustrating a transition example of the vehicle acceleration when the lower limit value of the torque command value of the second motor in the first state is not set.

On the other hand, in the examples illustrated in FIG. 34 to FIG. 38, in the period during which the accelerator operation amount is 0 [%], the torque command values of the first motor 11 and the second motor 12 are 0 [Nm]. Thus, in the period during which the accelerator operation amount is 0 [%], the first motor 11 and the second motor 12 are in the free rotation state, and the torque for maintaining the clutch device 60 in the braking state cannot be obtained. If the accelerator operation is restarted thereafter such that the accelerator operation amount exceeds 0 [%], torque for bringing the clutch device 60 into the braking state acts and the above-mentioned shock or rattle noise may occur. As illustrated in FIG. 37, the degree of change in wheel rotation speed caused by the shock is larger than that in FIG. 32. As indicated by the waveform in a region F2 in FIG. 38, the amplitude of acceleration caused by the restart of the accelerator operation is also larger than that of the waveform in the region F1 in FIG. 33.

The transition processing described above with reference to FIG. 15 to FIG. 25 and the setting of the lower limit value of the torque command value of the second motor 12 in the first state described above with reference to FIG. 26 to FIG. 38 can be performed in parallel. In the first embodiment described above with reference to the figures up to FIG. 38, the transition processing and the lower limit value of the torque command value of the second motor 12 in the first state are both employed.

Second Embodiment

Next, a second embodiment as one mode for embodying the present invention is described in regard to matters different from the first embodiment. Matters not particularly described in the second embodiment are the same as in the first embodiment.

Figure 39:
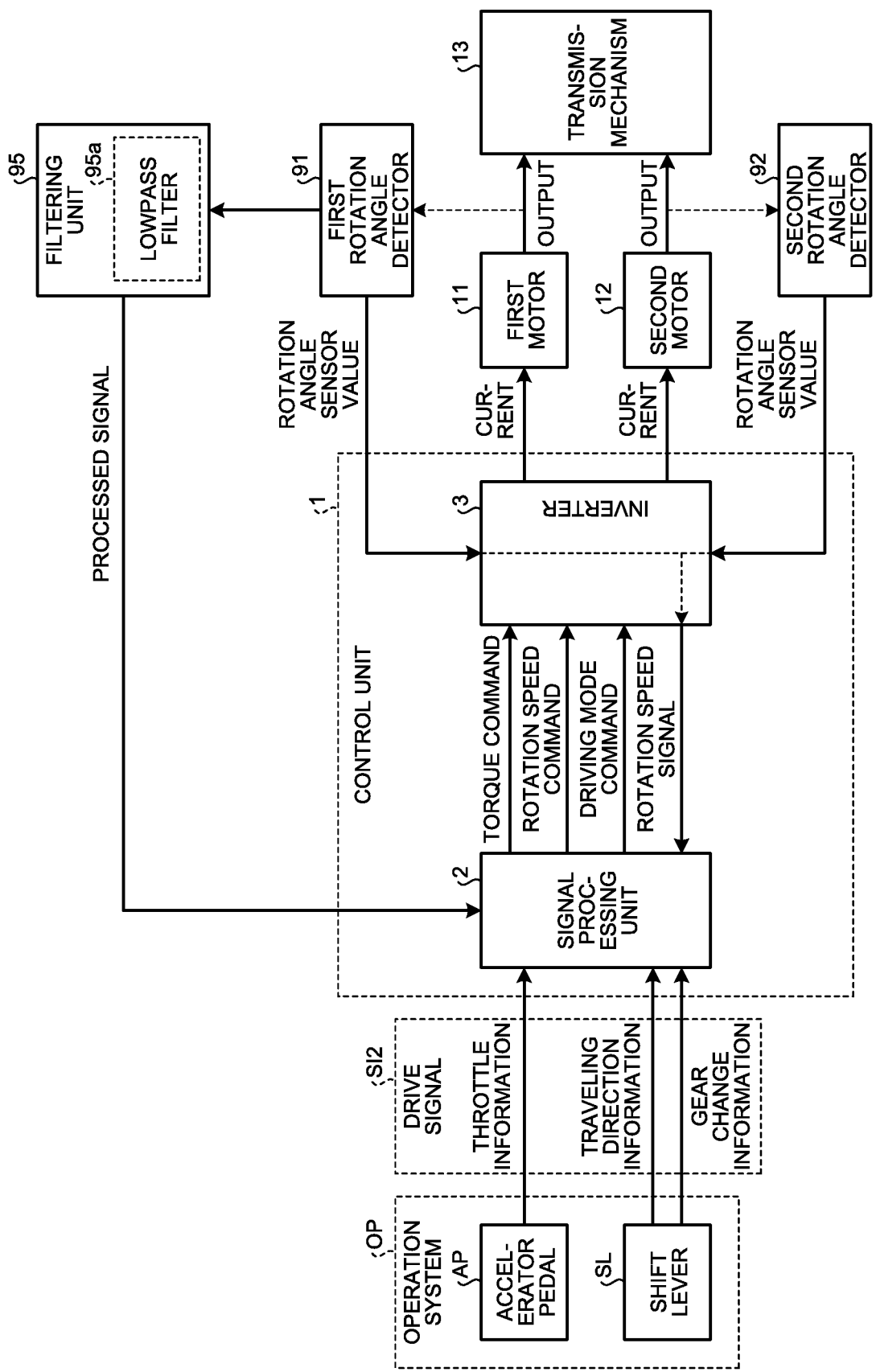
FIG. 39 is a schematic diagram illustrating the relation among an operation system, a control unit, a first motor, a second motor, a transmission mechanism, a first rotation angle detector, and a second rotation angle detector according to a second embodiment.

FIG. 39 is a schematic diagram illustrating an example of the relation among an operation system OP, a control unit 1, a first motor 11, a second motor 12, a transmission mechanism 13, a first rotation angle detector 91, and a second rotation angle detector 92 according to the second embodiment. An electric vehicle drive device 10 in the second embodiment is provided with a filtering unit 95 configured to converge an increase/decrease amount of rotation speed of the first motor 11 detected by the first rotation angle detector 91.

A drive signal SI2 includes traveling direction information serving as information indicating a rotation direction of a wheel H, gear change information, and throttle information. For example, the traveling direction information is information specified depending on the traveling direction of an electric vehicle determined by a shift lever SL. Specifically, when the position of the shift lever SL is reverse (R), the electric vehicle is operated to move backward, and when the position of the shift lever SL is not parking (P) or reverse (R), the electric vehicle is operated to move forward. The traveling direction information is information obtained depending on the position of the shift lever SL.

Examples of the information indicated by the position of the shift lever SL include information obtained depending on whether the position of the shift lever SL is low gear (L).

The gear change information serves as information indicating a first state in which a second motor 12 is controlled based on torque or a second state in which the second motor 12 is controlled based on rotation speed in the case where the drive signal SI2 includes information that instructs the wheel H to rotate in the positive rotation direction. Specifically, the case where the drive signal SI2 includes information that instructs the wheel H to rotate in the positive rotation direction refers to a case where the electric vehicle moves forward, and corresponds to the cases where the position of the shift lever SL is not parking (P) or reverse (R) in the second embodiment.

In the description of the second embodiment with reference to FIG. 39, the traveling direction information and the gear change information are distinguished from each other. However, the gear change information may include the traveling direction information. For example, only the case where the shift lever SL is set to "R" and the gear change information is "backward movement" may be regarded as a case where the traveling direction information indicates "backward movement", and the other cases may be regarded as a case where the traveling direction information indicates "forward movement".

FIG. 40 is a table illustrating an example of the correspondence relation among a driving mode determined by the traveling direction information and the gear change information, control of the first motor 11 and the second motor 12 by the control unit 1, the state of the clutch device 60 provided by the control, torque of the electric vehicle drive device 10, and a rotation direction of the transmission mechanism input/output shaft 15 according to the second embodiment.

The control unit 1 applies torque control to the first motor 11 and the second motor 12 when the traveling direction information indicates the rotation of the wheel H in the positive rotation direction (forward movement) and the gear change information indicates the first state.

The control unit 1 applies torque control to the first motor 11 and applies rotation speed control to the second motor 12 when the traveling direction information indicates the rotation of the wheel H in the positive rotation direction (forward movement) and the gear change information indicates the second state.

The control unit 1 applies rotation speed control to the first motor 11 and the second motor 12 when the traveling direction information indicates the rotation of the wheel H in the reverse rotation direction (backward movement). The control unit 1 sets the rotation direction of the first motor 11 to the reverse rotation direction, and sets the rotation direction of the second motor 12 to the positive rotation direction. In this case, the clutch device 60 is in the non-braking state.

Figure 41:
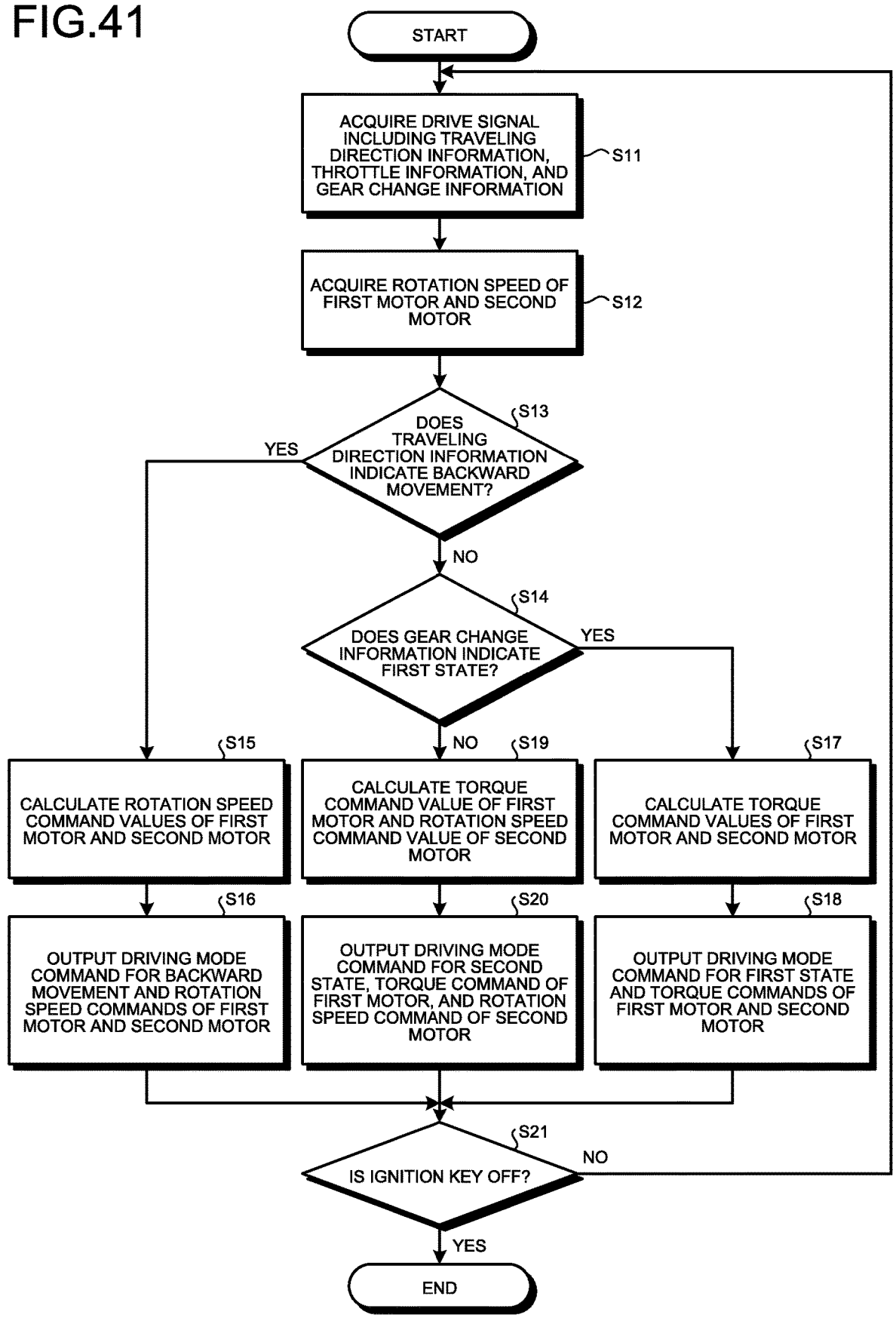
FIG. 41 is a flowchart illustrating a branch example of the control of the first motor and the second motor by the control unit according to the second embodiment.

FIG. 41 is a flowchart illustrating a branch example of the control of the first motor 11 and the second motor 12 by the control unit 1 according to the second embodiment. The control unit 1 acquires a drive signal SI2 including traveling direction information, throttle information, and gear change information (Step S11). Specifically, for example, a signal processing unit 2 acquires the drive signal SI2 including the traveling direction information, the throttle information, and the gear change information based on an accelerator operation amount and an operation position of the shift lever SL determined in accordance with operation by a driver of the electric vehicle performed through the operation system OP such as the accelerator pedal AP and the shift lever SL. The control unit 1 acquires information indicating the rotation speed of the first motor 11 and the second motor 12 (Step S12). Specific contents of the processing of Step S12 are the same as specific contents of the processing of Step S2 in the first embodiment.

The control unit 1 performs processing corresponding to a driving mode indicated by the gear change information included in the drive signal SI2. Specifically, for example, as illustrated in FIG. 41, the control unit 1 branches the processing depending on whether the traveling direction information indicates backward movement (Step S13) and whether the gear change information indicates the first state (Step S14) when the traveling direction information does not indicate backward movement (No at Step S13), thereby performs the processing corresponding to the driving mode indicated by the gear change information. The processing of Step S13 and the processing of the Step S14 are performed in no particular order. One of the processing of Step S13 and the processing of Step S14 may be a determination as to whether the gear change information indicates the second state. The specific determination contents can be freely determined as long as the processing can be branched depending on the driving mode indicated by the gear change information.

When the traveling direction information indicates backward movement (Yes at Step S13), the control unit 1 calculates rotation speed command values of the first motor 11 and the second motor 12 based on the throttle information (Step S15). Specifically, for example, the signal processing unit 2 calculates the rotation speed command values of the first motor 11 and the second motor 12. After that, the control unit 1 outputs a driving mode command for backward movement and rotation speed commands of the first motor 11 and the second motor 12 (Step S16). Specifically, the signal processing unit 2 outputs the driving mode command and the rotation speed commands to the inverter 3. The inverter 3 supplies electric power corresponding to the commands to the first motor 11 and the second motor 12, so that currents corresponding to the commands flow through the first motor 11 and the second motor 12.

When the gear change information indicates the first state (Yes at Step S14), the control unit 1 calculates torque command values of the first motor 11 and the second motor 12 based on the throttle information (Step S17). After that, the control unit 1 outputs a driving mode command for the first state and torque commands of the first motor 11 and the second motor 12 (Step S18). Specific contents of the processing of Step S17 and the processing of Step S18 are the same as specific contents of the processing of Step S4 and the processing of Step S5 in the first embodiment.

When the gear change information does not indicate the first state (No at Step S14), the control unit 1 calculates a torque command value of the first motor 11 and a rotation speed command value of the second motor 12 based on the throttle information (Step S19). After that, the control unit 1 outputs a driving mode command for the second state, a torque command of the first motor 11, and a rotation speed command of the second motor 12 (Step S20). Specific contents of the processing of Step S19 and the processing of Step S20 are the same as specific contents of the processing of Step S6 and the processing of Step S7 in the first embodiment. The processing from Step S11 to Step S20 is repeatedly performed unless an ignition key provided to the electric vehicle is Off (No at Step S21). When the ignition key is Off (Yes at Step S21), the processing is finished.

Next, the operation states of the first motor 11 and the second motor 12 depending on the driving mode and the operation states of the first planetary gear mechanism 20, the second planetary gear mechanism 30, and the clutch device 60 in the second embodiment are described in the order of the second state and the backward movement. The operations states in the first state are the same as in the first embodiment, and hence the descriptions thereof are omitted.

The ideal state in the second state is a state in which the rotation direction and the rotation speed of the first motor 11 match those of the second motor 12. In the second state, the control unit 1 controls the second motor 12 to be rotated by a rotation speed command value corresponding to the rotation speed of the first motor 11 detected by the first rotation angle detector 91, thereby operating the second motor 12 in accordance with the rotation speed of the first motor 11. In other words, in the second state, the first motor 11 subjected to torque control operates as a master, and the second motor 12 operates as a slave. The first motor 11 and the second motor 12 are mechanically coupled by the transmission mechanism 13. Thus, the magnitude of the fluctuation width of the rotation speed of one of the first motor 11 and the second motor 12 may affect the magnitude of the fluctuation width of the rotation speed of the other.

In the second state, when the degree of request of torque to the first motor 11 decreases, the supply of electric power to the first motor 11 decreases and the first motor 11 decelerates. The first motor 11 and the second motor 12 are mechanically coupled by the transmission mechanism 13, and hence the decrease in rotation speed of the second sun gear 31 caused by the decrease in rotation speed of the first motor 11 that occurs prior to the decrease in rotation speed of the wheel acts as force for accelerating the rotation speed of the second motor 12 coupled to the second ring gear 34, with the transmission mechanism input/output shaft 15 being a fulcrum. On the other hand, the rotation speed of the second motor 12 in the second state is controlled based on the rotation speed of the first motor 11. Thus, the rotation speed of the second motor 12 decreases in accordance with the decrease in rotation speed of the first motor 11. Then, the decrease in rotation speed of the second motor 12 acts as force for increasing the rotation speed of the second sun gear 31 with the transmission mechanism input/output shaft 15 being a fulcrum, thereby increasing the rotation speed of the first motor 11. When the rotation speed of the second motor 12 increases in response to the increase in rotation speed of the first motor 11, the rotation speed of the first motor 11 decreases. When the rotation speed of the second motor 12 decreases in response to the decrease in rotation speed of the first motor 11, the rotation speed of the first motor 11 increases. As described above, in the second state, if the change in rotation speed of the second motor 12 is simply dependent on the change in rotation speed of the first motor 11, chattering of the first motor 11 and the second motor 12 may be repeated in response to the decrease in rotation speed of the first motor 11 caused by the decrease in degree of request of torque to the first motor 11. The increase/decrease in rotation speed of the second motor 12 occurs so as to follow the increase/decrease in rotation speed of the first motor 11, and hence the phase of the increase/decrease in rotation speed of the first motor 11 does not match the phase of the increase/decrease in rotation speed of the second motor 12. Such increase/decrease in rotation speed of the two motors having different phases may cause mechanical vibration to vibrate the vehicle provided with the electric vehicle drive device 10. The degree of vibration increases as the increase/decrease amount of the rotation speed becomes larger.

In view of the above, in the second embodiment, in the calculation of the rotation speed command value of the second motor 12 corresponding to the rotation speed of the first motor 11 detected by the first rotation angle detector 91, the rotation speed of the first motor 11 to be referenced is converged to suppress the occurrence of vibration caused by chattering of the first motor 11 and the second motor 12. When the gear change information indicates the second state, the control unit 1 determines a torque command value of the first motor 11 for the positive rotation direction based on the throttle information and operates the first motor 11 in accordance with the torque command value, and determines a rotation speed command value corresponding to the rotation speed of the first motor 11 processed by the filtering unit 95 and operates the second motor 12 in accordance with the rotation speed command value. For example, the rotation speed command value of the second motor 12 is calculated based on data indicating the ratio between the rotation speed of the first motor 11 and the second motor 11 or the correspondence relation between the rotation speed of the first motor 11 and the rotation speed of the second motor 11.

For example, the filtering unit 95 has a lowpass filter 95a as illustrated in FIG. 39, and the increase/decrease amount of the rotation speed of the first motor 11 detected by the first rotation angle detector 91 is converged by the lowpass filter 95a. The lowpass filter 95a in the second embodiment is a moving average filter having a sampling rate of 10 [msec] and a number of samples of 20. This is a specific example of the lowpass filter 95a, and the lowpass filter 95a is not limited thereto and can be appropriately changed. For example, the lowpass filter 95a may be what is called a Kolmogorov Zurbenko (KZ) filter. The sampling rate and the number of samples of the moving average filter employed as the lowpass filter 95a can be appropriately changed.

Figure 42:
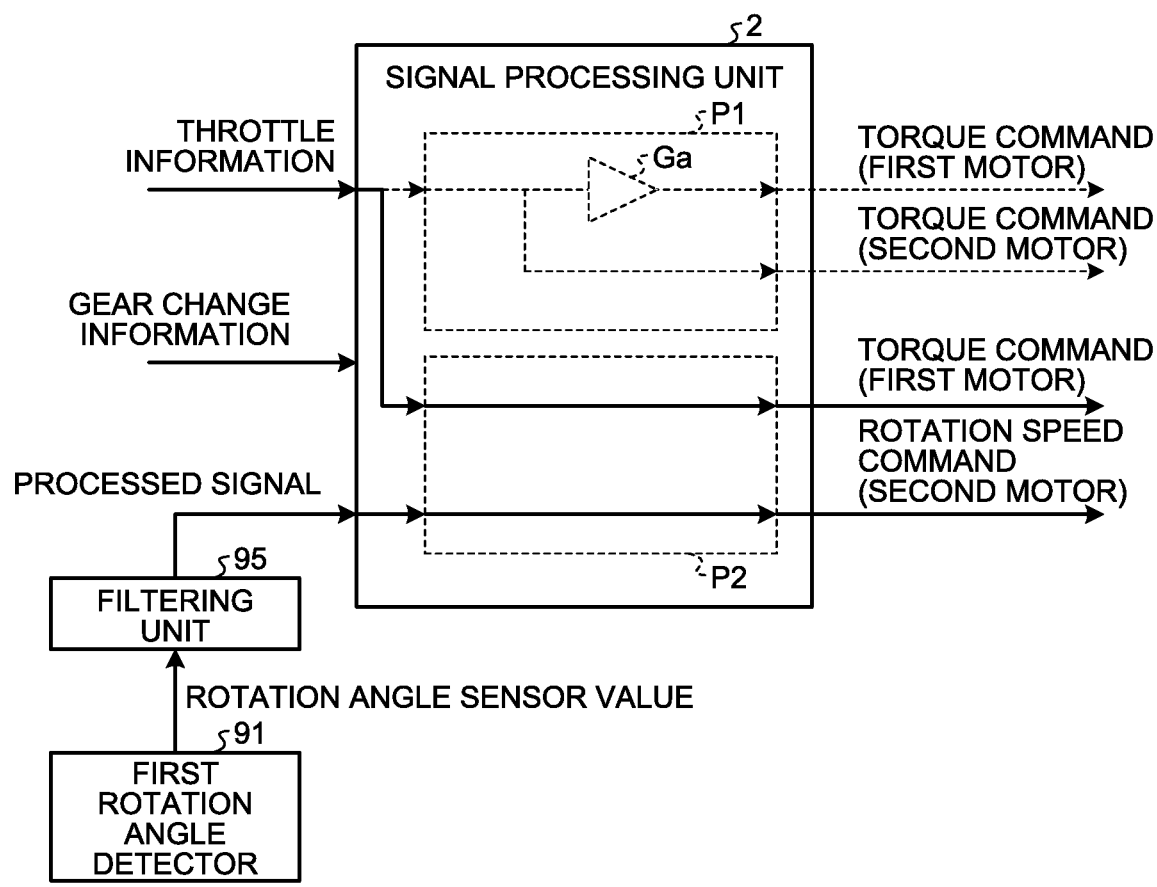
FIG. 42 is a conceptual diagram illustrating various kinds of signals referenced in the control of the first motor and the second motor by the control unit.

FIG. 42 is a conceptual diagram illustrating various kinds of signals referenced in the control of the first motor 11 and the second motor 12 by the control unit 1. Symbols P1 and P2 in FIG. 42 schematically represent arithmetic processing contents of the signal processing unit 2 related to the first state and the second state, respectively. In the second state, the signal processing unit 2 calculates a torque command value based on throttle information, and controls the operation of the first motor 11 such that the first motor 11 exhibits torque indicated by the torque command value. The signal processing unit 2 calculates a rotation speed command value of the second motor 12 based on the rotation speed of the first motor 11, and controls the second motor 12 to operate at rotation speed indicated by the rotation speed command value. The rotation speed of the first motor 11 referenced for the calculation of the rotation speed of the second motor 12, that is, the detection result of the first rotation angle detector 91, has been processed by the filtering unit 95. Specifically, data indicating the detected rotation speed of the first motor 11 has been processed by the lowpass filter 95a, and the processed signal is referenced for calculation of a rotation angle command value of the second motor 12. In this manner, even if the rotation speed of the first motor 11 increases due to mechanical linkage by the transmission mechanism 13 when the rotation speed of the second motor 12 decreases in response to the decrease in rotation speed of the first motor 11, the increase/decrease amount of the rotation speed of the first motor 11 indicated by the processed signal is smaller than the actual increase/decrease amount of the rotation speed of the first motor 11. Thus, the degree of increase in rotation speed of the second motor 12 linked with the increase in rotation speed of the first motor 11 caused after the degree of request of torque to the first motor 11 decreases can be suppressed. Consequently, the increase/decrease amount in the repetition of the increase/decrease in rotation speed caused when the first motor 11 and the second motor 12 act on each other can be suppressed to suppress mechanical vibration caused by the increase/decrease in rotation speed.

Figure 43:
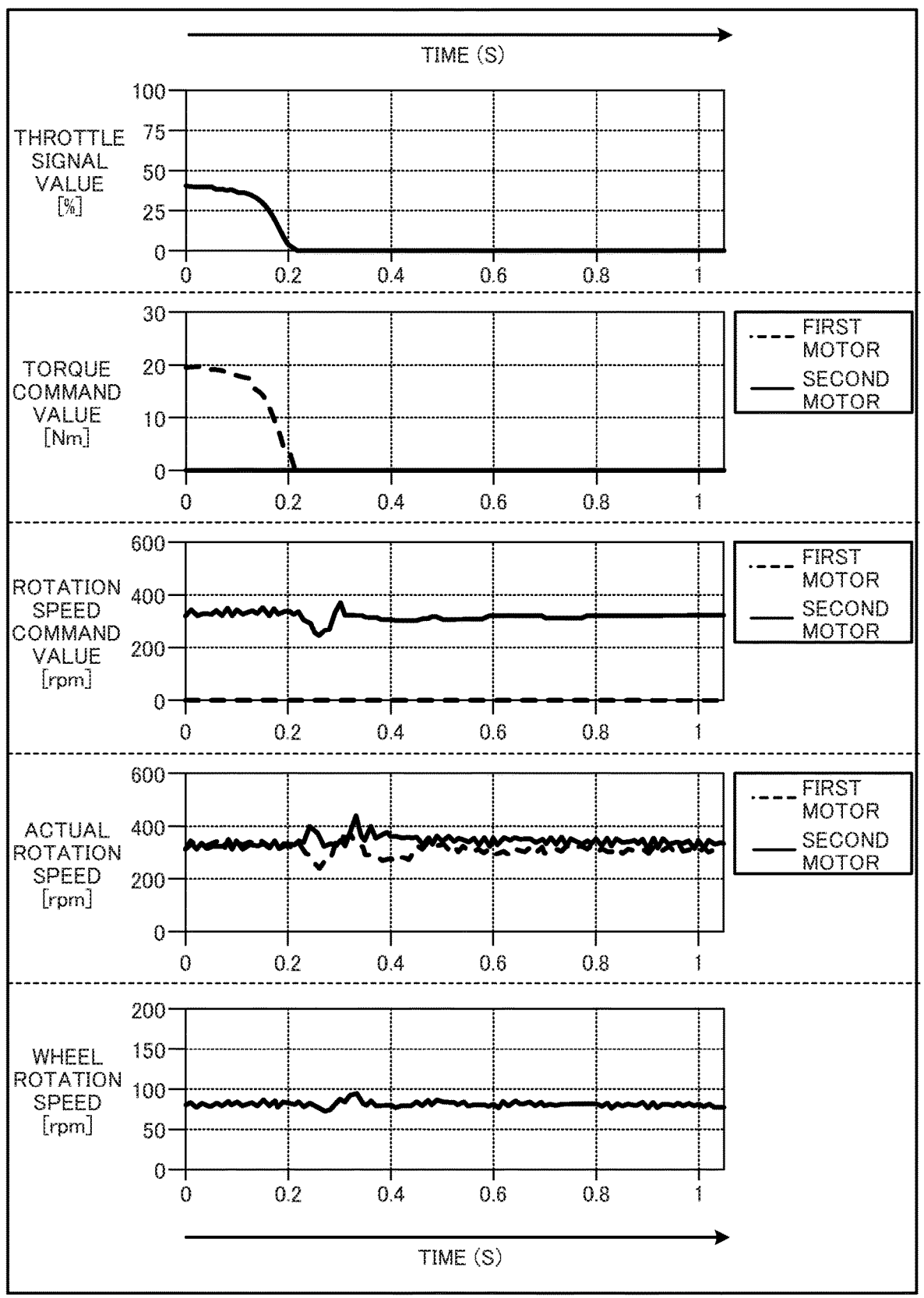
FIG. 43 is a graph illustrating a transition example of various kinds of numerical values related to the operation of the first motor and the second motor.
Figure 44:
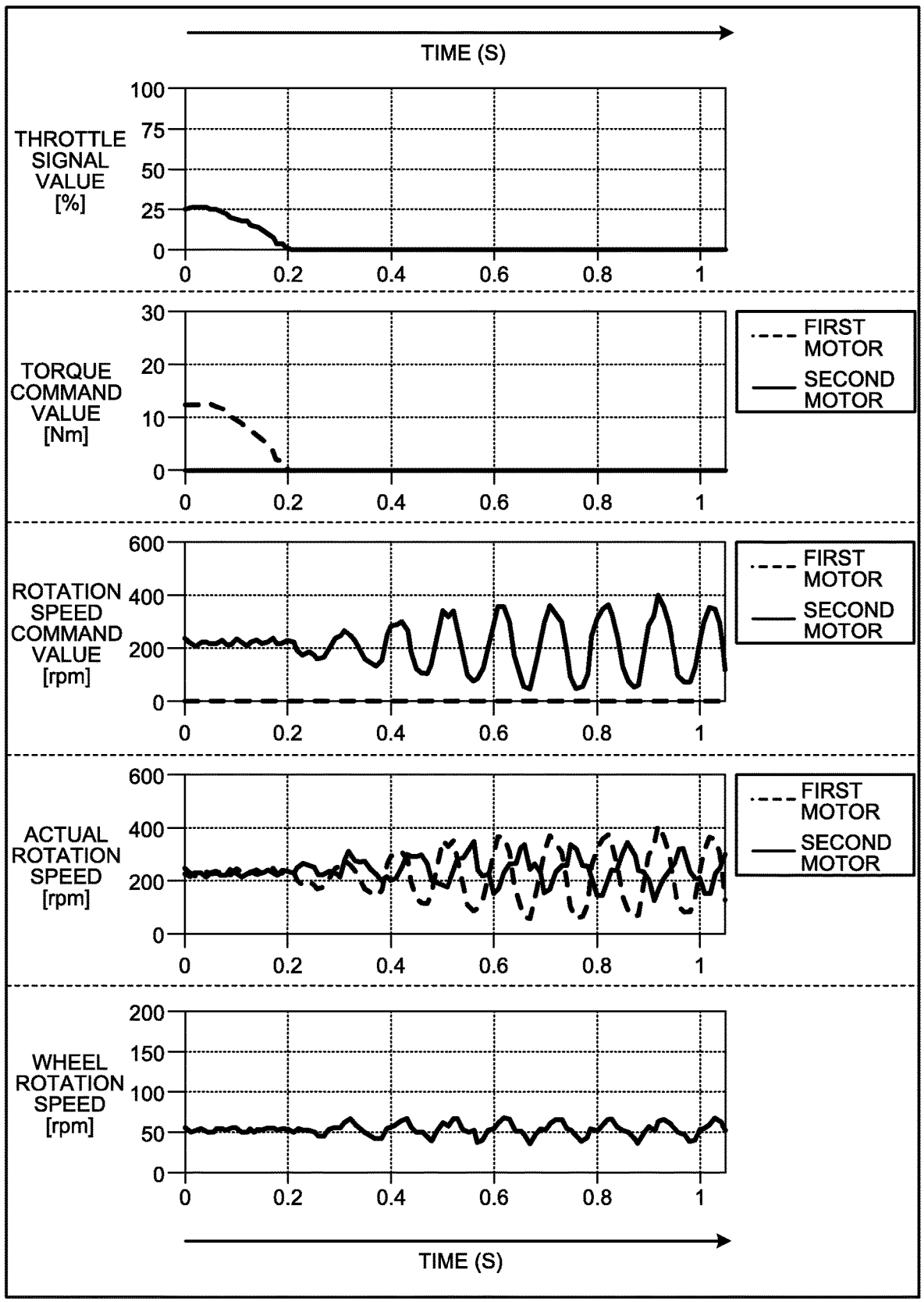
FIG. 44 is a graph illustrating a transition example of various kinds of numerical values related to the operation of the first motor and the second motor.

FIG. 43 and FIG. 44 are graphs illustrating transition examples of various kinds of numerical values related to the operation of the first motor 11 and the second motor 12. FIG. 43 is an example (example) in which processing is performed by the filtering unit 95 according to the second embodiment when the torque command value of the first motor 11 decreases in the second state. FIG. 44 is an example (comparative example) in which processing is not performed by the filtering unit 95 when the torque command value of the first motor 11 decreases in the second state. The graphs in FIG. 43 and FIG. 44 illustrate, from the top, transition examples of a throttle signal value indicated by throttle information, torque command values of the first motor 11 and the second motor 12, rotation speed command values of the first motor 11 and the second motor 12, actual rotation speed of the first motor 11 and the second motor 12, and rotation speed (wheel rotation speed) of the wheel H. In the graphs, the vertical axis represents numerical values, and the horizontal axis represents time. In the graphs in FIG. 43 and FIG. 44, the timing at which the throttle in the operation system OP is abruptly closed is the origin of (0 [sec]) of the horizontal axis.

In the second state, the torque command value of the first motor 11 is determined depending on the throttle signal. According to the graph of the actual rotation speed, at the time at which the torque command becomes 0 [Nm] (around 0.2 [sec]), the rotation speed of the first motor 11 decreases, and the rotation speed of the second motor 12 increases due to mechanical linkage. On the other hand, the signal processing unit 2 calculates the rotation speed command value of the second motor 12 based on the detection result of the rotation speed of the first motor 11. The control unit 1 controls the rotation speed of the second motor 12 to follow the rotation speed of the first motor 11 by using the rotation speed command value of the second motor 12. When the second motor 12 is decelerated, the rotation speed of the first motor 11 tends to increase due to mechanical linkage. In the second embodiment, the increase/decrease amount of the rotation angle of the first motor 11 detected by the first rotation angle detector 91 is converged by the filtering unit 95, and hence the increase/decrease in rotation speed of the first motor 11 caused after the torque command becomes 0 [Nm] is less likely to appear directly in the detection result, and the increase/decrease amount of the rotation speed becomes smaller. In FIG. 43, the detection result of the rotation speed of the first motor 11 after 0.3 seconds since the torque command was 0 [Nm] indicates substantially constant rotation speed owing to the lowpass filter 95a. Consequently, the increase/decrease amounts of the rotation speed of the first motor 11, the second motor 12, and the wheel can be suppressed to be smaller, and vibration caused by the increase/decrease in rotation speed can be suppressed.

On the other hand, in the comparative example in which the processing by the filtering unit 95 is not performed, as illustrated in FIG. 44, the increase/decrease in the detection results of the rotation speed is not converged for about 1 second even after 0.3 seconds since the torque command was 0 [Nm], and the increase/decrease amount of the rotation speed of the first motor 11, the second motor 12, and the wheel is larger than in the example.

In the second embodiment, a signal indicating the rotation speed of the first motor 11 after being subjected to processing using a moving average filter formed by a digital signal processing circuit is referred to as "processed signal". When a rotation angle sensor value output by the first rotation angle detector 91 is an analog signal, the filtering unit 95 has an analog/digital conversion unit configured to perform processing by the moving average filter.

In the example illustrated in FIG. 39, a path in which the filtering unit 95 outputs the processed signal to the signal processing unit 2 in the control unit 1 and paths in which the rotation angle sensor values of the first rotation angle detector 91 and the second rotation angle detector 92 are output to the signal processing unit 2 through the inverter 3 in the control unit 1 as rotation speed signals are independently provided. This is a specific example of transmission paths of the processed signal and the rotation speed signals, and the transmission paths are not limited thereto and can be appropriately changed. For example, the filtering unit 95 may be provided in the inverter 3 such that the rotation angle sensor value of the first rotation angle detector 91 is processed and the processed signal is transmitted to the signal processing unit 2. The filtering unit 95 may be provided in a transmission path between the inverter 3 and the signal processing unit 2, and may be provided in a transmission path between the first rotation angle detector 91 and the inverter 3. The processing by the filtering unit 95 may be provided such that whether to perform the processing can be selected. For example, the processing by the filtering unit 95 may be performed when the first motor 11 and the second motor 12 are controlled in the second state, and may be omitted in other cases. The processing by the filtering unit 95 may be always performed in the second state. The processing by the filtering unit 95 may be performed when the torque command value of the first motor 11 has decreased. In the case where the processing by the filtering unit 95 is performed when the torque command value of the first motor 11 has decreased, the rotation speed command value of the second motor 12 is calculated by referring to the rotation speed signal while the torque command value of the first motor 11 does not decrease.

In the first state, for example, a gain may be applied to the torque command value of the first motor 11 as schematically indicated by a triangle denoted by symbol Ga in FIG. 42. Specific arithmetic processing contents as to whether to apply the gain are applicable to not only the calculation of the torque command value in the first state but also the calculation of other torque command values.

Figure 45:
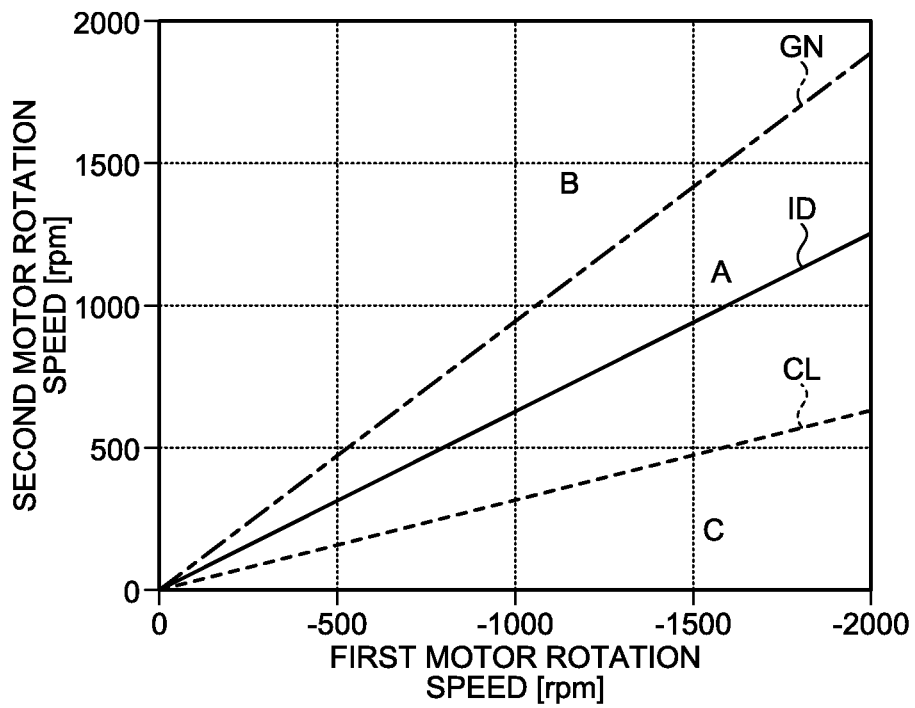
FIG. 45 is a graph illustrating combinations of rotation speed of the first motor and the second motor while distinguishing the case where backward movement is satisfied and the case where backward movement is not satisfied.

Next, the backward movement is described. FIG. 45 is a graph illustrating combinations of rotation speed of the first motor 11 and the second motor 12 while distinguishing the case where the backward movement is established and the case where the backward movement is not established. In the second embodiment, when the drive signal SI2 of the wheel H includes information that instructs the wheel H to rotate in the reverse rotation direction, the control unit 1 outputs a rotation speed command for the reverse rotation direction to the first motor 11 and a rotation speed command for the positive rotation direction to the second motor 12, thereby rotating the first motor 11 in the rotation direction reverse to the predetermined positive rotation direction and rotating the second motor 12 in the positive rotation direction. When the correspondence relation of the rotation speed of the first motor 11 and the second motor 12 corresponds to a range A that is below a chain line GN and on and above a broken line CL in the graph illustrated in FIG. 45, the backward movement is established and the transmission mechanism input/output shaft 15 rotates in the reverse rotation direction. On the other hand, when the correspondence relation of the rotation speed of the first motor 11 and the second motor 12 correspond to the chain line GN, the second ring gear 34 does not rotate, and what is called geared neutral is established and the backward movement is not established. When the correspondence relation of the rotation speed of the first motor 11 and the second motor 12 corresponds to a range B above the chain line GN, the second ring gear 34 rotates in the forward direction, and the backward movement is not established. When the correspondence relation of the rotation speed of the first motor 11 and the second motor 12 corresponds to a range C below the broken line CL, the transmission mechanism input/output shaft 15 cannot rotate in the reverse rotation direction due to the braking by the clutch device 60, and the backward movement is not established.

The ranges A, B, and C in FIG. 45, that is, the relation between the rotation speed of the first motor 11 and the second motor 12 and whether the backward movement is established depends on the reduction ratio in the first planetary gear mechanism 20 and the reduction ratio in the second planetary gear mechanism 30. Specifically, when the rotation speed of the first motor 11 is represented by $N_{MA}$, the rotation speed of the second motor 12 is represented by $N_{MB}$, the reduction ratio in the first planetary gear mechanism 20 is represented by $i_1$, and the reduction ratio in the second planetary gear mechanism 30 is represented by $i_2$, the control unit 1 determines $N_{MB}$ within the range expressed by Equation (1).

$$-\frac{1}{i_1} \times N_{MA} \leq N_{MB} < \left(\frac{1}{1-i_2}\right) \times N_{MA} \qquad (1)$$

When the number of teeth of the first sun gear 21 is represented by $Z_{S1}$, the number of teeth of the first ring gear 24 is represented by $Z_{R1}$, the number of teeth of the second sun gear 31 is represented by $Z_{S2}$, and the number of teeth of the second ring gear 34 is represented by $Z_{R2}$, $i_1$ is expressed by Equation (2) and $i_2$ is expressed by Equation (3).

$$i_1 = Z_{R1}/z_{S1} \qquad (2)$$

$$i_2 = Z_{R2}/z_{S2} \qquad (3)$$

The matters related to the backward movement are described in more detail below. When the rotation speed of the second sun gear 31 in the second planetary gear mechanism 30 is represented by $N_{S2}$, the rotation speed of the second carrier 33 is represented by $N_{C2}$, and the rotation speed of the second ring gear 34 is represented by $N_{R2}$, $N_{R2}$ is expressed by Equation (4).

$$N_{R2} = \frac{N_{S2} - N_{C2}}{i_2} + N_{C2} \qquad (4)$$

The rotation speed ($N_{S2}$) of the second sun gear 31 is equal to the rotation speed ($N_{MA}$) of the first motor 11. The rotation speed ($N_{C2}$) of the second carrier 33 is equal to the rotation speed ($N_{MB}$) of the second motor 12. Thus, Equation (4) can be rewritten as Equation (5).

$$N_{R2} = \frac{N_{MA} - N_{MB}}{i_2} + N_{MB} \qquad (5)$$

When the rotation speed ($N_{R2}$) of the second ring gear 34 is 0 ($N_{R2}=0$), what is called gear neutral is established and the backward movement is not established. When the rotation speed ($N_{R2}$) of the second ring gear 34 exceeds 0 ($N_{R2}>0$), the second ring gear 34 rotates in the forward direction. Thus, in order to establish the backward movement, the rotation speed ($N_{R2}$) of the second ring gear 34 needs to be less than 0 ($N_{R2}<0$). Accordingly, the rotation speed ($N_{MB}$) of the second motor 12 needs to satisfy Equation (6) in the relation with the rotation speed ($N_{MA}$) of the first motor 11 based on Equation (5). FIG. 45 exemplifies the case where the geared neutral is established when $N_{R2}=0$ is satisfied on the chain line GN, and the second ring gear 34 rotates in the forward direction when $N_{R2}>0$ is satisfied in the range B located above the chain line GN.

$$N_{MB} < \left(\frac{1}{1-i_2}\right) \times N_{MA} \quad (6)$$

When the rotation speed of the first carrier 23 in the first planetary gear mechanism 20 is represented by $N_{C1}$, $N_{C1}$ is expressed by Equation (7).

$$N_{C1} = \frac{N_{MA} + i_1 N_{MB}}{i_1 + 1} \quad (7)$$

When the rotation speed ($N_{C1}$) of the first carrier 23 is less than 0 ($N_{C1}<0$), the rotation of the first carrier 23 is braked by the clutch device 60. Thus, the rotation speed ($N_{C1}$) of the first carrier 23 needs to be 0 or more ($N_{C1} \geq 0$). Accordingly, the rotation speed ($N_{MB}$) of the second motor 12 needs to satisfy Equation (8) in the relation with the rotation speed ($N_{MA}$) of the first motor 11 based on Equation (7). FIG. 45 exemplifies the case where the range C located below the broken line CL is a range that does not satisfy Equation (8).

$$N_{MB} \geq -\frac{1}{i_1} \times N_{MA} \quad (8)$$

From Equation (6) and Equation (8), the backward movement is established when the rotation speed ($N_{MA}$) of the first motor 11 and the rotation speed ($N_{MB}$) of the second motor 12 satisfy Equation (1). Equation (1) corresponds to the range A in FIG. 45. As described above with reference to Equation (1) to Equation (8), the relation of the rotation speed ($N_{MA}$) of the first motor 11 and the rotation speed ($N_{MB}$) of the second motor 12 indicated by each of the ranges A, B, and C illustrated in FIG. 45 in the second embodiment is uniquely determined by the number of teeth ($Z_{S1}$) of the first sun gear 21, the number of teeth ($Z_{R1}$) of the first ring gear 24, the number of teeth ($Z_{S2}$) of the second sun gear 31, and the number of teeth ($Z_{R2}$) of the second ring gear 34.

The ideal driving state of the electric vehicle drive device 10 in the backward movement is a state in which the first motor 11 and the second motor 12 are driven such that the rotation speed ($N_{MA}$) of the first motor 11 and the rotation speed ($N_{MB}$) of the second motor 12 maintain a constant ratio within the range A irrespective of backward movement speed. Thus, in the second embodiment, the first motor 11 and the second motor 12 are both subjected to rotation speed control for the backward movement, so that the ratio of the rotation speed ($N_{MA}$) of the first motor 11 and the rotation speed of the rotation speed ($N_{MB}$) of the second motor 12 is maintained constant. Consequently, it is unnecessary to design a complicated control system dedicated for backward movement, and the backward movement can be implemented by the operation control of the first motor 11 and the second motor 12 by the control unit 1 capable of controlling the forward movement.

Figure 46:
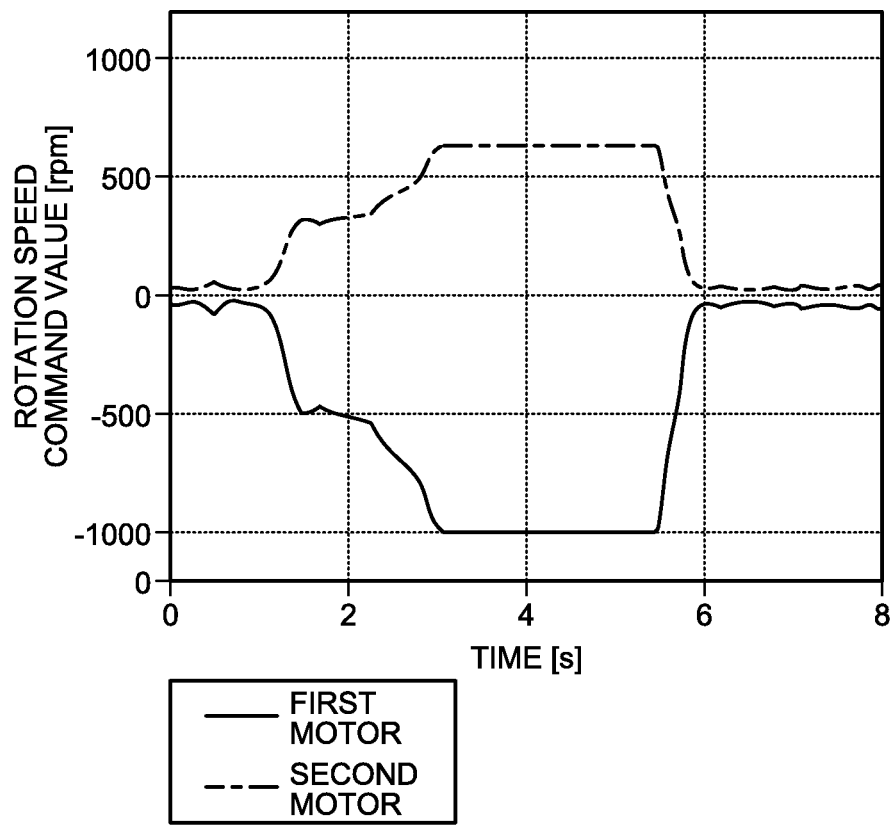
FIG. 46 is a graph illustrating a transition example of rotation speed command values of the first motor and the second motor during backward movement.
Figure 47:
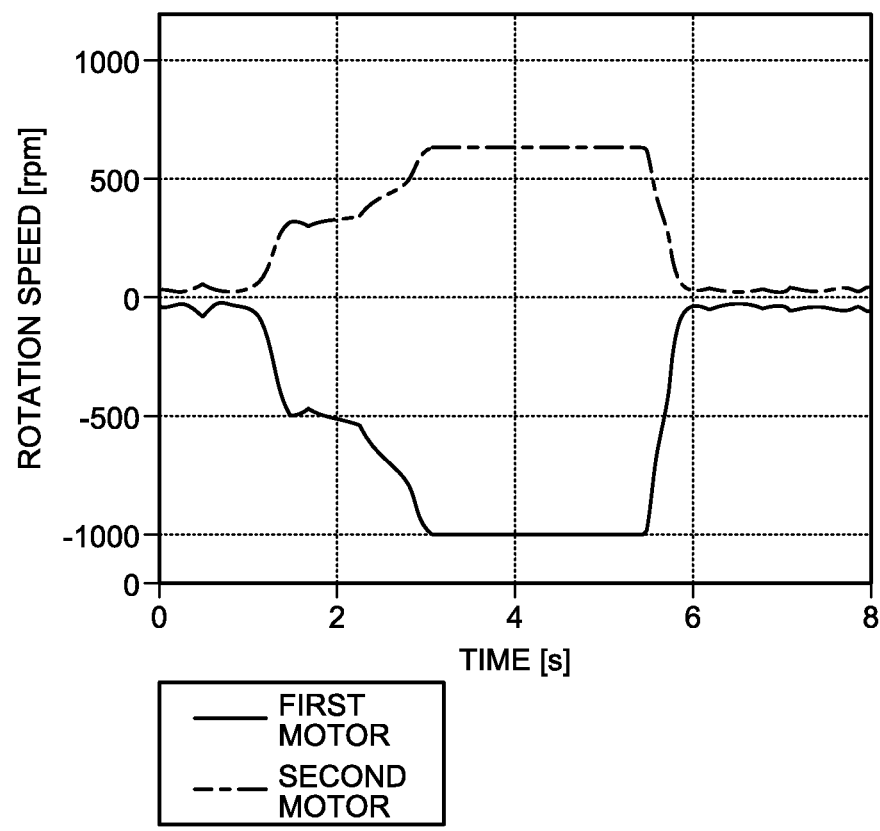
FIG. 47 is a graph illustrating a transition example of rotation speed of the first motor and the second motor during backward movement.
Figure 48:
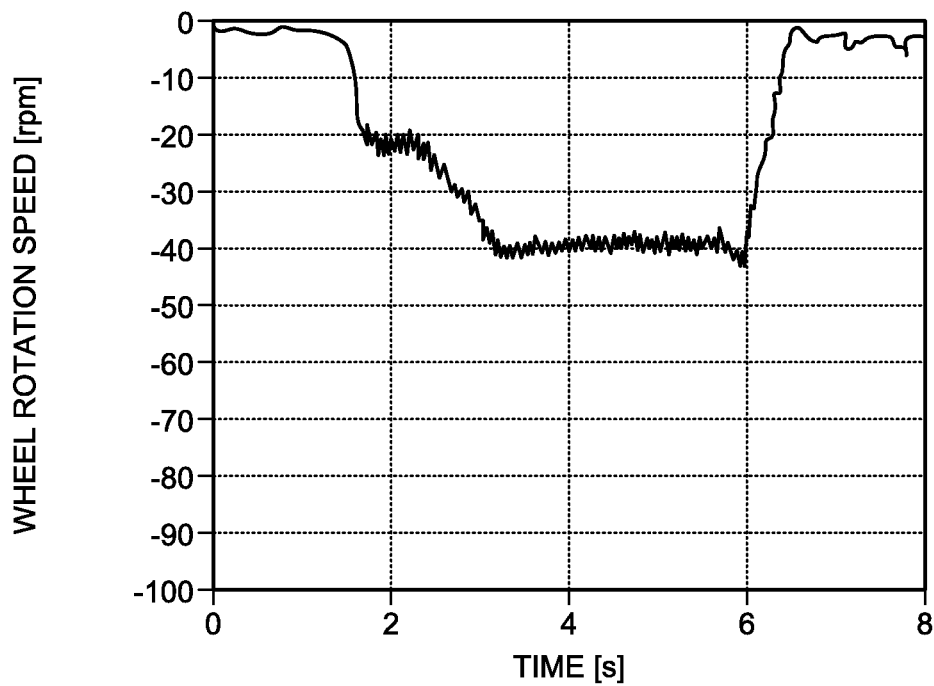
FIG. 48 is a graph illustrating a transition of wheel rotation speed corresponding to the transition of the rotation speed of the first motor and the second motor illustrated in FIG. 47.

FIG. 46 is a graph illustrating a transition example of rotation speed command values of the first motor 11 and the second motor 12 during the backward movement. FIG. 47 is a graph illustrating a transition example of the rotation speed of the first motor 11 and the second motor 12 during the backward movement. FIG. 48 is a graph illustrating a transition of the wheel rotation speed corresponding to the transition of the rotation speed of the first motor 11 and the second motor 12 illustrated in FIG. 47. In the second embodiment, the control unit 1 determines the rotation speed ($N_{MA}$) of the first motor 11 and the rotation speed ($N_{MB}$) of the second motor 12 such that the rotation speed ($N_{MB}$) of the second motor 12 takes a median value in the range in Equation (1). Specifically, for example, the signal processing unit 2 determines the rotation speed ($N_{MA}$) of the first motor 11 and the rotation speed ($N_{MB}$) of the second motor 12 such that the relation of the rotation speed ($N_{MA}$) of the first motor 11 and the rotation speed ($N_{MB}$) of the second motor 12 indicated by the straight line graph ID in the range A in FIG. 45 is established, to obtain rotation speed command values. More specifically, for example, the signal processing unit 2 determines the rotation speed ($N_{MA}$) of the first motor 11 based on throttle information, and employs a value obtained by dividing the sum of the right side of Equation (6) and the right side of Equation (8) by 2 as the rotation speed ($N_{MB}$) of the second motor 12. The purpose is to prevent the relation of the rotation speed of the first motor 11 and the second motor 12 from being the relation that does not satisfy Equation (1), that is, from being the state deviating from the range A, irrespective of the backward movement speed. In particular, the permissible range of the rotation speed ($N_{MB}$) of the second motor 12 corresponding to the range A with respect to the rotation speed ($N_{MA}$) of the first motor 11 becomes narrower as the backward movement speed becomes slower, and hence when the control unit 1 determines the rotation speed ($N_{MA}$) of the first motor 11 and the rotation speed ($N_{MB}$) of the second motor 12 such that the rotation speed ($N_{MB}$) of the second motor 12 takes a median value in the range in Equation (1), the deviation from the permissible range can be more reliably suppressed.

Figure 49:
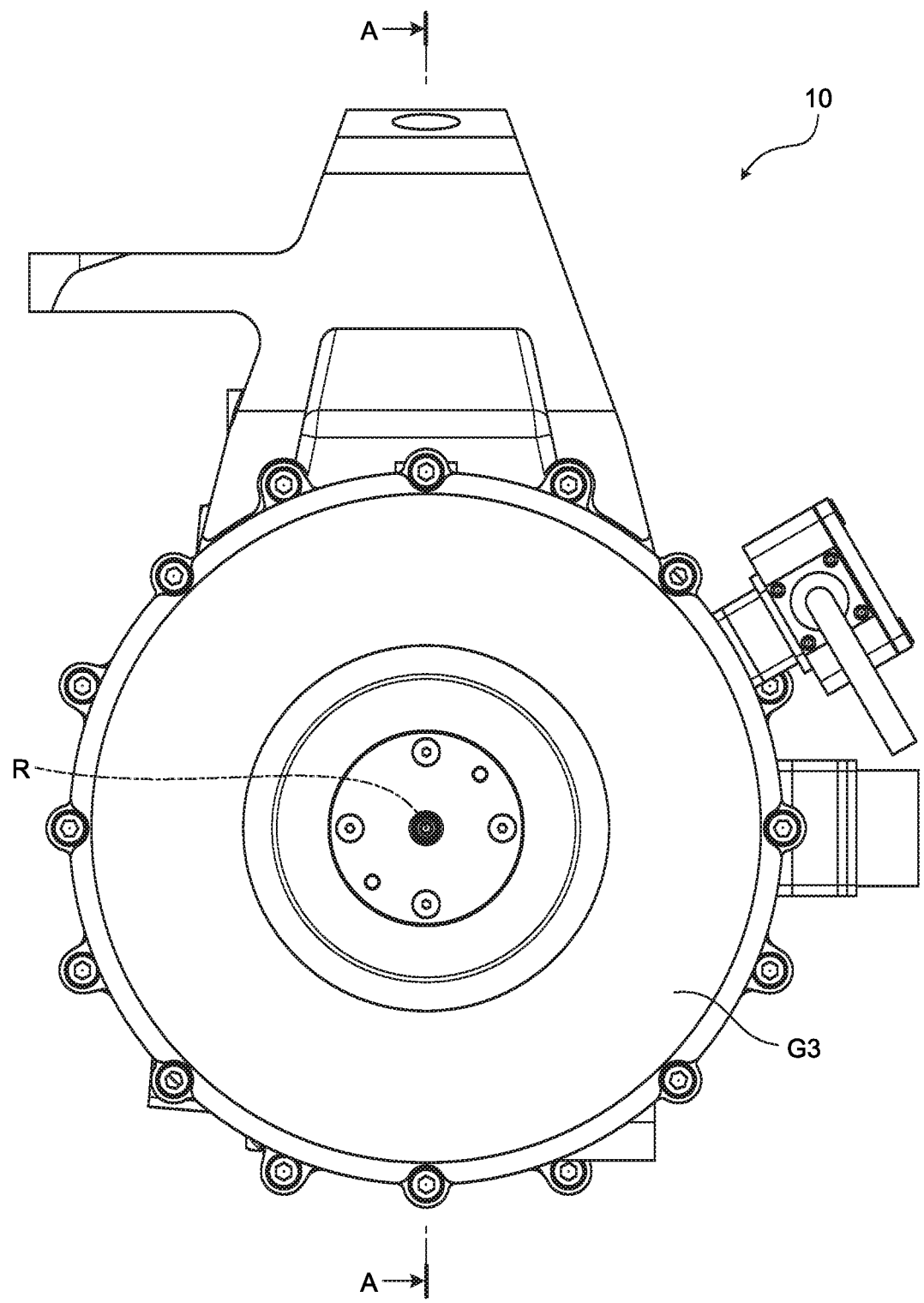
FIG. 49 is a front view of the electric vehicle drive device according to the first embodiment and the second embodiment.
Figure 50:
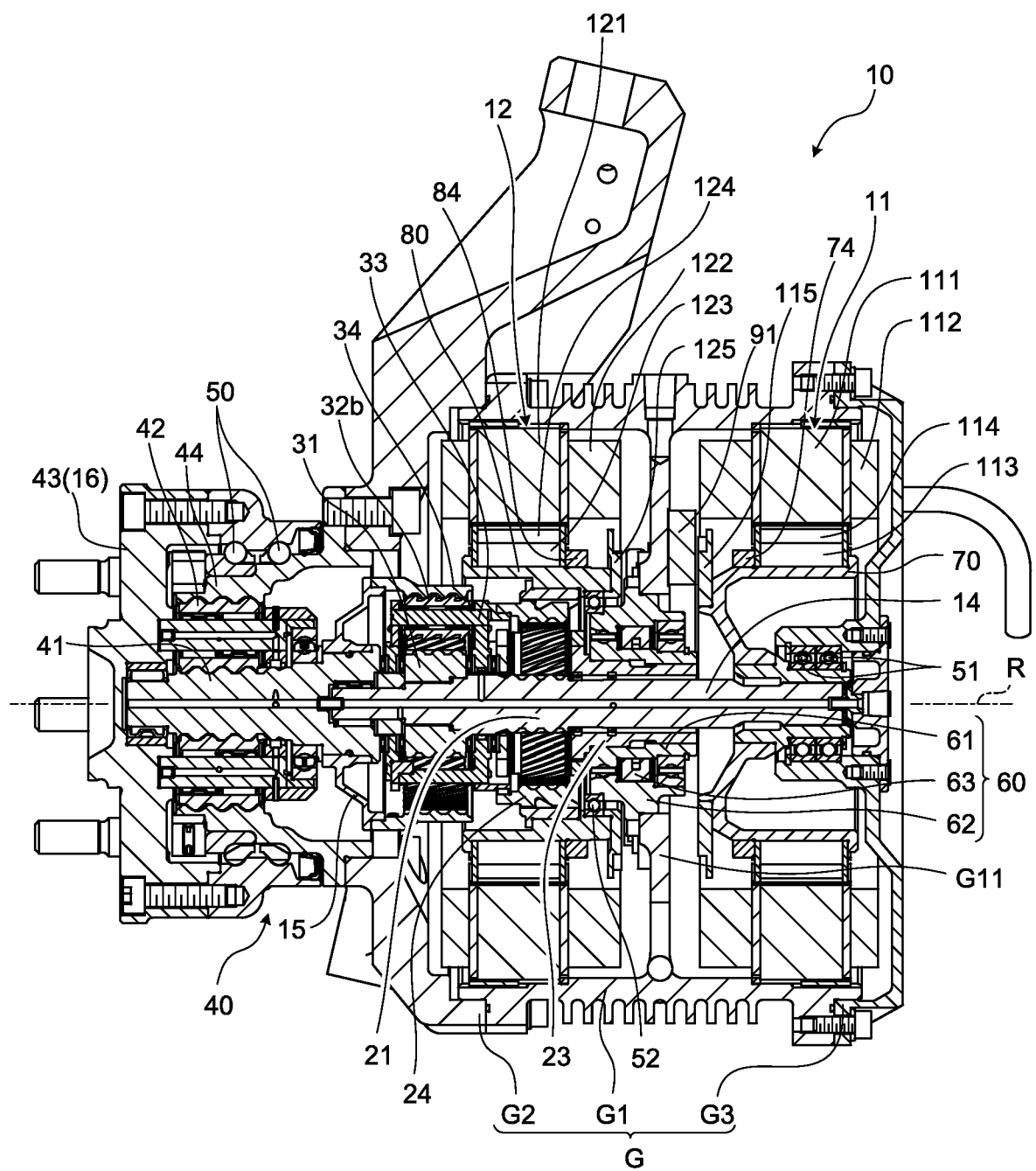
FIG. 50 is a cross-sectional view taken along the line A-A in FIG. 49.

FIG. 49 is a front view of the electric vehicle drive device according to the first embodiment and the second embodiment. FIG. 50 is a cross-sectional view taken along the line A-A in FIG. 49. In the following description, overlapping descriptions of the above-mentioned components are omitted, and the components are denoted by the same reference symbols in the figures. The axial direction of the first motor 11 (direction along rotation axis R) is referred to simply as "axial direction". The radial direction of the first motor 11 (direction orthogonal to rotation axis R) is referred to simply as "radial direction". The circumferential direction of the first motor 11 (tangent direction of circle centered at rotation axis R) is referred to simply as "circumferential direction".

As illustrated in FIG. 50, the case G includes a case G1, a case G2, and a case G3. The case G1 is a cylindrical member, and includes a ring-shaped partition G11 that protrudes from the inner wall. The partition G11 isolates the first motor 11 and the second motor 12 from each other. Specifically, the first motor 11 is disposed on one side of the partition G11, and the second motor 12 is disposed on the other side of the partition G11. The case G2 is a cylindrical member, and is provided closer to the wheel H than the case G1 is. For example, the case G1 and the case G2 are fastened by a plurality of bolts. The case G3 is provided to one of the two end surfaces of the case G1 on the side opposite to the case G2, that is, an end surface of the case G1 on the vehicle body side of the electric vehicle. For example, the case G1 and the case G3 are fastened by a plurality of bolts. The case G3 closes one opening in the case G1.

As illustrated in FIG. 50, the first motor 11 includes a first stator core 111, first coils 112, a first rotor core 113, first magnets 114, a first member to be detected 115, and a first rotor holding member 70. The first stator core 111 is a cylindrical member. The first stator core 111 is fitted into the inner peripheral surface of the case G1. The first coils 112 are provided at a plurality of locations on the first stator core 111. The first coils 112 are wound around the first stator core 111 through an insulator.

The first rotor core 113 is disposed on the radially inner side. The first rotor core 113 is a cylindrical member. For example, the first magnets 114 are provided in plurality on the outer peripheral surface of the first rotor core 113. The first member to be detected 115 is used to detect a rotation angle of the first rotor core 113. For example, the first member to be detected 115 is a ring-shaped member, and rotates together with the first rotor core 113.

Figure 51:
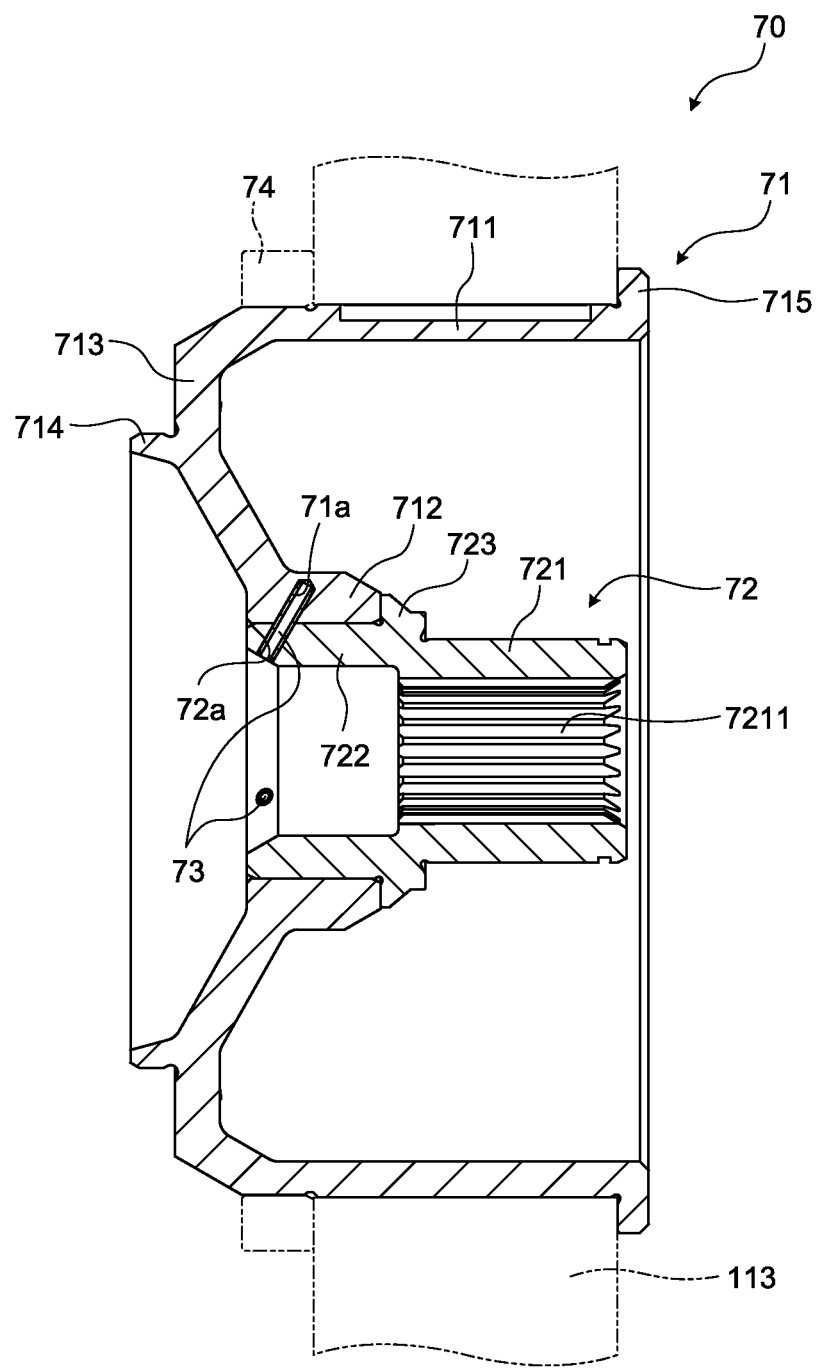
FIG. 51 is an enlarged cross-sectional view of a first rotor holding member in FIG. 50.

FIG. 51 is an enlarged cross-sectional view of the first rotor holding member in FIG. 50. The first rotor holding member 70 is a member configured to support the first rotor core 113 such that the first rotor core 113 can rotate about the rotation axis R. As illustrated in FIG. 50, the first rotor holding member 70 is supported by the case G3 through a bearing 51 and coupled to the sun gear shaft 14. As illustrated in FIG. 51, the first rotor holding member 70 includes a first outer member 71, a first inner member 72, a first pin 73, and a first positioning ring 74.

The first outer member 71 is a member formed of first metal. For example, the first metal is an aluminum alloy. A protrusion provided to one of the inner peripheral surface of the first rotor core 113 and the outer peripheral surface of the first outer member 71 is fitted to a recess provided to the other. In other words, the first rotor core 113 and the first outer member 71 are coupled by what is called spigot joint. As illustrated in FIG. 51, the first outer member 71 includes an outer tubular portion 711, an inner tubular portion 712, a coupling portion 713, a rib 714, and a flange 715. The outer tubular portion 711, the inner tubular portion 712, the coupling portion 713, the rib 714, and the flange 715 are integrally formed. The outer tubular portion 711 is a cylindrical member, and is in contact with the inner peripheral surface of the first rotor core 113. The inner tubular portion 712 is a cylindrical member, and is in contact with the outer peripheral surface of the first inner member 72. The inner tubular portion 712 is provided with a first recess 71a. For example, the first recess 71a is a columnar recess. The coupling portion 713 couples one end of the outer tubular portion 711 and one end of the inner tubular portion 712 to each other. Specifically, the coupling portion 713 is curved, and is closer to the partition G11 than the outer tubular portion 711 and the inner tubular portion 712 are. The rib 714 is a ring-shaped member that protrudes from the coupling portion 713 in a direction along the rotation axis R. The rib 714 is a member configured to support the first member to be detected 115 illustrated in FIG. 50. The flange 715 is a ring-shaped member that protrudes from the other end of the outer tubular portion 711 (end portion on side opposite to end portion connected to coupling portion 713) in the radial direction. The flange 715 is used to position the first rotor core 113.

The first inner member 72 is a member formed of second metal. The second metal is metal having specific gravity larger than the specific gravity of the above-mentioned first metal, and is, for example, carbon steel. As illustrated in FIG. 51, the first inner member 72 includes a small tubular portion 721, a large tubular portion 722, and a flange 723. The small tubular portion 721, the large tubular portion 722, and the flange 723 are integrally formed. The small tubular portion 721 is a cylindrical member, and has splines 7211 on its inner peripheral surface. The splines 7211 are fitted to splines provided at an end portion of the sun gear shaft 14. The large tubular portion 722 is a cylindrical member, and is in contact with the inner peripheral surface of the inner tubular portion 712 of the first outer member 71. The large tubular portion 722 is provided with a first hole 72a. For example, the first hole 72a is a columnar through hole having a diameter equal to the diameter of the first recess 71a of the inner tubular portion 712, and overlaps with the first recess 71a. The flange 723 is a ring-shaped member that protrudes from the outer peripheral surface of the large tubular portion 722 in the radial direction. The flange 723 is used to position the first outer member 71.

The first pin 73 is a member configured to facilitate the transmission of torque between the first outer member 71 and the first inner member 72. The first pin 73 is disposed at a position that straddles the first recess 71a and the first hole 72a. For example, the first pin 73 is a columnar pin having a diameter substantially equal to the diameters of the first recess 71a and the first hole 72a. For example, the first inner member 72 is fixed to the first outer member 71 by press-fitting. More specifically, the large tubular portion 722 is fixed to the inner peripheral surface of the inner tubular portion 712 by shrink-fitting. Accordingly, frictional force is generated between the outer peripheral surface of the large tubular portion 722 and the inner peripheral surface of the inner tubular portion 712, and hence a certain degree of torque is transmitted between the first outer member 71 and the first inner member 72. However, the inner tubular portion 712 is an aluminum alloy, and hence it is difficult to increase the frictional force caused between the outer peripheral surface of the large tubular portion 722 and the inner peripheral surface of the inner tubular portion 712. Thus, after the first inner member 72 is press-fitted to the first outer member 71, the first pin 73 is press-fitted toward the first recess 71a from the first hole 72a. Accordingly, torque is transmitted between the first outer member 71 and the first inner member 72 through the first pin 73. In this case, shearing force is generated on the first pin 73. By providing the first pin 73, torque is more easily transmitted between the first outer member 71 and the first inner member 72 as compared with the case where the first outer member 71 and the first inner member 72 are fixed only by press-fitting. The first recess 71a is located on the radially outer side of the first hole 72a, and hence the first pin 73 is prevented from falling off due to centrifugal force.

The first positioning ring 74 is a member configured to position the first rotor core 113. The first rotor core 113 is positioned by being sandwiched by the first positioning ring 74 and the flange 715. For example, the first positioning ring 74 is a ring-shaped member formed of an aluminum alloy. For example, the first positioning ring 74 is fitted to the outer peripheral surface of the outer tubular portion 711 by press-fitting. The first positioning ring 74 is disposed at a position closer to the rib 714 than the first rotor core 113 is. More specifically, the first positioning ring 74 is disposed at a position overlapping with the inner tubular portion 712 and the coupling portion 713 in the radial direction. The vicinity of the rib 714 has a relatively high rigidity. For example, the rigidity means the moment of inertia of area. Thus, a part of the outer tubular portion 711 closer to the coupling portion 713 is less deformed by force in the radial direction. Consequently, because the first positioning ring 74 is disposed at a position closer to the rib 714 than the first rotor core 113 is, it is easy to increase press-fitting force for press-fitting the first positioning ring 74 to the outer tubular portion 711.

As illustrated in FIG. 50, the second motor 12 includes a second stator core 121, second coils 122, a second rotor core 123, second magnets 124, a second member to be detected 125, and a second rotor holding member 80. The second stator core 121 is a cylindrical member. The second stator core 121 is fitted into the inner peripheral surface of the case G1. The second coils 122 are provided at a plurality of locations on the second stator core 121. The second coils 122 are wound around the second stator core 121 through an insulator.

The second rotor core 123 is provided on the radially inner side of the second stator core 121. The second rotor core 123 is a cylindrical member. For example, the second magnets 124 are provided in plurality on the outer peripheral surface of the second rotor core 123. The second member to be detected 125 is used to detect a rotation angle of the second rotor core 123. For example, the second member to be detected 125 is a ring-shaped member, and rotates together with the second rotor core 123.

Figure 52:
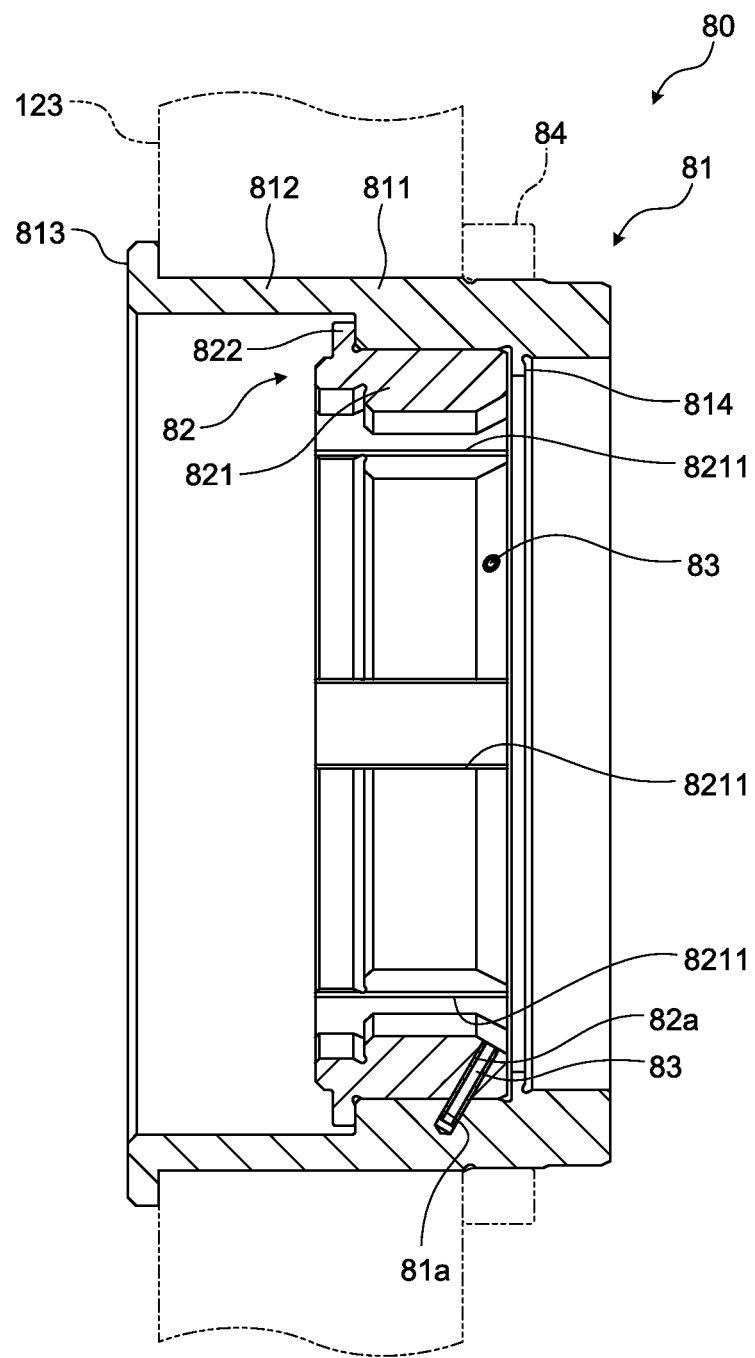
FIG. 52 is an enlarged cross-sectional view of a second rotor holding member in FIG. 50.

FIG. 52 is an enlarged cross-sectional view of the second rotor holding member in FIG. 50. The second rotor holding member 80 is a member configured to support the second rotor core 123 such that the second rotor core 123 can rotate about the rotation axis R. As illustrated in FIG. 50, the second rotor holding member 80 is supported by the clutch device 60 through a bearing 52 and coupled to the first ring gear 24. As illustrated in FIG. 52, the second rotor holding member 80 includes a second outer member 81, a second inner member 82, a second pin 83, and a second positioning ring 84.

The second outer member 81 is a member formed of third metal. For example, the third metal is an aluminum alloy. A protrusion provided to one of the inner peripheral surface of the second rotor core 123 and the outer peripheral surface of the second outer member 81 is fitted to a recess provided to the other. In other words, the second rotor core 123 and the second outer member 81 are coupled by what is called spigot joint. As illustrated in FIG. 52, the second outer member 81 includes a thick portion 811, a thin portion 812, a flange 813, and a projection 814. The thick portion 811, the thin portion 812, the flange 813, and the projection 814 are integrally formed. The thick portion 811 is a cylindrical member, and is in contact with the inner peripheral surface of the second rotor core 123 and the outer peripheral surface of the second inner member 82. The thick portion 811 is provided with a second recess 81a. For example, the second recess 81a is a columnar recess. The thin portion 812 is a cylindrical member, and is in contact with the inner peripheral surface of the second rotor core 123. The thin portion 812 is disposed on the side opposite to the partition G11 across the thick portion 811. The thickness of the thin portion 812 is smaller than the thickness of the thick portion 811. The flange 813 is a ring-shaped member that protrudes in the radial direction from an end portion of the thin portion 812 on the opposite side of the thick portion 811. The flange 813 is used to position the second rotor core 123. The projection 814 is a ring-shaped member that protrudes in the radial direction from the inner peripheral surface of the thick portion 811. The projection 814 is in contact with the bearing 52. The projection 814 is used to position the bearing 52.

The second inner member 82 is a member formed of fourth metal. The fourth metal is metal having specific gravity larger than the specific gravity of the above-mentioned third metal, and is, for example, carbon steel. As illustrated in FIG. 52, the second inner member 82 includes a fitting portion 821 and a flange 822. The fitting portion 821 and the flange 822 are integrally formed. The fitting portion 821 is a cylindrical member, and includes a plurality of recesses 8211 on its inner peripheral surface. The recesses 8211 are fitted to protrusions provided on the outer peripheral surface of the first ring gear 24. The fitting portion 821 is provided with a second hole 82a. For example, the second hole 82a is a columnar through hole having a diameter equal to the diameter of the second recess 81a of the thick portion 811, and overlaps with the second recess 81a. The flange 822 is a ring-shaped member that protrudes in the radial direction from the outer peripheral surface of the fitting portion 821. The flange 822 is in contact with a step between the thick portion 811 and the thin portion 812. The flange 822 is used to position the second inner member 82.

The second pin 83 is a member configured to facilitate the transmission of torque between the second outer member 81 and the second inner member 82. The second pin 83 is disposed at a position that straddles the second recess 81a and the second hole 82a. For example, the second pin 83 is a columnar pin having a diameter substantially equal to the diameters of the second recess 81a and the second hole 82a. For example, the second inner member 82 is fixed to the second outer member 81 by press-fitting. More specifically, the fitting portion 821 is fixed to the inner peripheral surface of the thick portion 811 by shrink-fitting. Accordingly, frictional force is generated between the outer peripheral surface of the fitting portion 821 and the inner peripheral surface of the thick portion 811, and hence a certain degree of torque is transmitted between the second outer member 81 and the second inner member 82. However, the thick portion 811 is an aluminum alloy, and hence it is difficult to increase the frictional force caused between the outer peripheral surface of the fitting portion 821 and the inner peripheral surface of the thick portion 811. Thus, after the second outer member 81 and the second inner member 82 are fixed, the second pin 83 is press-fitted toward the second recess 81a from the second hole 82a. Accordingly, torque is transmitted between the second outer member 81 and the second inner member 82 through the second pin 83. In this case, shearing force is generated on the second pin 83. By providing the second pin 83, torque is more easily transmitted between the second outer member 81 and the second inner member 82 as compared with the case where the second outer member 81 and the second inner member 82 are fixed only by press-fitting. The second recess 81a is disposed on the radially outer side of the second hole 82a, and hence the second pin 83 is prevented from falling off due to centrifugal force.

The second positioning ring 84 is a member configured to position the second rotor core 123. The second rotor core 123 is positioned by being sandwiched by the second positioning ring 84 and the flange 813. For example, the second positioning ring 84 is a ring-shaped member formed of an aluminum alloy. For example, the second positioning ring 84 is fitted to the outer peripheral surface of the thick portion 811 by press-fitting. More specifically, the second positioning ring 84 is disposed at a position overlapping with the fitting portion 821 in the radial direction. A part of the thick portion 811 that overlaps with the fitting portion 821 in the radial direction is less likely to be deformed by force in the radial direction than a part of the thick portion 811 that does not overlap with the fitting portion 821. Consequently, because the second positioning ring 84 is disposed at a position overlapping with the fitting portion 821 in the radial direction, it is easy to increase press-fitting force for press-fitting the second positioning ring 84 to the thick portion 811.

Figure 53:
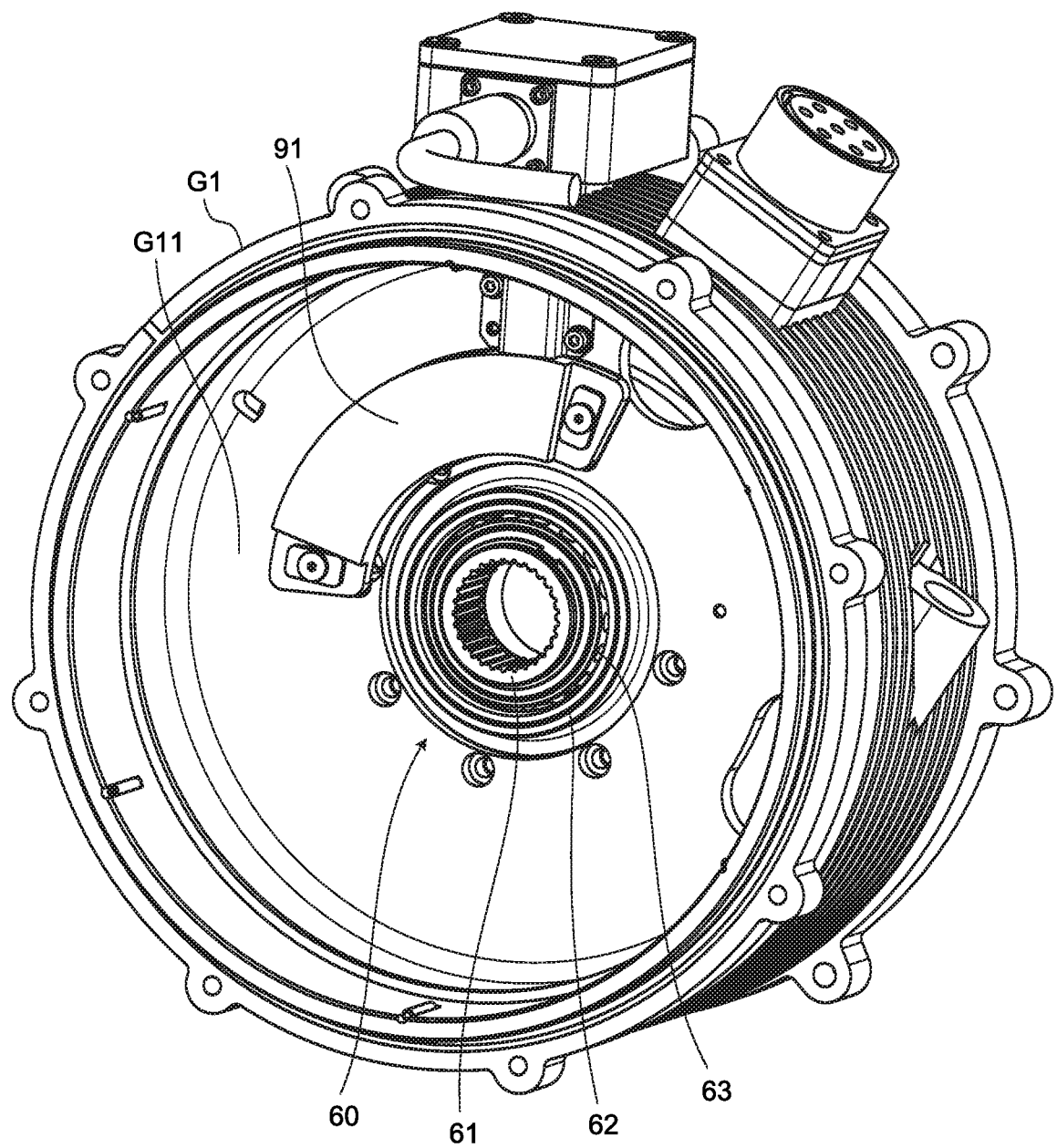
FIG. 53 is a perspective view of a partition, a clutch device, and a first rotation angle detector as seen from the first motor side.
Figure 54:
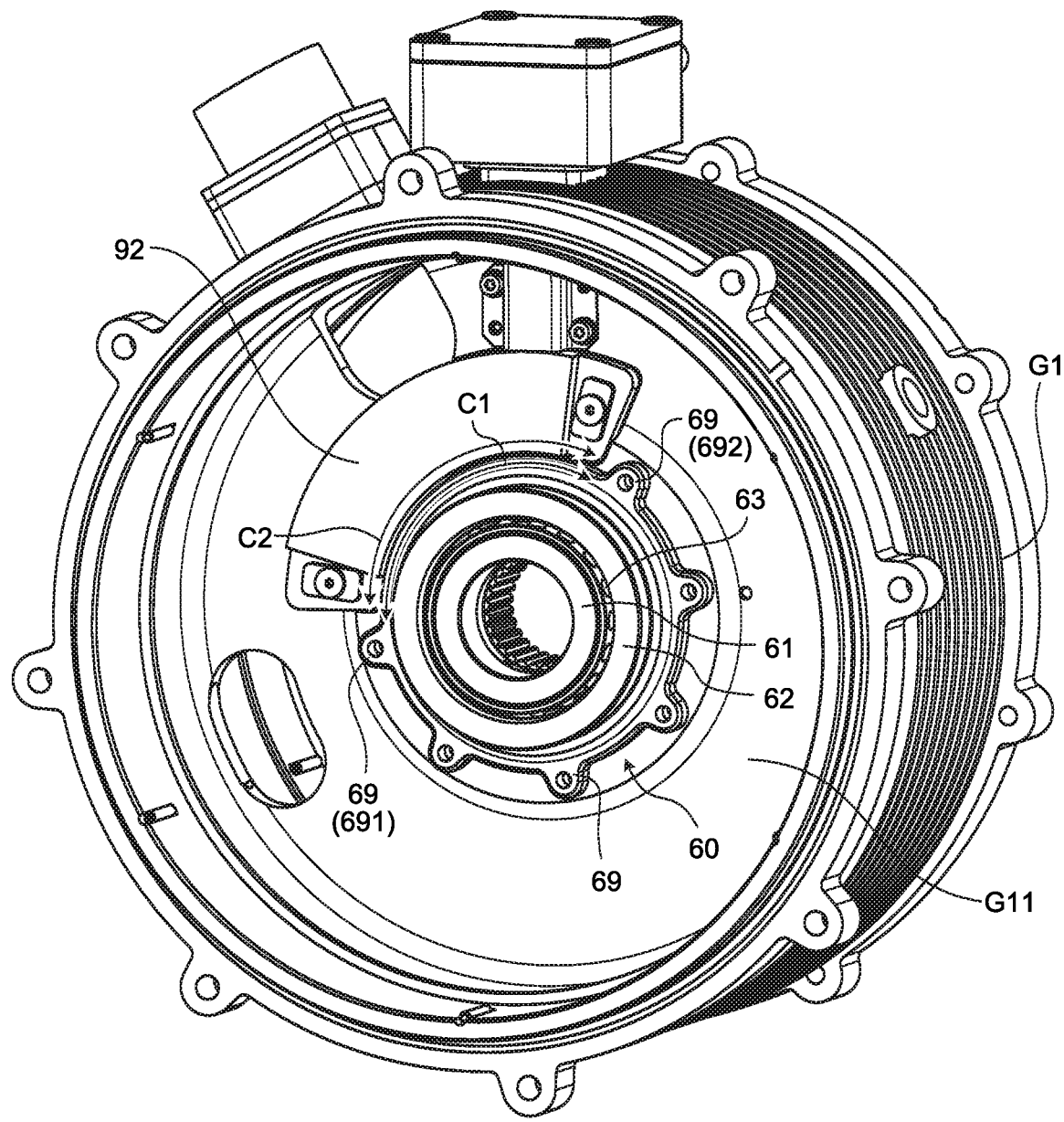
FIG. 54 is a perspective view of the partition, the clutch device, and a second rotation angle detector as seen from the second motor side.
Figure 55:
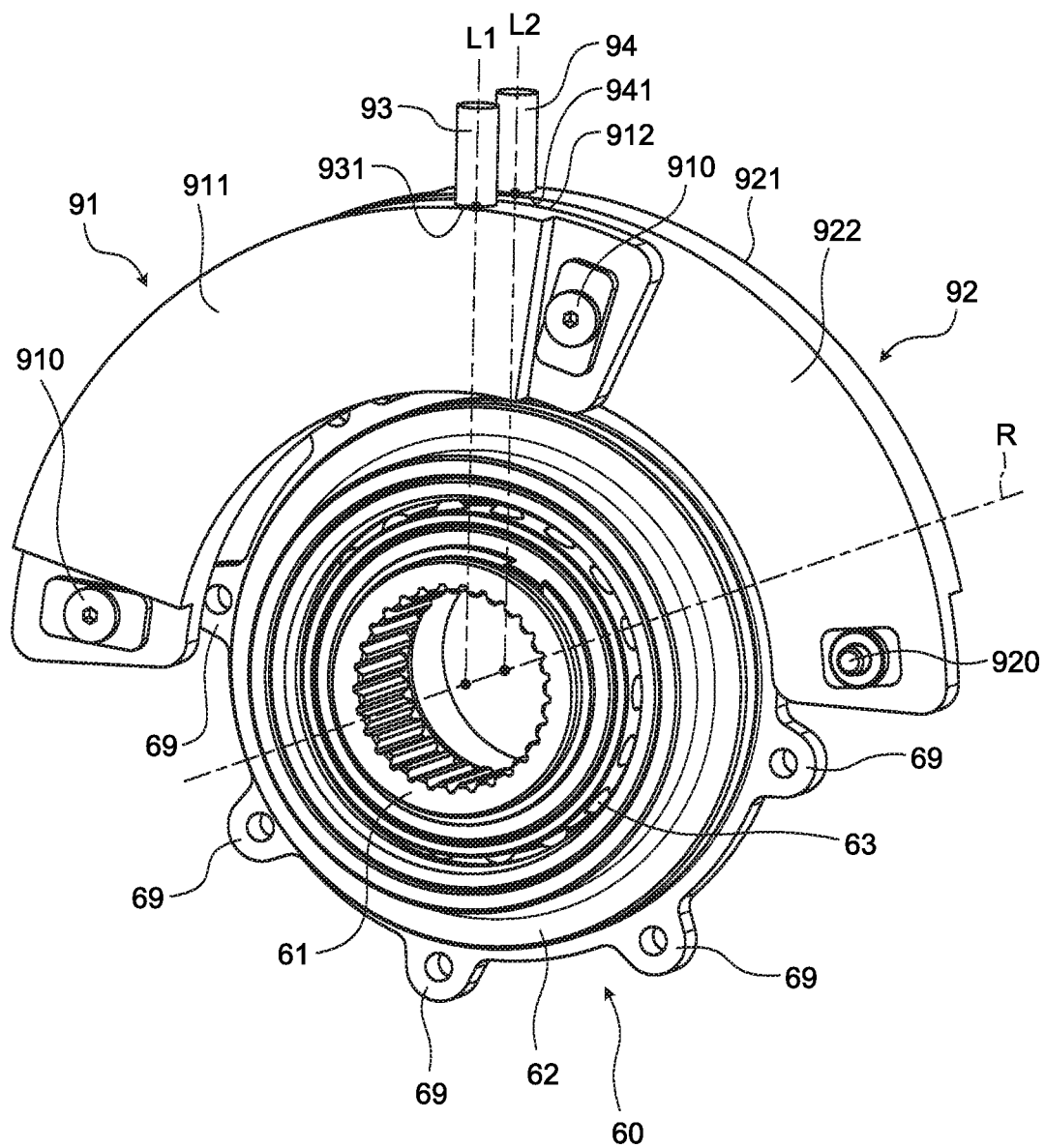
FIG. 55 is a perspective view of the clutch device and the first rotation angle detector as seen from the first motor side.
Figure 56:
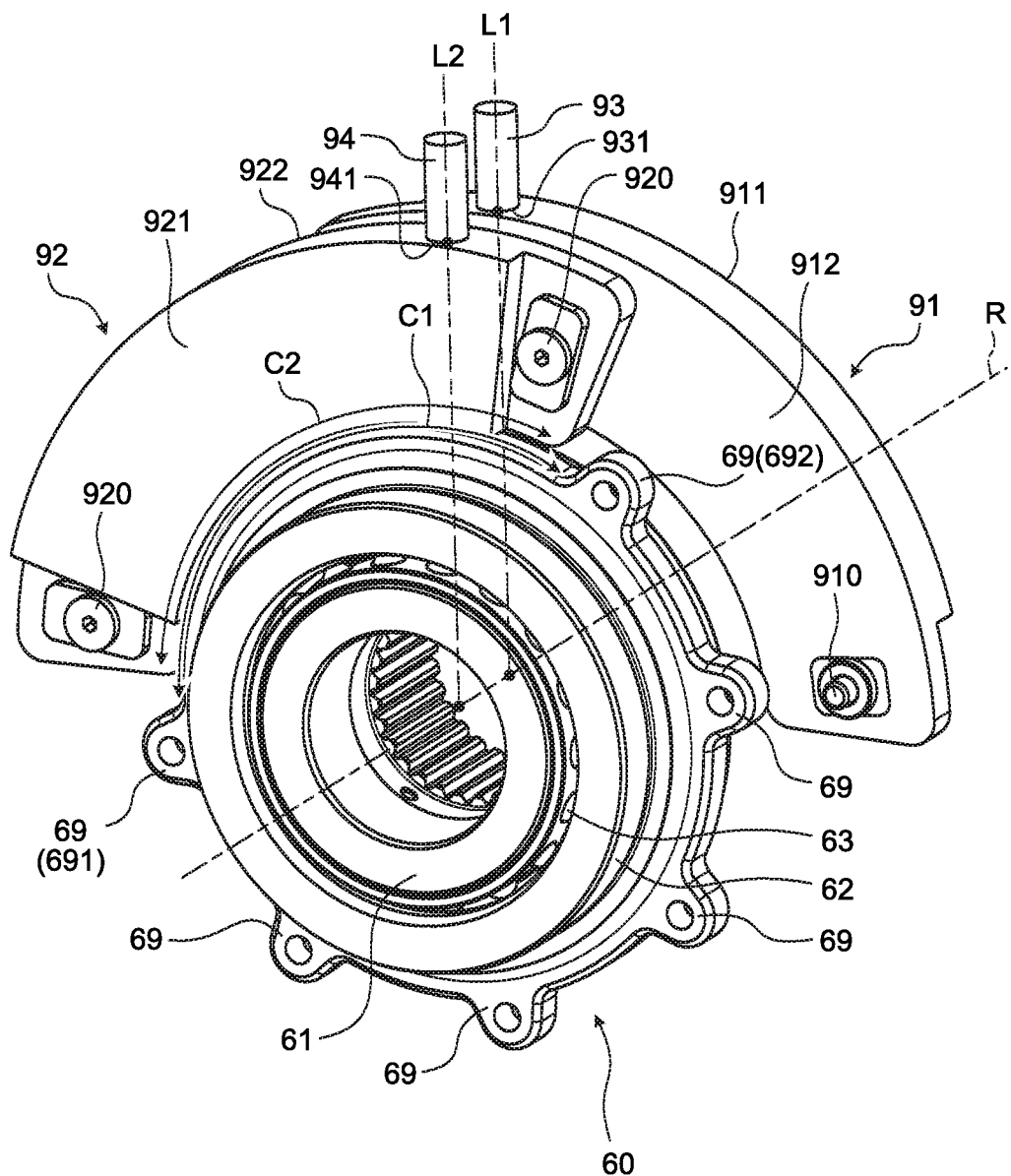
FIG. 56 is a perspective view of the clutch device and the second rotation angle detector as seen from the second motor side.
Figure 57:
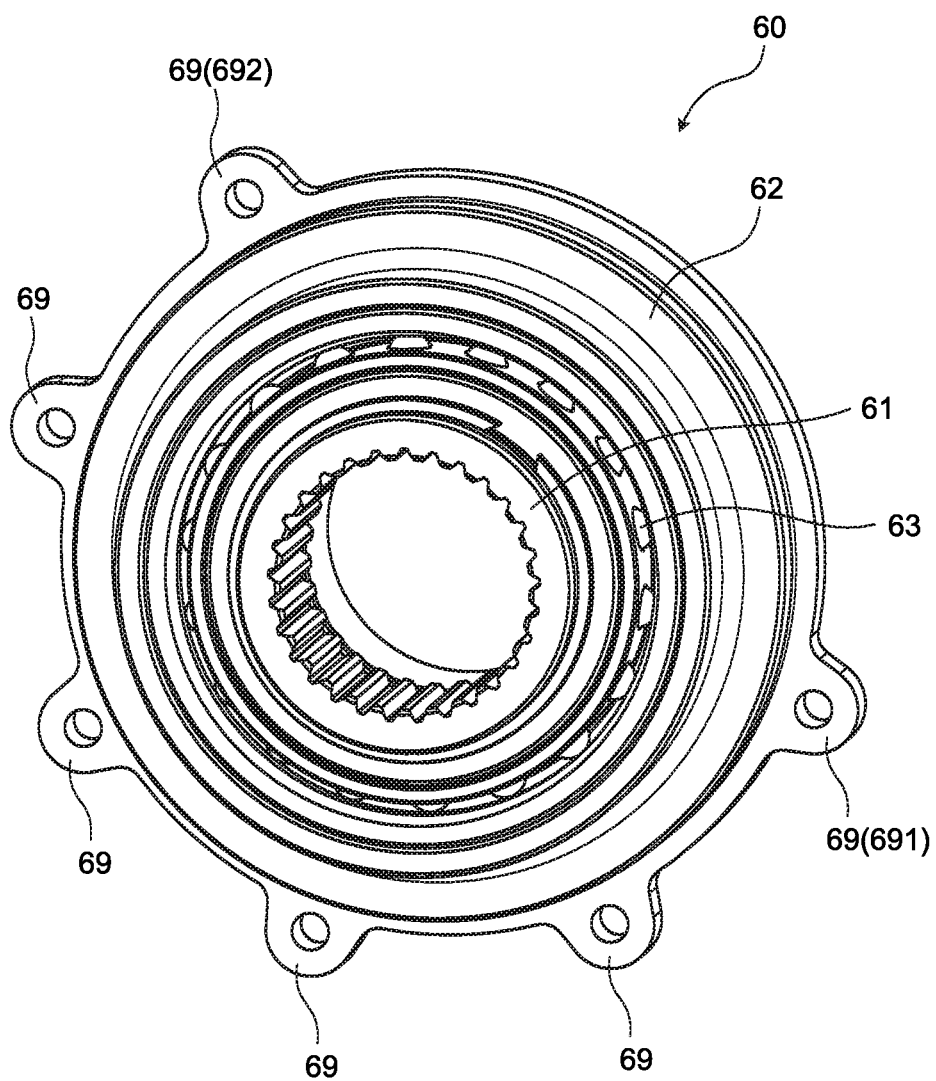
FIG. 57 is a perspective view of the clutch device as seen from the first motor side.
Figure 58:
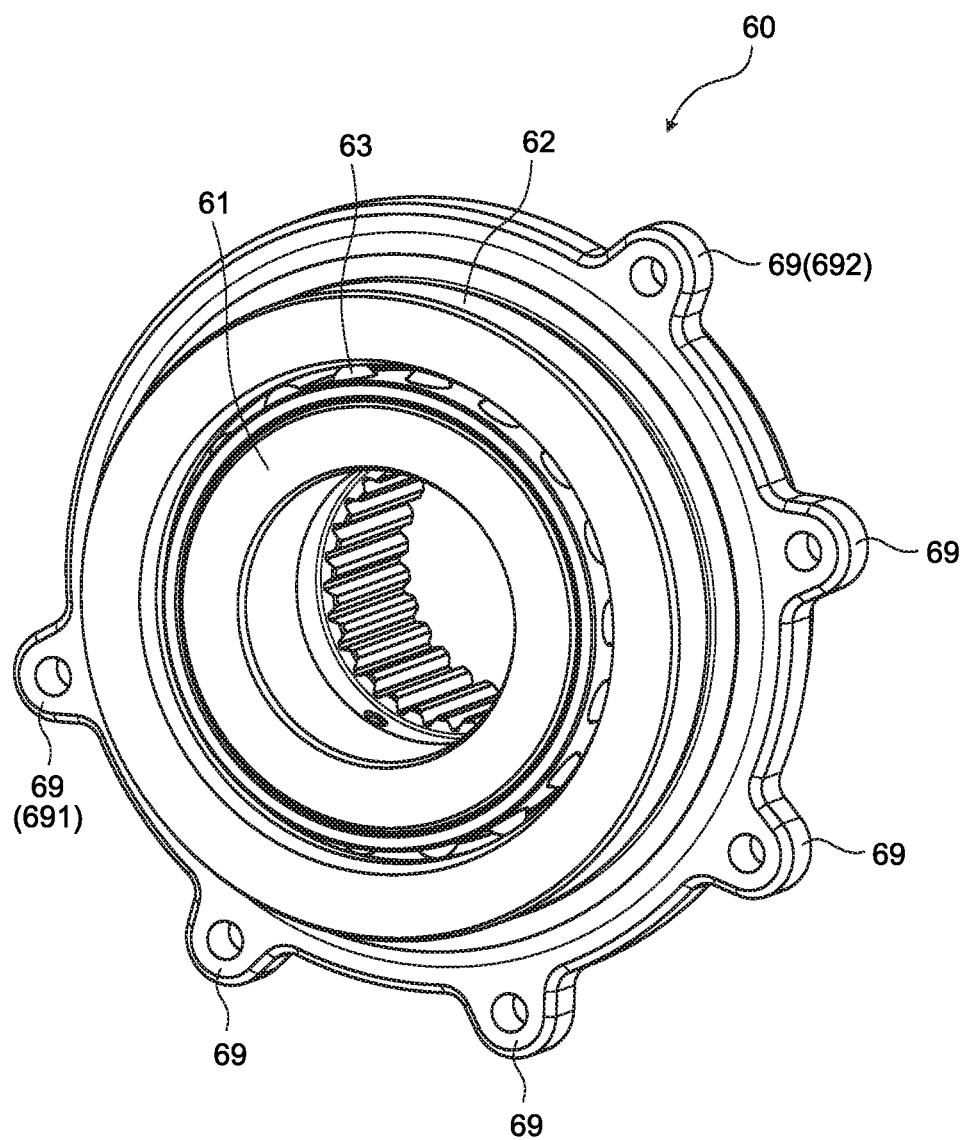
FIG. 58 is a perspective view of the clutch device as seen from the second motor side.

FIG. 53 is a perspective view of the partition, the clutch device, and the first rotation angle detector as seen from the first motor side. FIG. 54 is a perspective view of the partition, the clutch device, and the second rotation angle detector as seen from the second motor side. FIG. 55 is a perspective view of the clutch device and the first rotation angle detector as seen from the first motor side. FIG. 56 is a perspective view of the clutch device and the second rotation angle detector as seen from the second motor side. FIG. 57 is a perspective view of the clutch device as seen from the first motor side. FIG. 58 is a perspective view of the clutch device as seen from the second motor side.

As illustrated in FIG. 53 and FIG. 54, the clutch device 60 is fixed to the partition G11. As illustrated in FIG. 53 to FIG. 58, the clutch device 60 is what is called a cam clutch device, and includes an inner race 61, an outer race 62, and a roller 63. The inner race 61 is coupled to the first carrier 23. Specifically, splines are provided on the inner peripheral surface of the inner race 61, and the splines are fitted to splines provided on the outer peripheral surface of the first carrier 23. The outer race 62 is coupled to the partition G11. The roller 63 is disposed between the inner race 61 and the outer race 62. The roller 63 is supported by the inner race 61, and rotates together with the inner race 61. When the inner race 61 rotates in a first direction, the roller 63 is engaged with the outer race 62. Accordingly, the inner race 61 cannot rotate, and the first carrier 23 cannot rotate. On the other hand, when the inner race 61 rotates in a second direction, the roller 63 is not engaged with the outer race 62. In this manner, the inner race 61 can rotate, and hence the first carrier 23 can also rotate.

More specifically, the outer race 62 includes a plurality of flange portions 69. The flange portions 69 protrude in the radial direction from the outer race 62 and are opposed to the partition G11. For example, the flange portions 69 are arranged along the circumferential direction. The flange portions 69 are fastened to the partition G11 by bolts. As illustrated in FIG. 54 and FIG. 56, a distance C1 from a flange portion 69 located at one end in the circumferential direction to a flange portion 69 located at the other end is larger than intervals between the other flange portions 69. In other words, the flange portions 69 are disposed eccentrically in part in the circumferential direction. In this manner, the clutch device 60 is reduced in weight as compared with the flange portions 69 are disposed at equal intervals over the entire circumference of the outer race 62.

As illustrated in FIG. 53 and FIG. 54, the first rotation angle detector 91 and the second rotation angle detector 92 are fixed to the partition G11. In this manner, the length of the case G1 in the axial direction is reduced as compared with the case where the vicinity of the partition G11 is dead space. The first rotation angle detector 91 is opposed to the first member to be detected 115 illustrated in FIG. 50. The first rotation angle detector 91 can detect magnetic flux of the first member to be detected 115 to calculate an absolute angle (absolute electric angle in one pole pair) of the first rotor core 113. The second rotation angle detector 92 is opposed to the second member to be detected 125 illustrated in FIG. 50. The second rotation angle detector 92 can detect magnetic flux of the second member to be detected 125 to calculate an absolute angle of the second rotor core 123. The control unit 1 illustrated in FIG. 1 controls currents caused to flow through the first coil 112 and the second coil 122 based on the absolute angle of the first rotor core 113 detected by the first rotation angle detector 91 and the absolute angle of the second rotor core 123 detected by the second rotation angle detector 92.

As illustrated in FIG. 53, FIG. 55, and FIG. 56, the first rotation angle detector 91 has a belt-like shape along the circumferential direction. For example, when viewed from the axial direction, the outer peripheral surface of the first rotation angle detector 91 draws a sector arc having a central angle of about 90°. As illustrated in FIG. 55 and FIG. 56, the first rotation angle detector 91 is fixed to the partition G11 by fastening members 910 provided at both ends in the circumferential direction. A first surface 911 (front surface) of the first rotation angle detector 91 is opposed to the first member to be detected 115, and a second surface 912 (rear surface) of the first rotation angle detector 91 is opposed to the partition G11.

As illustrated in FIG. 55 and FIG. 56, the first rotation angle detector 91 is connected to a first signal line 93 for outputting an electric signal. One end of the first signal line 93 is connected to the outer peripheral surface of the first rotation angle detector 91, and the other end of the first signal line 93 is disposed outside the case G. For example, the first signal line 93 is connected to one end of the outer peripheral surface of the first rotation angle detector 91 in the circumferential direction. More specifically, when viewed from the first surface 911 side, the connection position of the first signal line 93 with respect to the first rotation angle detector 91 is shifted in the clockwise direction from the circumferential center of the outer peripheral surface of the first rotation angle detector 91.

As illustrated in FIG. 54 to FIG. 56, the second rotation angle detector 92 has a belt-like shape along the circumferential direction similarly to the first rotation angle detector 91. As illustrated in FIG. 55 and FIG. 56, the second rotation angle detector 92 is fixed to the partition G11 by fastening members 920 provided at both ends in the circumferential direction. A first surface 921 (front surface) of the second rotation angle detector 92 is opposed to the second member to be detected 125, and a second surface 922 (rear surface) of the second rotation angle detector 92 is opposed to the partition G11. As illustrated in FIG. 54, the second rotation angle detector 92 is disposed along the outer race 62 in the clutch device 60. As illustrated in FIG. 54 and FIG. 56, a length C2 of the inner peripheral surface of the second rotation angle detector 92 in the circumferential direction is smaller than the distance C1 from a flange portion 691 to a flange portion 692. In this manner, the second rotation angle detector 92 is disposed between the flange portion 691 and the flange portion 692. Thus, the second rotation angle detector 92 is easily located on the radially inner side. Consequently, the second rotation angle detector 92 can be easily downsized.

As illustrated in FIG. 55 and FIG. 56, the second rotation angle detector 92 is connected to a second signal line 94 for outputting an electric signal. One end of the second signal line 94 is connected to the outer peripheral surface of the second rotation angle detector 92, and the other end of the second signal line 94 is disposed outside the case G. For example, the second signal line 94 is connected to one end of the outer peripheral surface of the second rotation angle detector 92 in the circumferential direction. More specifically, when viewed from the first surface 921 side, the connection position of the second signal line 94 with respect to the second rotation angle detector 92 is shifted in the clockwise direction from the circumferential center of the outer peripheral surface of the second rotation angle detector 92. When viewed in the axial direction, a first straight line L1 passing through a root 931 of the first signal line 93 on the first rotation angle detector 91 side and the rotation axis R overlaps with a second straight line L2 passing through a root 941 of the second signal line 94 on the second rotation angle detector 92 side and the rotation axis R.

Figure 59:
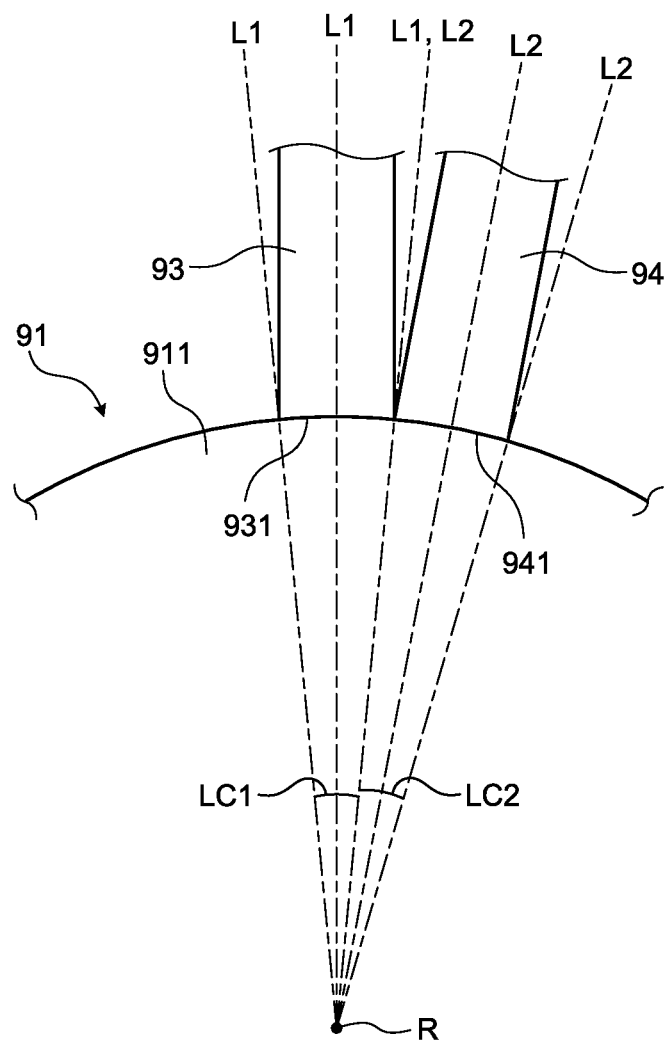
FIG. 59 is a schematic diagram illustrating an example of the position of a second signal line with respect to the position of a first signal line.

The first straight line L1 passing through the center of the root 931 as illustrated in FIG. 55 and FIG. 56 is not necessarily required to overlap with the second straight line L2 passing through the center of the root 941. FIG. 59 is a schematic diagram illustrating an example of the position of the second signal line 94 with respect to the position of the first signal line 93. As illustrated in FIG. 59, when viewed in the axial direction, a first straight line L1 passing through an end portion of the root 931 may overlap with a second straight line L2 passing through an end portion of the root 941. Specifically, when viewed in the axial direction, an angle range LC1 of first straight lines L1 and an angle range LC2 of second straight lines L2 around the rotation axis R only need to contact or overlap with each other such that one of the first straight lines L1 overlaps with at least one of the second straight lines L2.

The first rotation angle detector 91 and the second rotation angle detector 92 are disposed as described above, and hence the second rotation angle detector 92 is shifted from the first rotation angle detector 91 in the circumferential direction. In other words, when viewed from the axial direction, a part of the second rotation angle detector 92 overlaps with the first rotation angle detector 91, and the other part of the second rotation angle detector 92 does not overlap with the first rotation angle detector 91. Thus, the fastening member 920 is shifted from the fastening member 910 in the circumferential direction, and hence the fastening member 920 and the fastening member 910 can be prevented from interfering with each other.

The first metal and the third metal are not necessarily required to be aluminum alloys, and may be other metals such as a magnesium alloy. The first metal and the third metal may be metals different from each other. The second metal and the fourth metal are not necessarily required to be carbon steel, and may be other metals such as alloy steel. The second metal and the fourth metal may be metals different from each other.

The shapes of the first recess 71a, the first hole 72a, the second recess 81a, and the second hole 82a are not necessarily required to be columnar, and may be prismatic, for example. The first pin 73 is not necessarily required to be columnar, and only needs to have a shape that is fitted to the first recess 71a and the first hole 72a. The second pin 83 is not necessarily required to be columnar, and only needs to have a shape that is fitted to the second recess 81a and the second hole 82a.

The second rotation angle detector 92 is not necessarily required to be disposed between the flange portion 691 and the flange portion 692, and the first rotation angle detector 91 may be disposed between the flange portion 691 and the flange portion 692. In this case, the flange portion 69 is opposed to the surface of the partition G11 on the first motor 11 side. Neither of the first rotation angle detector 91 and the second rotation angle detector 92 may be disposed between the flange portion 691 and the flange portion 692. In this case, it is only necessary to provide the flange portion 69 opposed to the surface of the partition G11 on the first motor 11 side and the flange portion 69 opposed to the surface of the partition G11 on the second motor 12 side.

As described above, higher torque can be output in the first state by controlling the first motor 11 and the second motor 12 based on torque, setting the rotation direction of the first motor 11 to the positive rotation direction, and setting the rotation direction of the second motor 12 to the reverse rotation direction.

By controlling the first motor 11 based on torque and controlling the second motor 12 based on rotation speed in accordance with the rotation speed of the first motor 11 in the second state, the operation of the second motor 12 can be linked with the first motor 11 in accordance with the rotation direction and the rotation speed of the first motor 11 without the need of designing a complicated control system for linking the operation of the second motor 12 with the first motor 11. In the second state, higher rotation speed can be output.

The first state and the second state can be freely switched at desired timing while suppressing what is called gear change shock when the first state and the second state are switched.

When the second state shifts to the first state, the clutch device 60 shifts from the non-braking state to the braking state, and the control unit 1 operates the first motor 11 with the first shift value ($T^t_{MA}$) and operates the second motor 12 with the second shift value ($T^t_{MB}$) until the clutch device 60 shifts from the non-braking state to the braking state. In this manner, when the clutch device 60 shifts from the non-braking state to the braking state, mechanical impact caused in the clutch device 60 can be suppressed. The sense of abrupt acceleration can be prevented from being generated in the vehicle.

After the clutch device 60 shifts to the braking state, the control unit gradually increases the torque command value of the first motor 11 for the positive rotation direction from the first shift value ($T^t_{MA}$), and gradually increases the torque command value of the second motor 12 for the reverse rotation direction from the second shift value ($T^t_{MB}$). In this manner, the first motor 11 and the second motor 12 can be more gradually accelerated after the clutch device 60 becomes the braking state. Consequently, the sense of abrupt acceleration can be prevented from being generated in the vehicle after the shift from the second state to the first state.

When the gear change information indicates the first state and when the torque command value of the second motor 12 for the reverse rotation direction determined based on the throttle information is less than a lower limit value, the control unit sets the torque command value of the second motor 12 for the reverse rotation direction to the lower limit value. Consequently, in the first state, the braking state of the clutch device 60 can be maintained irrespective of the throttle information. Thus, in the first state, the switching between the non-braking state and the braking state does not occur in the clutch device 60, and the occurrence of the mechanical influence such as shock and rattle noise caused by the switching can be suppressed.

When the gear change information indicates the first state and when the torque command value of the second motor for the reverse rotation direction determined based on the throttle information is equal to or larger than the lower limit value, the control unit sets the absolute values of the torque command value of the first motor 11 and the torque command value of the second motor 12 to the same. Consequently, the calculation of the torque command value of the first motor 11 and the torque command value of the second motor 12 can be more simplified.

Furthermore, the electric vehicle drive device 10 includes the first motor 11, the second motor 12, and the transmission mechanism 13 coupled to the first motor 11 and the second motor 12 and capable of switching the reduction ratio. The transmission mechanism 13 includes the sun gear shaft 14 coupled to the first motor 11, the first sun gear 21 configured to rotate together with the sun gear shaft 14, the first pinion gear 22 engaged with the first sun gear 21, and the first ring gear 24 engaged with the first pinion gear 22 and coupled to the second motor 12. The first motor 11 includes the first stator core 111, the first rotor core 113 disposed on the radially inner side of the first stator core 111, and the first rotor holding member 70 that couples the first rotor core 113 and the sun gear shaft 14 to each other. The first rotor holding member 70 includes the first outer member 71 in contact with the first rotor core 113 and the first inner member 72 in contact with the sun gear shaft 14. The material of the first outer member 71 is first metal, and the material of the first inner member 72 is second metal having specific gravity larger than the specific gravity of the first metal.

Consequently, wear of the first inner member 72 is suppressed because the material of the first inner member 72 in contact with the sun gear shaft 14 is the second metal having relatively large specific gravity. On the other hand, the increase in weight of the first rotor holding member 70 is suppressed because the material of the first outer member 71, which tends to have a volume larger than the first inner member 72, is the first metal having relatively small specific gravity. Thus, the electric vehicle drive device 10 is reduced in weight. Therefore, the electric vehicle drive device 10 can include the transmission mechanism 13 and reduce the unsprung weight of the electric vehicle.

Furthermore, in the electric vehicle drive device 10, the first rotor holding member 70 includes the first pin 73 disposed at a position that straddles the first recess 71a provided to the first outer member 71 and the first hole 72a provided to the first inner member 72 and overlapping with the first recess 71a.

Consequently, torque is more easily transmitted between the first outer member 71 and the first inner member 72 as compared with the case where the first outer member 71 and the first inner member 72 are fixed only by press-fitting. The first recess 71a is located on the radially outer side of the first hole 72a, and hence the first pin 73 is prevented from falling off due to centrical force.

Furthermore, in the electric vehicle drive device 10, the first outer member 71 includes the outer tubular portion 711 in contact with the first rotor core 113, the inner tubular portion 712 in contact with the first inner member 72, the coupling portion 713 that couples the outer tubular portion 711 and the inner tubular portion 712 to each other, and the rib 714 that protrudes from the coupling portion 713 along the axial direction. The first rotor holding member 70 includes the first positioning ring 74 that is fitted to the outer peripheral surface of the outer tubular portion 711 and in contact with the first rotor core 113 at a position closer to the rib 714 than the first rotor core 113 is.

Consequently, the first rotor core 113 is positioned by the first positioning ring 74. The rigidity of the outer tubular portion 711 in the vicinity of the rib 714 is relatively high. Thus, because the first positioning ring 74 is disposed at a position closer to the rib 714 than the first rotor core 113 is, it is easy to increase press-fitting force for press-fitting the first positioning ring 74 to the outer tubular portion 711. Consequently, the falling-off of the first positioning ring 74 is suppressed.

Furthermore, in the electric vehicle drive device 10, the second motor 12 includes the second stator core 121, the second rotor core 123 disposed on the radially inner side of the second stator core 121, and the second rotor holding member 80 that couples the second rotor core 123 and the first ring gear 24 to each other. The second rotor holding member 80 includes the second outer member 81 in contact with the second rotor core 123 and the second inner member 82 in contact with the first ring gear 24. The material of the second outer member 81 is third metal, and the material of the second inner member 82 is fourth metal having specific gravity larger than the specific gravity of the third metal.

Consequently, wear of the second inner member 82 is suppressed because the material of the second inner member 82 in contact with the first ring gear 24 is the fourth metal having relatively large specific gravity. On the other hand, the increase in weight of the second rotor holding member 80 is suppressed because the material of the second outer member 81, which tends to have a volume larger than the second inner member 82, is the third metal having relatively small specific gravity. Thus, the electric vehicle drive device 10 is reduced in weight. Therefore, the electric vehicle drive device 10 can include the transmission mechanism 13 and reduce the unsprung weight of the electric vehicle.

Furthermore, in the electric vehicle drive device 10, the second rotor holding member 80 includes the second pin 83 disposed at a position that straddles the second recess 81a provided to the second outer member 81 and the second hole 82a provided to the second inner member 82 and overlapping with the second recess 81a.

Consequently, torque is more easily transmitted between the second outer member 81 and the second inner member 82 as compared with the case where the second outer member 81 and the second inner member 82 are fixed only by press-fitting. The second recess 81a is located on the radially outer side of the second hole 82a, and hence the second pin 83 is prevented from falling off due to centrifugal force.

Furthermore, in the electric vehicle drive device 10, the second rotor holding member 80 includes the second positioning ring 84 that is fitted to the outer peripheral surface of the second outer member 81 and in contact with the second rotor core 123 at a position overlapping with the second inner member 82 in the radial direction of the second motor 12.

Consequently, the second rotor core 123 is positioned by the second positioning ring 84. The rigidity of a part of the second outer member 81 that overlaps with the second inner member 82 in the radial direction is relatively high. Thus, because the second positioning ring 84 is disposed at a position overlapping with the second inner member 82 in the radial direction, it is easy to increase press-fitting force for press-fitting the second positioning ring 84 to the second outer member 81. Consequently, the falling-off of the second positioning ring 84 is suppressed.

The increase/decrease amount of the rotation angle of the first motor 11 detected by the first rotation angle detector 91 is processed by the filtering unit 95 so as to be converged, and hence the processed increase/decrease amount of the rotation speed indicated by the detection result of the rotation speed of the first motor 11 can be reduced as compared with the actual increase/decrease amount of the rotation speed of the first motor 11. Thus, the increase/decrease amount of the rotation speed of the second motor 12 can be reduced more, and the occurrence of mechanical vibration caused by increase/decrease of the rotation speed can be suppressed.

In the electric vehicle drive device 10 provided on the assumption that the one-way clutch does not brake the rotation in the positive rotation direction, the second ring gear 34 can be rotated in the reverse rotation direction braked by the one-way clutch. Consequently, irrespective of whether the positive rotation direction or the reverse rotation direction is the forward direction, the electric vehicle drive device 10 capable of backward movement can be provided.

Furthermore, the control unit 1 determines the rotation speed ($N_{MA}$) of the first motor 11 and the rotation speed ($N_{MB}$) of the second motor 12 such that the rotation speed ($N_{MB}$) of the second motor 12 takes a median value in the range in Equation (1), and hence the deviation from the relation between the rotation speed ($N_{MA}$) of the first motor 11 and the rotation speed ($N_{MB}$) of the second motor 12 capable of backward movement can be more reliably suppressed.

Furthermore, the reduction ratio ($i_1$) of the first planetary gear mechanism 20 is determined by the number of teeth ($Z_{B1}$) of the first sun gear 21 and the number of teeth ($Z_{R1}$) of the first ring gear 24, and the reduction ratio ($i_2$) of the second planetary gear mechanism 30 is determined by the number of teeth ($Z_{B2}$) of the second sun gear 31 and the number of teeth ($Z_{R2}$) of the second ring gear 34. Consequently, by freely determining the numbers of teeth, the relation of the rotation speed ($N_{MA}$) of the first motor 11 and the rotation speed ($N_{MB}$) of the second motor 12 indicated by Equation (1) can be freely determined.

Furthermore, when the rotation direction of the wheel H and the rotation direction of the first motor 11 are the same as in the second embodiment, the backward movement can be performed by setting the relation of the rotation speed ($N_{MA}$) of the first motor 11 and the rotation speed ($N_{MB}$) of the second motor 12 as indicated by Equation (1).

Furthermore, in the electric vehicle drive device 10 in which the backward movement can be performed by setting the relation of the rotation speed ($N_{MA}$) of the first motor 11 and the rotation speed ($N_{MB}$) of the second motor 12 as indicated by Equation (1), in the forward movement, the rotation directions of the first motor 11 and the second motor 12 and whether to control the second motor 12 based on torque or rotation speed can be determined to suppress the shock during gear change in the forward movement.

Furthermore, the electric vehicle drive device 10 includes the case G1, the first motor 11, the first rotation angle detector 91, the first signal line 93, the second motor 12, the second rotation angle detector 92, the second signal line 94, and the transmission mechanism 13. The case G1 is a cylindrical member including the partition G11 inside. The first motor 11 includes the first rotor core 113 that can rotate about the rotation axis R and the first member to be detected 115 that rotates together with the first rotor core 113. The first rotation angle detector 91 is coupled to the partition G11 and opposed to the first member to be detected 115. The first signal line 93 is connected to the first rotation angle detector 91. The second motor 12 includes the second rotor core 123 that can rotate about the rotation axis R and the second member to be detected 125 that rotates together with the second rotor core 123, and is disposed on the side opposite to the first motor 11 across the partition G11. The second rotation angle detector 92 is coupled to the partition G11 and opposed to the second member to be detected 125. The second signal line 94 is connected to the second rotation angle detector 92. The transmission mechanism 13 is coupled to the first motor 11 and the second motor 12, and can switch the reduction ratio. When viewed from the axial direction, the first straight line L1 passing through the root 931 of the first signal line 93 on the first rotation angle detector 91 side and the rotation axis R overlaps with the second straight line L2 passing through the root 941 of the second signal line 94 on the second rotation angle detector 92 and the rotation axis R.

Accordingly, the first rotation angle detector 91 is fixed on one side of the partition G11, and the second rotation angle detector 92 is fixed on the other side of the partition G11, and hence the distance from the first rotation angle detector 91 to the second rotation angle detector 92 is easily decreased. The first signal line 93 and the second signal line 94 are led out in the same direction, and hence the lengths of the first signal line 93 and the second signal line 94 are easily decreased. Thus, the noise caused in the output of the first signal line 93 and the second signal line 94 is reduced. Consequently, the electric vehicle drive device 10 can reduce the noise caused in the output of the rotation angle detectors while including the transmission mechanism 13.

Furthermore, in the electric vehicle drive device 10, the position of the second rotation angle detector 92 is shifted from the position of the first rotation angle detector 91 in the circumferential direction.

Consequently, even when the first rotation angle detector 91 and the second rotation angle detector 92 are the same device, the position of the fastening member 920 that fixes the second rotation angle detector 92 to the partition G11 is shifted from the position of the fastening member 910 that fixes the first rotation angle detector 91 to the partition G11. Thus, the first rotation angle detector 91 and the second rotation angle detector 92 are easily fixed to the partition G11. The same device can be used for the first rotation angle detector 91 and the second rotation angle detector 92, and hence the cost for mass production is reduced.

In the electric vehicle drive device 10, the transmission mechanism 13 includes: the sun gear shaft 14 coupled to the first motor 11; the first sun gear 21 configured to rotate together with the sun gear shaft 14; the first pinion gear 22 engaged with the first sun gear 21; the first carrier 23 that supports the first pinion gear 22 such that the first pinion gear 22 can rotate and the first pinion gear 22 can revolve about the first sun gear 21; and the clutch device 60 capable of restricting the rotation of the first carrier 23. The clutch device 60 includes the inner race 61 coupled to the first carrier 23, the outer race 62 coupled to the partition G11, and the flange portions 69 protruding from the outer race 62 in the radial direction and opposed to the partition G11. The flange portions 69 are disposed eccentrically in part in the circumferential direction. At least one of the first rotation angle detector 91 and the second rotation angle detector 92 is disposed between the flange portion 691 located at one end in the circumferential direction and the flange portion 692 located at the other end.

Consequently, the outer race 62 is fixed to the partition G11 by the flange portions 69. As compared with the case where the flange portions 69 are disposed at equal intervals over the entire circumference in the circumferential direction, at least one of the first rotation angle detector 91 and the second rotation angle detector 92 is easily located on the radially inner side. Consequently, at least one of the first rotation angle detector 91 and the second rotation angle detector 92 is downsized. Thus, the electric vehicle drive device 10 is reduced in weight.

Modification

Figure 60:
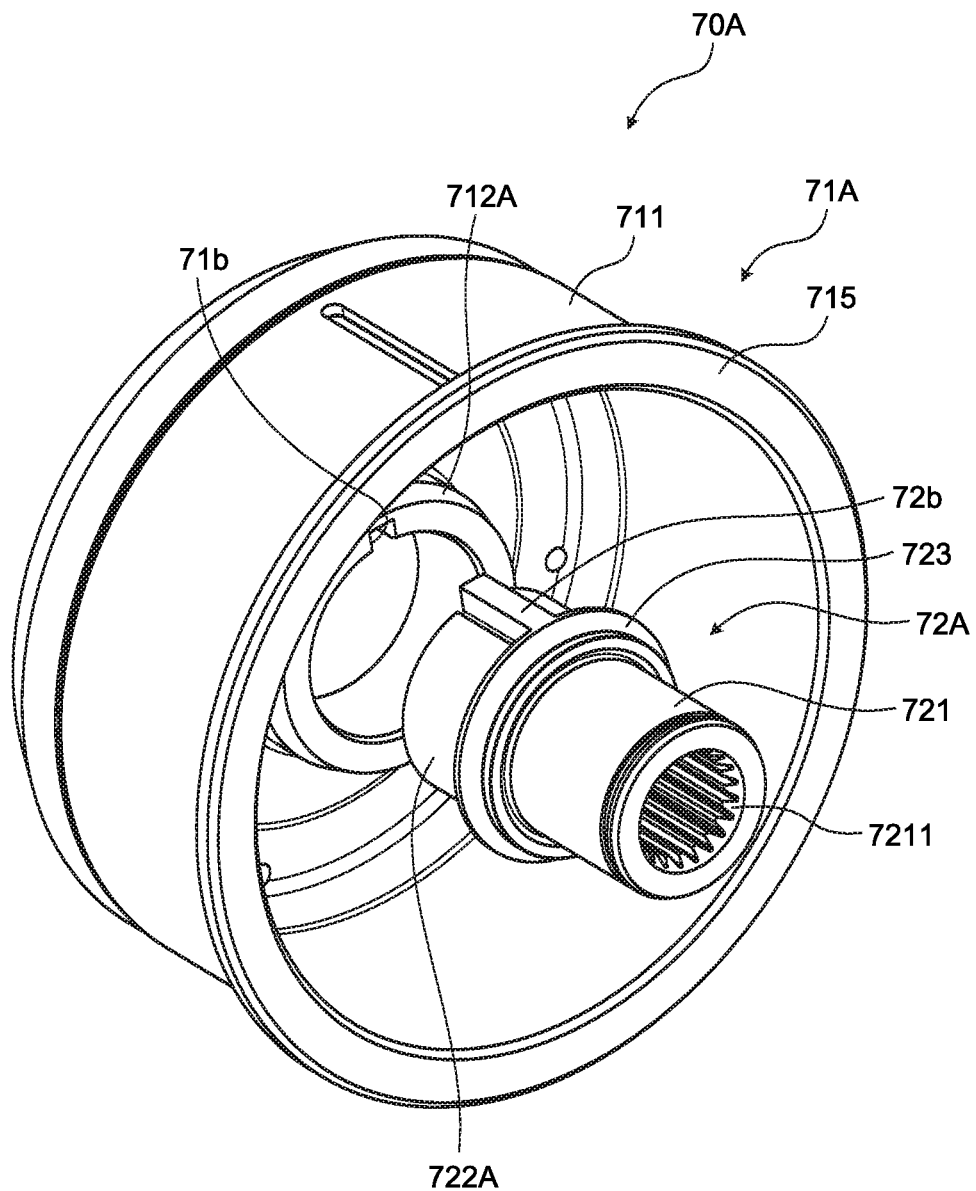
FIG. 60 is a perspective view of a first rotor holding member according to a modification as seen from one side.
Figure 61:
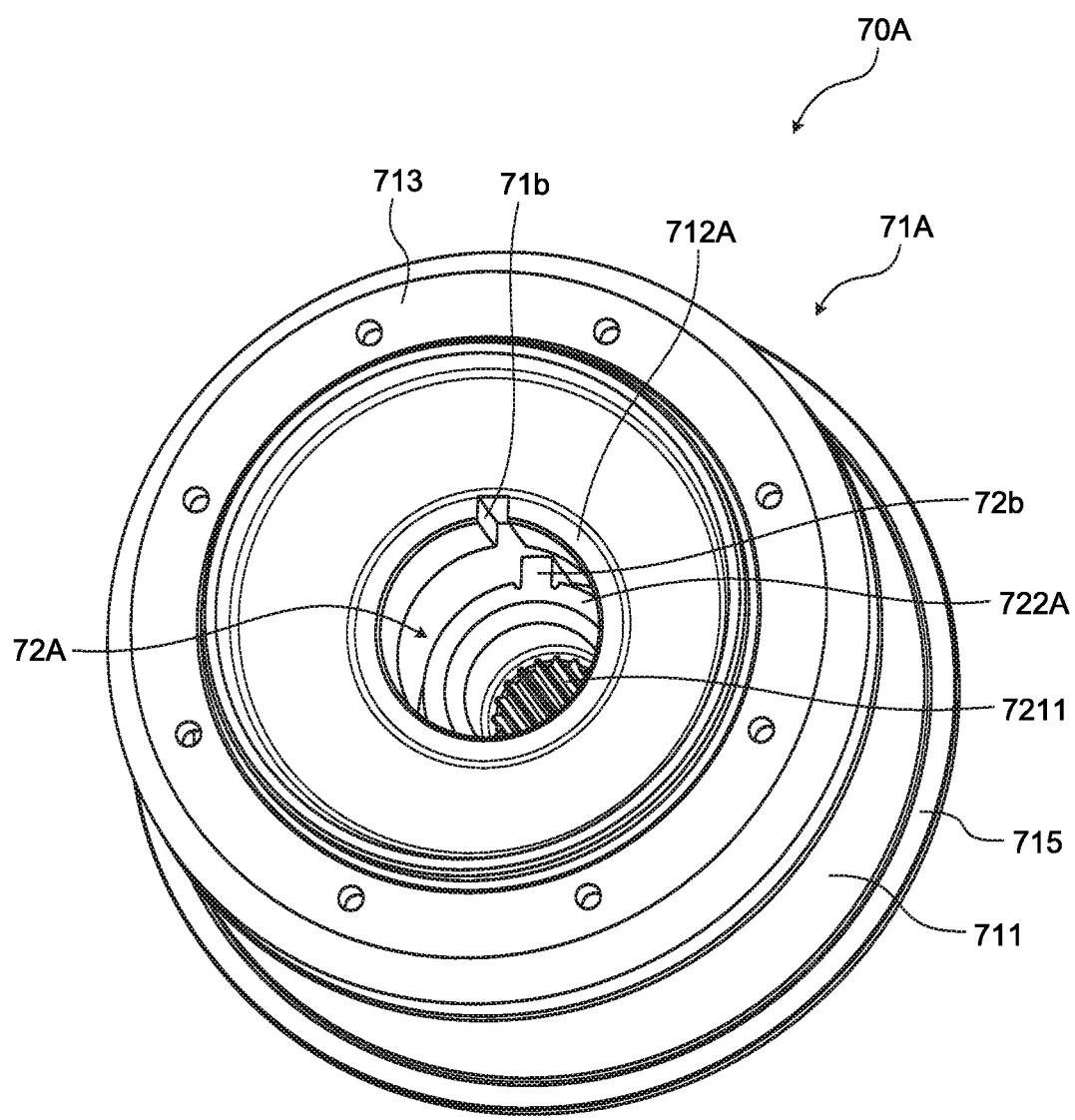
FIG. 61 is a perspective view of the first rotor holding member according to the modification as seen from the other side.

FIG. 60 is a perspective view of a first rotor holding member according to a modification as seen from one side. FIG. 61 is a perspective view of the first rotor holding member according to the modification as seen from the other side. As illustrated in FIG. 60, an electric vehicle drive device 10 according to the modification includes a first rotor holding member 70A different from the above-mentioned first rotor holding member 70. As illustrated in FIG. 60 and FIG. 61, the first rotor holding member 70A includes a first outer member 71A and a first inner member 72A. The same components as those described above in the embodiments are denoted by the same reference symbols, and overlapping descriptions are omitted.

The first outer member 71A is a member formed of first metal. As illustrated in FIG. 60 and FIG. 61, the first outer member 71A includes an inner tubular portion 712A. The inner tubular portion 712A is a cylindrical member, and is in contact with the outer peripheral surface of the first inner member 72A. The inner tubular portion 712A is provided with a first recess 71b. For example, the first recess 71b is a rectangular recess along the axial direction.

The first inner member 72A is a member formed of second metal. As illustrated in FIG. 60 and FIG. 61, the first inner member 72A includes a large tubular portion 722A. The large tubular portion 722A is a cylindrical member, and is in contact with the inner peripheral surface of the inner tubular portion 712A. The large tubular portion 722A is provided with a first protrusion 72b. For example, the first protrusion 72b is a rectangular protrusion along the axial direction.

The first recess 71b and the first protrusion 72b are members for facilitating the transmission of torque between the first outer member 71A and the first inner member 72A. The first protrusion 72b is fitted to the first recess 71b. In this manner, torque is transmitted between the first outer member 71A and the first inner member 72A through the first recess 71b and the first protrusion 72b. In this case, shearing force is generated on the first recess 71b and the first protrusion 72b. By providing the first recess 71b and the first protrusion 72b, torque is more easily transmitted between the first outer member 71A and the first inner member 72A as compared with the case where the first outer member 71A and the first inner member 72A are fixed only by press-fitting.

The structure having the first recess 71b and the first protrusion 72b may be applied to the second rotor holding member 80. Specifically, the second outer member 81 in the second rotor holding member 80 may have a second recess corresponding to the first recess 71b, and the second inner member 82 may have a second protrusion corresponding to the first protrusion 72b.

In the embodiments and the modification (hereinafter referred to as "embodiments and the like"), the conditions for the switching of the driving mode are not limited to man-made operation through the operation system OP. For example, the signal processing unit 2 may automatically switch the first state and the second state by a predetermined algorithm based on signals such as the rotation speed signals of the first motor 11 and the second motor 12. In the above description in the embodiments and the like, "1" of the shift lever SL is associated with the first state, but the correspondence relation between the stage of gear change in the operation system OP such as the shift lever SL and the switching conditions between the first state and the second state is not limited thereto and can be freely set.

In the above-mentioned embodiments, feedback control based on detection results of the rotation speed of the first motor 11, second motor 12 using the first rotation angle detector 91 and the second rotation angle detector 92 is performed irrespective of the driving mode, but the feedback control is not essential in the backward movement and in the first state. The feedback control in the second state only needs to be performed in order to detect at least the rotation speed of the first motor 11, and the feedback control related to the second motor 12 is not essential.

The rotational driving of the wheel H in the second state is established even when the control of the first motor 11 and the second motor 12 in the second state is replaced to reverse the relation of slave and master while the mechanical structures described in the above-mentioned embodiments and the like are not changed.

REFERENCE SIGNS LIST 1 control unit
2 signal processing unit
3 inverter
10 electric vehicle drive device
11 first motor
12 second motor
13 transmission mechanism
14 sun gear shaft
15 transmission mechanism input/output shaft
16 wheel input/output shaft
20 first planetary gear mechanism
21 first sun gear
22 first pinion gear
23 first carrier
24 first ring gear
30 second planetary gear mechanism
31 second sun gear
32a second pinion gear
32b third pinion gear
33 second carrier
34 second ring gear
40 reducing mechanism
41 third sun gear
42 fourth pinion gear
43 third carrier
44 third ring gear
60 clutch device
61 inner race
62 outer race
63 roller
69, 691, 692 flange portion
70, 70A first rotor holding member
71, 71A first outer member
72, 72A first inner member
73 first pin
74 first positioning ring
80 second rotor holding member
81 second outer member
82 second inner member
83 second pin
84 second positioning ring
91 first rotation angle detector
92 second rotation angle detector
93 first signal line
94 second signal line
95 filtering unit
95a lowpass filter
G, G1, G2, G3 case
G11 partition
H wheel
SI, SI2 drive signal

The invention claimed is:
1. An electric vehicle drive device, comprising:
a first motor;
a second motor;
a detection unit configured to detect rotation speed of the first motor;
a filtering unit configured to converge an increase/decrease amount of the rotation speed of the first motor detected by the detection unit;

a transmission mechanism coupled to the first motor and the second motor; and
a control unit configured to control operation of the first motor and the second motor based on a drive signal, wherein
the transmission mechanism comprises:
  a sun gear shaft coupled to the first motor;
  a first planetary gear mechanism including a first sun gear configured to rotate together with the sun gear shaft, a first pinion gear engaged with the first sun gear, a first ring gear engaged with the first pinion gear and coupled to the second motor, and a first carrier that is provided to be rotatable about the sun gear shaft and supports the first pinion gear, and
  a second planetary gear mechanism including a second sun gear configured to rotate together with the sun gear shaft, a second pinion gear engaged with the second sun gear, a third pinion gear engaged with the second pinion gear, a second ring gear engaged with the third pinion gear and coupled to an output shaft, and a second carrier that supports the second pinion gear and the third pinion gear and is coupled to the first ring gear to rotate about the sun gear shaft,
the drive signal includes gear change information indicating a first state in which torque of the second motor is controlled or a second state in which rotation speed of the second motor is controlled and throttle information indicating an acceleration of rotation speed of a wheel, and
based on determining that the drive signal includes the gear change information indicating the first state, the control unit determines a first command value based on the throttle information, the first command value being a torque command value of the first motor for the positive rotation direction, and controls the first motor in accordance with the first command value, and determines a second command value based on the throttle information, the second command value being a torque command value of the second motor for a rotation direction reverse to the positive rotation direction, and controls the second motor in accordance with the second command value, and
wherein, in a case where the first motor is rotated in a rotation direction reverse to the positive rotation direction and the second motor is rotated in the positive rotation direction, when the rotation speed of the first motor is represented by $N_{MA}$, the rotation speed of the second motor is represented by $N_{MB}$, a reduction ratio in the first planetary gear mechanism is represented by $i_1$, and a reduction ratio in the second planetary gear mechanism is represented by $i_2$, the control unit determines $N_{MB}$ within a range indicated by Equation (1):

$$-\frac{1}{i_1} \times N_{MA} \leq N_{MB} < \left(\frac{1}{1-i_2}\right) \times N_{MA}. \tag{1}$$

2. An electric vehicle drive device, comprising:
a first motor;
a second motor;
a transmission mechanism coupled to the first motor and the second motor; and
a control unit configured to control operation of the first motor and the second motor based on a drive signal, wherein
the transmission mechanism comprises:
  a sun gear shaft coupled to the first motor;
  a first planetary gear mechanism including a first sun gear configured to rotate together with the sun gear shaft, a first pinion gear engaged with the first sun gear, a first ring gear engaged with the first pinion gear and coupled to the second motor, and a first carrier provided to be rotatable about the sun gear shaft and supports the first pinion gear;
  a second planetary gear mechanism including a second sun gear configured to rotate together with the sun gear shaft, a second pinion gear engaged with the second sun gear, a third pinion gear engaged with the second pinion gear, a second ring gear engaged with the third pinion gear and coupled to an output shaft, and a second carrier that supports the second pinion gear and the third pinion gear and is coupled to the first ring gear to rotate about the sun gear shaft;
and
  a detection unit configured to detect rotation speed of the first motor; and
  a filtering unit configured to converge an increase/decrease amount of the rotation speed of the first motor detected by the detection unit,
the drive signal includes gear change information indicating a first state in which torque of the second motor is controlled or a second state in which rotation speed of the second motor is controlled and throttle information indicating an acceleration of rotation speed of a wheel, and
based on determining that the drive signal includes the gear change information indicating the second state, the control unit determines a torque command value of the first motor for the positive rotation direction based on the throttle information and controls the first motor in accordance with the torque command value, and determines a rotation speed command value corresponding to the rotation speed of the first motor detected by the detection unit and controls the second motor in accordance with the rotation speed command value, and
wherein, in a case where the first motor is rotated in a rotation direction reverse to the positive rotation direction and the second motor is rotated in the positive rotation direction, when the rotation speed of the first motor is represented by $N_{MA}$, the rotation speed of the second motor is represented by $N_{MB}$, a reduction ratio in the first planetary gear mechanism is represented by $i_1$, and a reduction ratio in the second planetary gear mechanism is represented by $i_2$, the control unit determines $N_{MB}$ within a range indicated by Equation (1):

$$-\frac{1}{i_1} \times N_{MA} \leq N_{MB} < \left(\frac{1}{1-i_2}\right) \times N_{MA}. \tag{1}$$

3. An electric vehicle drive device, comprising:
a first motor;
a second motor;
a detection unit configured to detect rotation speed of the first motor;
a filtering unit configured to converge an increase/decrease amount of the rotation speed of the first motor detected by the detection unit;
a transmission mechanism coupled to the first motor and the second motor; and
a control unit configured to control operation of the first motor and the second motor based on a drive signal, wherein
the transmission mechanism comprises:
  a sun gear shaft coupled to the first motor;
  a first planetary gear mechanism including a first sun gear configured to rotate together with the sun gear shaft, a first pinion gear engaged with the first sun gear, a first ring gear engaged with the first pinion gear and coupled to the second motor, and a first carrier that is provided to be rotatable about the sun gear shaft and supports the first pinion gear;

a second planetary gear mechanism including a second sun gear configured to rotate together with the sun gear shaft, a second pinion gear engaged with the second sun gear, a third pinion gear engaged with the second pinion gear, a second ring gear engaged with the third pinion gear and coupled to an output shaft, and a second carrier that supports the second pinion gear and the third pinion gear and is coupled to the first ring gear to rotate about the sun gear shaft; and a one-way clutch configured to restrict a rotation direction of the first carrier to a predetermined positive rotation direction, the drive signal includes gear change information indicating a first state in which torque of the second motor is controlled or a second state in which rotation speed of the second motor is controlled, and the control unit controls the torque or the rotation speed of the second motor based on determining that the drive signal includes the gear change information indicating the first state or the second state, and wherein, in a case where the first motor is rotated in a rotation direction reverse to the positive rotation direction and the second motor is rotated in the positive rotation direction, when the rotation speed of the first motor is represented by $N_{MA}$, the rotation speed of the second motor is represented by $N_{MB}$, a reduction ratio in the first planetary gear mechanism is represented by $i_1$, and a reduction ratio in the second planetary gear mechanism is represented by $i_2$, the control unit determines $N_{MB}$ within a range indicated by Equation (1):

$$-\frac{1}{i_1} \times N_{MA} \le N_{MB} < \left(\frac{1}{1-i_2}\right) \times N_{MA}. \qquad (1)$$

4. The electric vehicle drive device according to claim 3, wherein
the drive signal includes throttle information indicating an acceleration of rotation speed of a wheel, and
when the gear change information indicates the first state, the control unit determines a first command value based on the throttle information, the first command value being a torque command value of the first motor for the positive rotation direction, and controls the first motor in accordance with the first command value, and determines a second command value based on the throttle information, the second command value being a torque command value of the second motor for the reverse rotation direction, and controls the second motor in accordance with the second command value.

5. The electric vehicle drive device according to claim 3, comprising a detection unit configured to detect rotation speed of the first motor, wherein the drive signal includes throttle information indicating an acceleration of rotation speed of a wheel, and
when the gear change information indicates the second state, the control unit determines a torque command value of the first motor for the positive rotation direction based on the throttle information and controls the first motor in accordance with the torque command value, and determines a rotation speed command value corresponding to the rotation speed of the first motor detected by the detection unit and controls the second motor in accordance with the rotation speed command value.

6. The electric vehicle drive device according to claim 5, wherein
when the second state shifts to the first state, the one-way clutch shifts from a state in which the rotation of the first carrier is not restricted to a state in which the rotation is restricted, and
until the one-way clutch shifts from the state in which the rotation of the first carrier is not restricted to the state in which the rotation is restricted, the control unit controls the first motor with a first shift value in which a torque command value for the positive rotation direction is smaller than a first command value that is a torque command value of the first motor for the positive rotation direction, and controls the second motor with a second shift value in which a torque command value for the reverse rotation direction is smaller than a second command value that is a torque command value of the second motor for the reverse rotation direction.

7. The electric vehicle drive device according to claim 6, wherein, after the one-way clutch shifts to the state in which the rotation of the first carrier is restricted, the control unit gradually increases the torque command value of the first motor for the positive rotation direction from the first shift value to the first command value, and gradually increases the torque command value of the second motor for the reverse rotation direction from the second shift value to the second command value.

8. The electric vehicle drive device according to claim 5, wherein, when the drive signal includes the gear change information indicating the first state and when a torque command value for a reverse rotation direction of the second motor determined based on the throttle information is smaller than a predetermined lower limit value, the control unit sets the second command value to the lower limit value.

9. The electric vehicle drive device according to claim 8, wherein, when the drive signal includes the gear change information indicating the first state and when the torque command value for the reverse rotation direction of the second motor determined based on the throttle information is equal to or larger than the lower limit value, the control unit sets an absolute value of the first command value and an absolute value of the second command value to the same value.

* * * * *